(12) United States Patent
Pittens et al.

(10) Patent No.: US 10,189,522 B2
(45) Date of Patent: Jan. 29, 2019

(54) SYSTEMS AND METHODS FOR SUPPORTING TELESCOPING ELEMENTS

(71) Applicant: Nine Point Eight Inc., Ancaster (CA)

(72) Inventors: Jacobus Josef Pittens, Waterdown (CA); Bradley James Woodward, Hamilton (CA); Steven Andrew Park, Paris (CA)

(73) Assignee: Nine Point Eight Inc., Ancaster (CA)

( * ) Notice: Subject to any disclaimer, the term of this patent is extended or adjusted under 35 U.S.C. 154(b) by 0 days.

(21) Appl. No.: 15/506,631

(22) PCT Filed: Aug. 21, 2015

(86) PCT No.: PCT/CA2015/050797
§ 371 (c)(1),
(2) Date: Feb. 24, 2017

(87) PCT Pub. No.: WO2016/029301
PCT Pub. Date: Mar. 3, 2016

(65) Prior Publication Data
US 2017/0274949 A1    Sep. 28, 2017

Related U.S. Application Data

(60) Provisional application No. 62/144,781, filed on Apr. 8, 2015, provisional application No. 62/041,937, filed on Aug. 26, 2014.

(51) Int. Cl.
*B62J 1/08* (2006.01)
*B62K 19/36* (2006.01)
(Continued)

(52) U.S. Cl.
CPC . *B62J 1/08* (2013.01); *B62J 1/02* (2013.01); *B62J 1/06* (2013.01); *B62K 19/36* (2013.01); *B62J 2001/085* (2013.01)

(58) Field of Classification Search
CPC .......... B62J 2001/085; B62J 1/06; B62J 1/08; B62K 19/36; F16F 9/00; F16F 9/53; F16F 9/303
See application file for complete search history.

(56) References Cited

U.S. PATENT DOCUMENTS 4,023,649 A  *  5/1977  Wood ........................ B66F 7/28
                                                    187/206
4,245,826 A  *  1/1981  Wirges ...................... A47C 3/30
                                                    188/300

(Continued)

FOREIGN PATENT DOCUMENTS

CA          2829564 A1   9/2012
DE   10 2012 110 105 A1  4/2014

(Continued)

OTHER PUBLICATIONS

International Search Report for PCT/CA2015/050797 dated Nov. 10, 2015.

(Continued)

*Primary Examiner* — Bradley T King
*Assistant Examiner* — James K Hsiao
(74) *Attorney, Agent, or Firm* — Walter | Haverfield LLP; Sean F. Mellino; D. Peter Hochberg

(57) ABSTRACT

An inner tube moves axially between an outer tube and a support, all of which are concentrically arranged, to a desired telescopic position, relative to the outer tube and the support, and can be locked in the desired telescopic position by applying radial force between the support and the inner surface of the inner tube. The radial force generates a frictional force acting on the inner surface of the inner tube, which resists longitudinal movement of the inner tube. A bicycle actuator cable is coupled to an actuator connector for a tension-controlled actuator by a bicycle cable connector which has a fixed longitudinal position on the bicycle (Continued)

actuator cable. The bicycle cable connector is longitudinally consistently removably repeatably interengageable with the actuator connector to maintain longitudinal alignment of the bicycle actuator cable with the actuator through repeated engagement and disengagement of the bicycle cable connector and the actuation connector.

14 Claims, 40 Drawing Sheets

(51) Int. Cl.
*F16F 9/00* (2006.01)
*B62J 1/02* (2006.01)
*B62J 1/06* (2006.01)

(56) References Cited

U.S. PATENT DOCUMENTS

| | | | | |
|---|---|---|---|---|
| 4,261,540 | A * | 4/1981 | Baker | A47C 3/24 248/406.2 |
| 5,133,529 | A * | 7/1992 | Kashima | B63B 29/04 248/162.1 |
| 5,301,974 | A * | 4/1994 | Knapp | B62J 1/06 188/322.17 |
| 5,646,076 | A * | 7/1997 | Bortz | D04H 1/46 188/251 A |
| 7,033,663 | B1 * | 4/2006 | Hidayetoglu | F16D 69/02 188/251 R |
| 8,926,216 | B2 * | 1/2015 | McAndrews | B62J 1/08 403/109.7 |
| 9,878,754 | B2 * | 1/2018 | Tsai | B62J 1/08 |
| 2004/0070168 | A1 * | 4/2004 | McKinnon | B62K 19/36 280/281.1 |
| 2006/0175792 | A1 | 8/2006 | Sicz et al. | |
| 2009/0324327 | A1 * | 12/2009 | McAndrews | B62J 1/08 403/409.1 |
| 2010/0052286 | A1 | 3/2010 | Maier | |
| 2012/0006949 | A1 | 1/2012 | Laird et al. | |
| 2012/0228906 | A1 | 9/2012 | McAndrews et al. | |
| 2013/0093231 | A1 * | 4/2013 | Hsu | B62J 1/08 297/344.19 |
| 2013/0119634 | A1 * | 5/2013 | Camp | B62J 1/08 280/287 |
| 2013/0221713 | A1 * | 8/2013 | Pelot | B62J 1/02 297/215.13 |
| 2014/0174286 | A1 | 6/2014 | Pittens et al. | |
| 2014/0208933 | A1 * | 7/2014 | Kuo | B62J 1/08 91/43 |
| 2015/0232142 | A1 * | 8/2015 | Shirai | B62J 1/08 403/104 |
| 2015/0276007 | A1 * | 10/2015 | Talavasek | B62K 25/20 188/269 |
| 2016/0075204 | A1 * | 3/2016 | Marking | F16F 9/062 267/225 |
| 2016/0236739 | A1 * | 8/2016 | Shirai | B62J 1/08 |
| 2016/0355225 | A1 * | 12/2016 | Shirai | B62J 1/06 |

FOREIGN PATENT DOCUMENTS

| | | |
|---|---|---|
| DE | 10 2013 008 529 B3 | 10/2014 |
| EP | 1 877 299 A1 | 1/2008 |
| EP | 1 877 299 B1 | 6/2009 |
| EP | 2 402 239 A1 | 1/2012 |
| FR | 2952031 A1 | 5/2011 |
| WO | 2008/083843 A1 | 7/2008 |

OTHER PUBLICATIONS

Written Opinion of the International Searching Authority for PCT/CA2015/050797 dated Nov. 10, 2015.
Communication from the European Patent Office dated Oct. 5, 2017 for corresponding European Patent Application No. 15836911.6.
Extended European Search Report from the European Patent Office dated Dec. 14, 2017 for corresponding European Application No. 15836911.6.

* cited by examiner

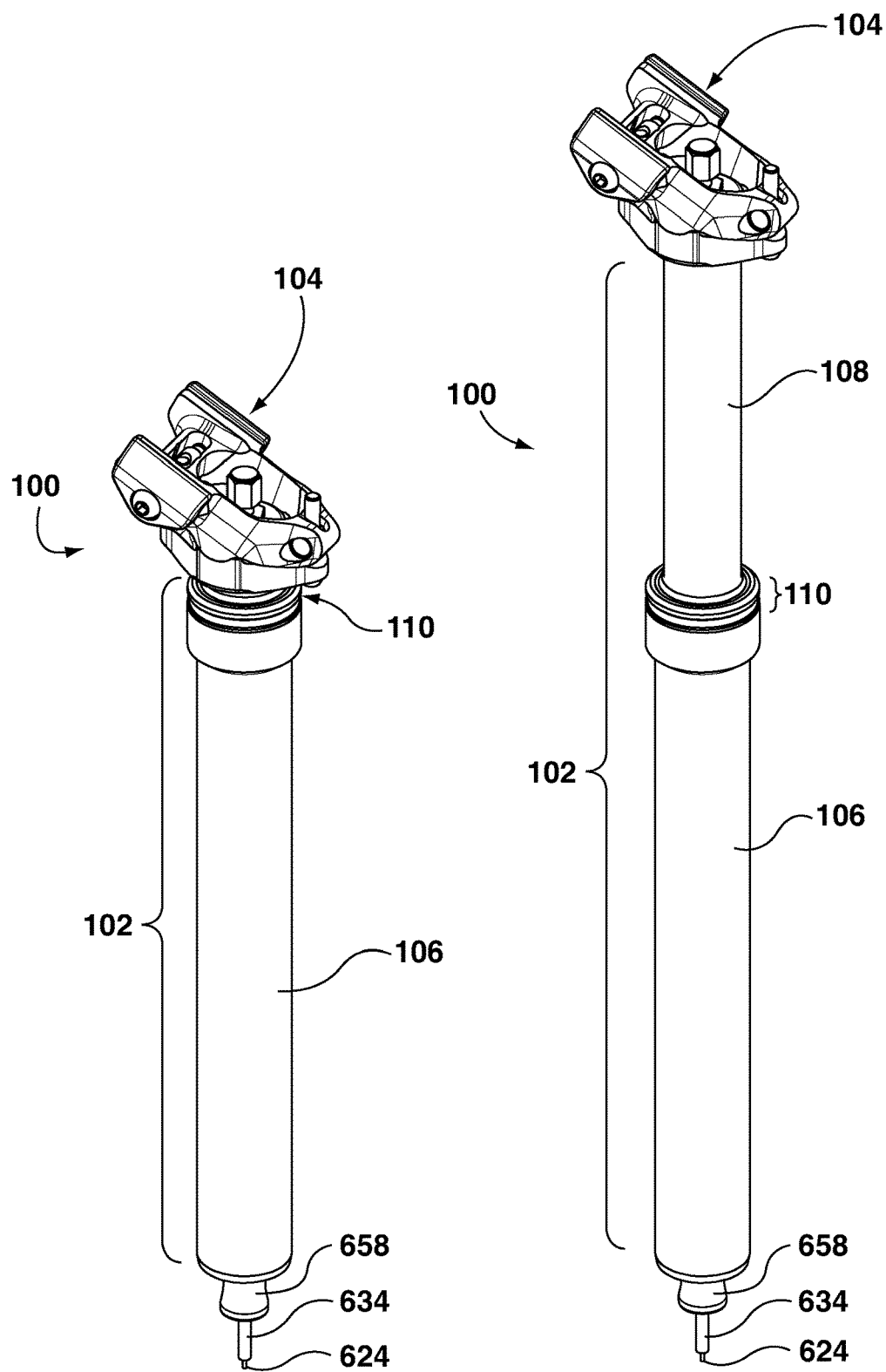

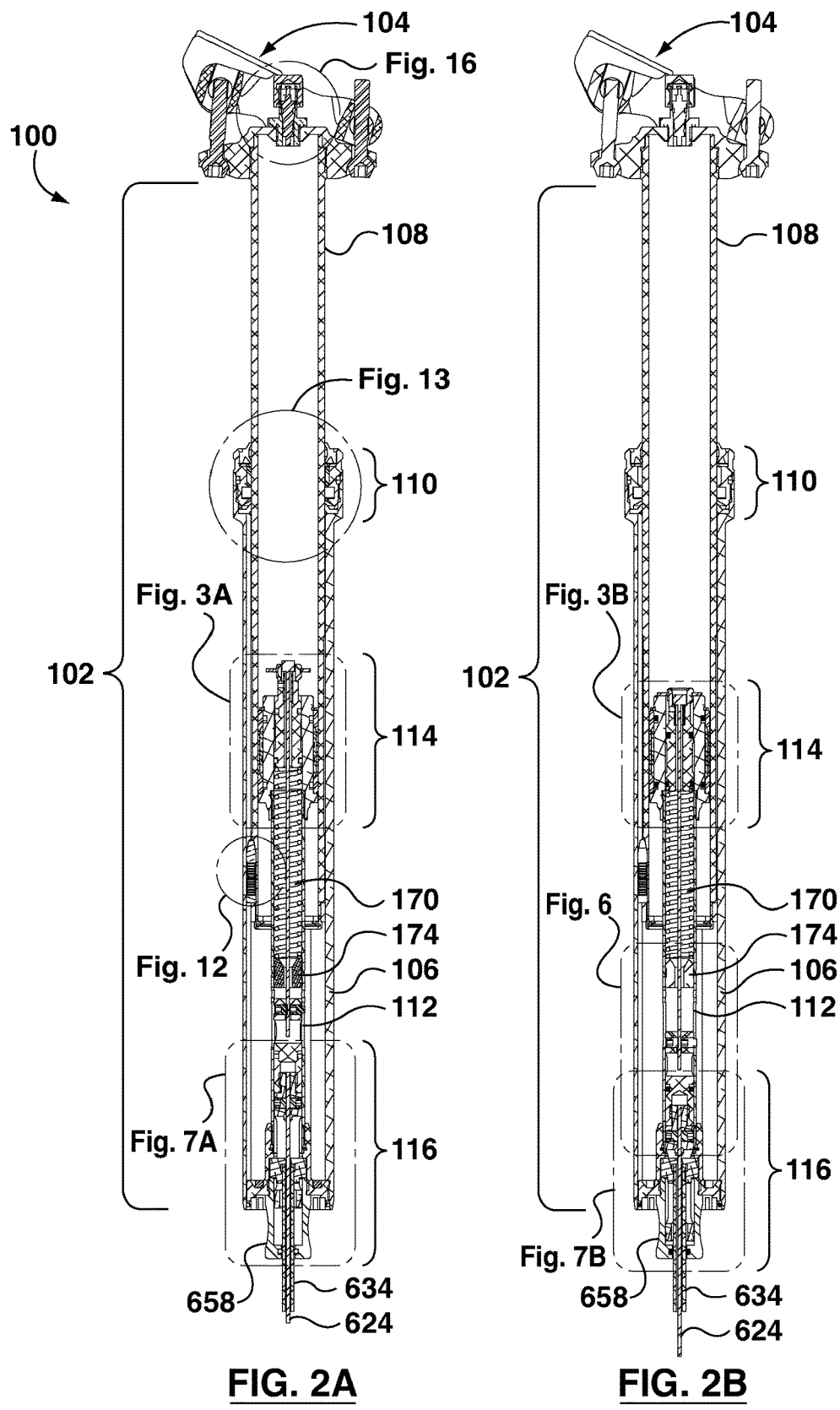

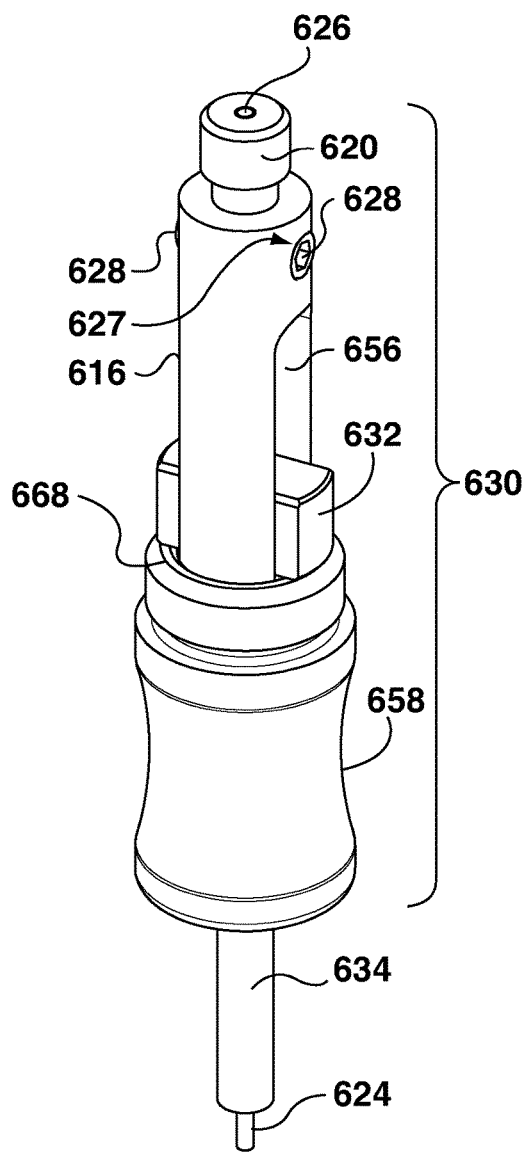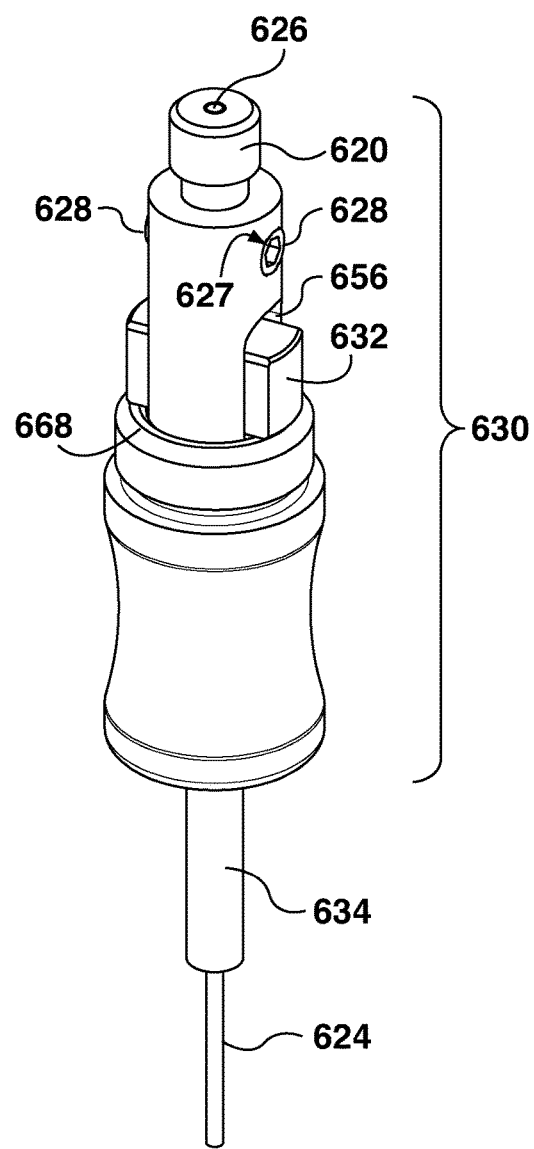
FIG. 9A
FIG. 9B

SYSTEMS AND METHODS FOR SUPPORTING TELESCOPING ELEMENTS

TECHNICAL FIELD

The present disclosure relates to telescoping assemblies and to connection arrangements therefor.

BACKGROUND

Telescoping assemblies, comprising an inner tube and an outer tube telescopically received within the inner tube, coupled with a mechanism for maintaining a desired telescopic position of the inner tube relative to the outer tube. This type of telescoping arrangement is often used as an adjustable seat post for a bicycle seat.

One type of telescoping assembly relies on a support reservoir disposed between the inner tube and the outer tube for supporting the inner tube against the outer tube. In this type of telescoping assembly, the inner tube is slidably received within the outer tube and the support reservoir is in valve-governed fluid communication with a sink reservoir, each of which contains an incompressible fluid. By opening the valve, the position of the inner tube element relative to the outer tube can be adjusted. Moving fluid from the support reservoir to the sink reservoir will telescopically collapse the inner tube, and moving fluid from the sink reservoir to the support reservoir will telescopically extend the inner tube.

Another type of telescoping assembly uses mechanical obstruction to support the inner tube against the outer tube. With mechanical obstruction, one element extends into or across the path of motion of another element so as to obstruct that motion. For example, a radially outwardly extending detent may be removably received in a corresponding slot cut into the inside of the inner tube to resist longitudinal movement of the inner tube.

Yet another type of telescoping assembly uses hydraulic clamping to maintain a desired telescopic position, as taught by U.S. Patent Application Publication No. 2010/0052286.

SUMMARY

In one aspect, a telescoping arrangement comprises an outer tube, a support post disposed within the outer tube and fixedly coupled thereto, an inner tube telescopically received in the outer tube between the outer tube and the support post, and a brake carried by the support post for releasably supporting the inner tube on the support post to longitudinally fix the inner tube in a desired telescopic position relative to the outer tube. The brake comprises at least one braking element movable between a braking configuration and a telescoping configuration. In the braking configuration, at least one friction surface of the at least one braking element is driven outwardly against an inner surface of the inner tube to frictionally engage the inner surface of the inner tube and resist sliding thereof along the at least one friction surface. In the telescoping configuration, the at least one friction surface of the at least one braking element is withdrawn, relative to the braking configuration, so as to permit sliding of the inner surface of the inner tube past the at least one friction surface. An actuator is coupled to the at least one braking element for moving the at least one braking element between the braking configuration and the telescoping configuration. When the at least one braking element is in the braking configuration, the at least one braking element acts between the inner tube and the support post to support the inner tube on the support post in a fixed telescopic position relative to the outer tube, and when the at least one braking element is in the telescoping configuration, the inner tube can telescope relative to the outer tube.

In one embodiment, the braking element comprises a resiliently deformable annular sleeve, and the annular sleeve has an external surface forming the at least one friction surface. In the braking configuration, the annular sleeve is pressed outwardly against the inner surface of the inner tube, and in the telescoping configuration the annular sleeve is retracted inwardly, relative to the braking configuration. In such an embodiment, the static coefficient of friction between the external surface of the annular sleeve and the inner surface of the inner tube is preferably at least 0.25, and more preferably at least 0.30. The annular sleeve may be formed from polyphenylsulfone (PPSU).

In a particular embodiment, the brake comprises an annular brake support fitting fixedly carried by the support post, and the annular sleeve surrounds and is sealed to the brake support fitting. An annular channel is formed in an inner surface of the annular sleeve, with the annular channel cooperating with the brake support fitting to form a pressure chamber. A piston is slidably and sealingly received in a bore of the brake support fitting and movable between a braking position and a telescoping position, with a fluid reservoir being defined between the piston and the brake support fitting. The fluid reservoir is in fluid communication with the pressure chamber. Moving the piston from the telescoping position to the braking position increases pressure in the fluid reservoir, with the increased pressure being transferred fluidically into the pressure chamber to press the external surface of the annular sleeve outwardly against the inner surface of the inner tube. Moving the piston from the braking position to the telescoping position decreases pressure in the fluid reservoir, with the decreased pressure being transferred fluidically out of the pressure chamber to reduce outward pressure applied by the annular sleeve.

The piston may be biased into the braking position by a biasing member acting between the piston and the support post. In one embodiment, the support post is hollow and the actuator comprises a cable coupled to the piston for overcoming the biasing member and pulling the piston from the braking position to the telescoping position.

In one embodiment, the fluid reservoir is an annular fluid reservoir defined between the piston and the brake support fitting. In this embodiment, moving the piston from the telescoping position to the braking position decreases the total annular space between the outer surface of the piston and the inner surface of the bore to force fluid from the annular fluid reservoir into the pressure chamber, and moving the piston from the braking position to the telescoping position increases the total annular space between the outer surface of the piston and the inner surface of the bore to return fluid from the pressure chamber into the annular fluid reservoir.

In another embodiment, the fluid reservoir is disposed interiorly of the brake support fitting. In this embodiment, moving the piston from the telescoping position to the braking position intrudes the piston into the fluid reservoir to displace fluid from the fluid reservoir into the pressure chamber, and moving the piston from the braking position to the telescoping position withdraws the piston from the fluid reservoir, relative to the braking position, to return fluid from the pressure chamber into the fluid reservoir. This embodiment may further comprise a replenishment reservoir disposed interiorly of the brake support fitting, with the replenishment reservoir being in fluid communication with the fluid reservoir and a replenishment piston slidingly received in the replenishment reservoir and biased to urge fluid in the replenishment reservoir toward the fluid reservoir.

In another aspect, a method for releasably locking a telescoping inner tube in a desired telescopic position comprises moving the inner tube axially between an outer tube and a support to place the inner tube in the desired telescopic position relative to the outer tube and the support. In this method, the inner tube, outer tube and the support post are arranged concentrically with one another. The method further comprises applying radial force between the support and a longitudinal inner surface of the inner tube so that the radial force generates a frictional force acting on the longitudinal inner surface of the inner tube and the frictional force resists longitudinal movement of the inner tube relative to the support.

The radial force may be applied hydraulically, pneumatically, mechanically, magnetically or by a combination of at least two of hydraulically, pneumatically, mechanically and magnetically.

In a further aspect, a telescopic bicycle seat post system comprises a seat post telescoping assembly and a bicycle connector. The seat post telescoping assembly comprises an outer tube, an inner tube telescopically received in the outer tube, a locking mechanism acting between the outer tube and the inner tube for releasably locking the inner tube in a desired telescopic position relative to the outer tube, the locking mechanism having a tension-controlled actuator, and an actuation connector coupled to the tension-controlled actuator and adapted to apply tension to the tension-controlled actuator. The bicycle connector comprises a bicycle cable connector adapted for securing a bicycle actuator cable so as to maintain a fixed longitudinal position of the bicycle cable connector on the bicycle actuator cable. The actuation connector and the bicycle cable connector are removably repeatably interengageable with one another so that, when the actuation connector and the bicycle cable connector are interengaged, tension applied to the bicycle cable connector acts on the tension-controlled actuator through the actuator connector. The actuation connector and the bicycle cable connector maintain the longitudinal position of the bicycle actuator cable relative to the tension-controlled actuator, when the actuation connector and the bicycle cable connector are interengaged, through repeated engagement and disengagement of the actuation connector and the bicycle cable connector.

In one embodiment, the tension-controlled actuator comprises a seat post actuator cable coupled at one end thereof to the locking mechanism and adapted for selectively actuating the locking mechanism and secured at the other end to the actuation connector.

In another embodiment, the tension-controlled actuator comprises an actuator shaft coupled at one end thereof to the locking mechanism and adapted for selectively actuating the locking mechanism; the actuator shaft being secured at the other end thereof to the actuation connector.

In a particular embodiment, the seat post telescoping assembly further comprises a support post, and the inner tube is telescopically received in the outer tube between the outer tube and the support post, with the actuation connector being longitudinally movably received in the support post for reciprocal movement along the support post. The bicycle connector further comprises a bicycle cable sheath retainer adapted for securing a bicycle cable sheath surrounding the bicycle actuator cable, with the bicycle cable sheath retainer and the bicycle cable connector being axially movable relative to one another and the bicycle cable connector being longitudinally movably receivable in the support post for reciprocal movement along the support post. The bicycle cable sheath retainer is releasably securable to the seat post telescoping assembly so as to be fixed relative to the support post when secured to the seat post telescoping assembly. When the actuation connector and the bicycle cable connector are interengaged and the bicycle cable sheath retainer is secured to the seat post telescoping assembly, the bicycle cable connector is coupled to the tension-controlled actuator by the actuation connector and the actuation connector and the bicycle cable connector move in unison for reciprocal movement along the support post while the bicycle cable sheath retainer remains fixed relative to the support post. When the actuation connector and the bicycle cable connector are disengaged from one another and the bicycle cable sheath retainer is released from the seat post telescoping assembly, the bicycle connector can be separated from the telescopic bicycle seat post system to permit removal of the seat post telescoping assembly from a bicycle while the bicycle connector remains coupled to the bicycle.

The bicycle connector may further comprise a removable end cap that is releasably securable to the seat post telescoping assembly at a bicycle mounting end thereof, and a receptacle may be disposed at the bicycle mounting end of the seat post telescoping assembly for receiving the bicycle cable sheath retainer, so that when the end cap is secured to the bicycle mounting end of the seat post telescoping assembly with the bicycle cable sheath retainer disposed in the receptacle, the bicycle cable sheath retainer is trapped in the receptacle by the end cap.

In some embodiments, the actuation connector and the bicycle cable connector are threadedly removably interengageable with one another.

BRIEF DESCRIPTION OF THE DRAWINGS

These and other features will become more apparent from the following description in which reference is made to the appended drawings wherein:

FIG. 1A is a top perspective view of a first exemplary telescopic bicycle seat post system, shown in a retracted configuration;

FIG. 1B is a top perspective view of the telescopic bicycle seat post system of FIG. 1A, shown in an extended configuration;

FIG. 2A is a side cross-sectional view of the telescopic bicycle seat post system of FIG. 1A in a braking configuration;

FIG. 2B is a side cross-sectional view of the telescopic bicycle seat post system of FIG. 1A in a telescoping configuration;

FIG. 9A is a perspective view showing the configuration of the bicycle cable connector of the telescopic bicycle seat post system of FIG. 1A when the brake is in the braking configuration;

FIG. 9B is a perspective view showing the configuration of the bicycle cable connector of the telescopic bicycle seat post system of FIG. 1A when the brake is in the telescoping configuration;

DETAILED DESCRIPTION

Figure 3A:
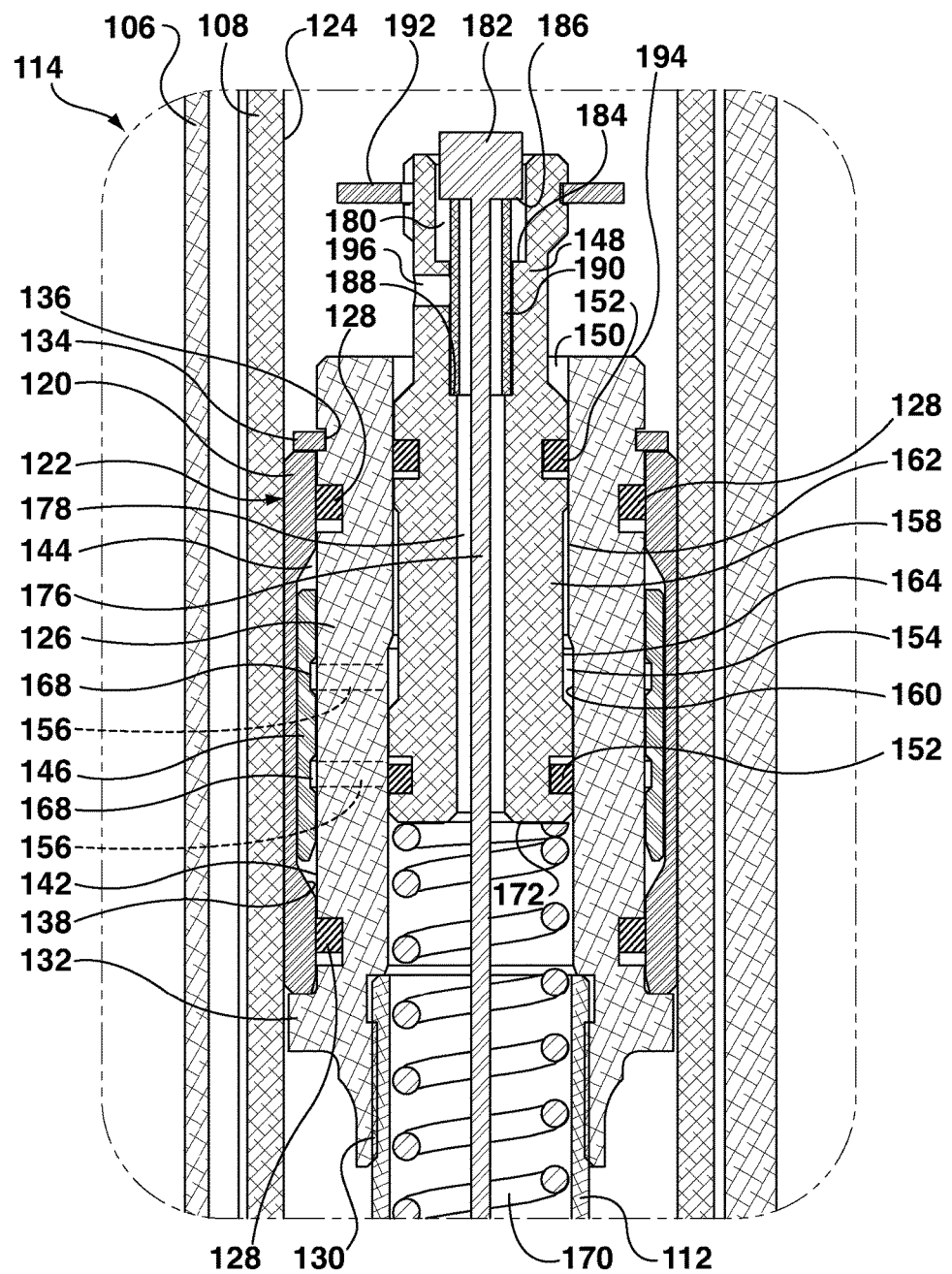
FIG. 3A is a detailed view of a portion of FIG. 2A, showing a brake of the telescopic bicycle seat post system of FIG. 1A in a braking configuration.

Referring now to FIGS. 1A and 1B, a first exemplary telescopic bicycle seat post system is indicated generally at 100. FIG. 1A shows the telescopic bicycle seat post system 100 in a retracted configuration and FIG. 1B shows the telescopic bicycle seat post system 100 in an extended configuration. The telescopic bicycle seat post system 100 comprises a seat post telescoping assembly 102 which carries a seat mount 104. The seat mount 104 shown in the drawings is exemplary, and any suitable conventional seat mount may be used. The end of the telescopic bicycle seat post system 100 which carries the seat mount 104 is the superior end of the telescopic bicycle seat post system 100, and the end remote from the end that carries the seat mount 104 is the inferior end. The terms "superior", "superiorly", "inferior" and "inferiorly", as used herein, reference this directional convention.

Figure 11:
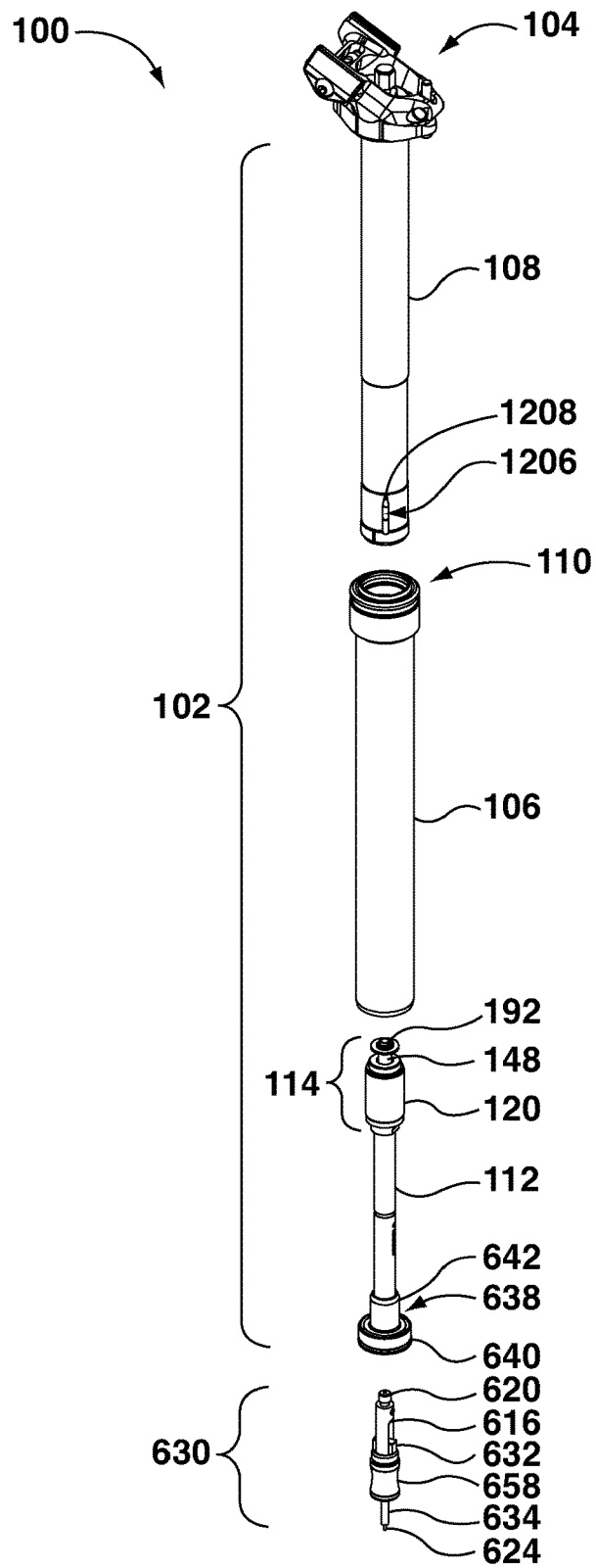
FIG. 11 is an exploded perspective view of the telescopic bicycle seat post system of FIG. 1A.

The seat post telescoping assembly 102 comprises an outer tube 106 and an inner tube 108 telescopically received in the outer tube 106. Although not visible in FIGS. 1A and 1B, as will be described in greater detail below a locking mechanism acts between the outer tube 106 and the inner tube 108 for releasably locking the inner tube 108 in a desired telescopic position relative to the outer tube 106. Thus, when the outer tube 106 is fixed to a bicycle (not shown) and a seat (not shown) is secured to the seat mount 104, the height of the seat relative to the bicycle can be adjusted by adjusting the telescopic position of the inner tube 108 relative to the outer tube 106. A seal assembly 110 is disposed at the superior end of the outer tube 106 to seal the inner tube 108 to the outer tube 106. An exploded perspective view of the telescopic bicycle seat post system 100 is shown in FIG. 11.

Reference is now made to the cross-sectional views in FIGS. 2A and 2B, where it can be seen that a support post 112 is disposed within the outer tube 106 and fixedly coupled thereto, with the inner tube 108 telescopically received in the outer tube 106 between the outer tube 106 and the support post 112. In the illustrated embodiment, the locking mechanism comprises a brake 114 carried by the support post 112 for releasably supporting the inner tube 108 on the support post 112 to longitudinally fix the inner tube 108 in a desired telescopic position relative to the outer tube 106. In particular, since the support post 112 and the outer tube 106 are fixedly coupled to one another, fixing the inner tube 108 relative to the support post 112 will also fix the inner tube 108 relative to the outer tube 106.

As will be explained further below, the brake 114 comprises a braking element movable between a braking configuration, in which the braking element acts between the inner tube 108 and the support post 112 to support the inner tube 108 on the support post 112 and hence in a fixed telescopic position relative to the outer tube 106, and a telescoping configuration in which the inner tube 108 can telescope relative to the outer tube 106. An actuator is coupled to the braking element for moving the braking element between the braking configuration and the telescoping configuration, as will also be described further below.

Still referring to FIGS. 2A and 2B, it can be seen that the telescopic bicycle seat post system 100 further comprises a connection assembly 116 for coupling the brake 114 to a control cable on a bicycle, as will also be described further below. A bushing 118 (FIG. 15) is disposed at the inferior end of the inner tube 108 to assist the inner tube 108 in sliding within the outer tube 106.

Figure 3B:
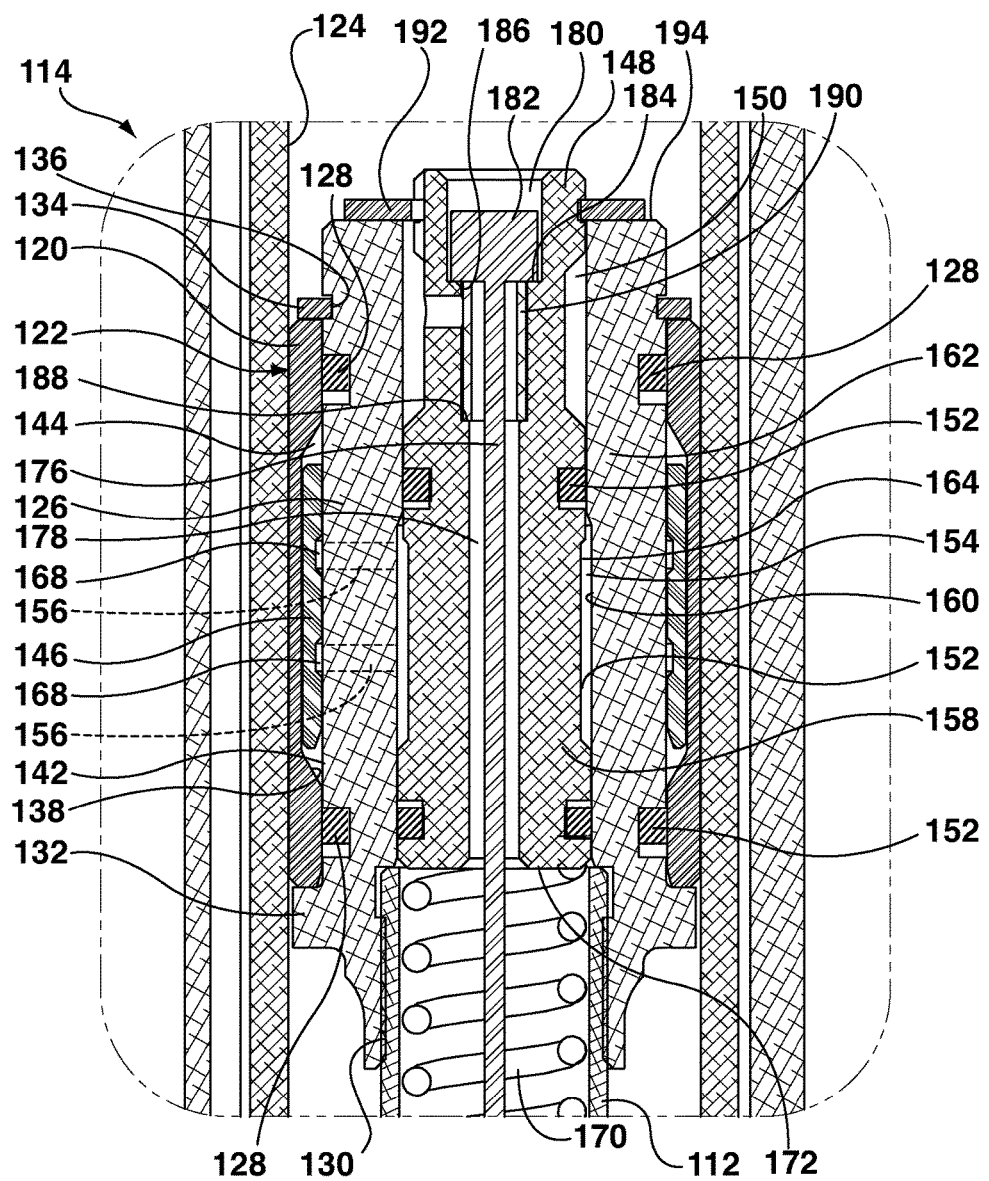
FIG. 3B is a detailed view of a portion of FIG. 2B, showing the brake of the telescopic bicycle seat post system of FIG. 1A in a telescoping configuration.

Reference is now made to FIGS. 3A and 3B, which show the brake 114 in more detail. FIG. 3A shows the brake 114 in the braking configuration, and FIG. 3B shows the brake 114 in the telescoping configuration. Since the seat post telescoping assembly 102 will normally be locked in a fixed telescopic position, in a preferred embodiment the brake 114 will be biased into the braking configuration shown in FIG. 3A.

In the illustrated embodiment, the braking element comprises a resiliently deformable annular sleeve 120 whose external surface 122 serves as a friction surface 122 for frictionally engaging the inner surface 124 of the inner tube 108. Preferably, the static coefficient of friction between the external surface 122 of the annular sleeve 120 and the inner surface 124 of the inner tube 108 is at least 0.25 and more preferably at least 0.30. In a preferred embodiment, the annular sleeve 120 is formed from polyphenylsulfone (PPSU), which is available under the trade name Radel R® from Curbell Plastics, having an address at 7 Cobham Drive, Orchard Park, N.Y. 14127. The annular sleeve 120 may also be made, for example, from polyphenylene sulfide (PPS) or polysulfone (PSU). The annular sleeve 120 is carried by an annular brake support fitting 126.

The annular brake support fitting 126 is fixedly carried by the support post 112. In the illustrated embodiment, the superior end of the support post 112 is externally threaded and the inferior end of the brake support fitting 126 is internally threaded, and the inferior end of the brake support fitting 126 is secured to superior end of the support post 112 by interengaged threads 130. The annular sleeve 120 surrounds and is sealed to the brake support fitting 126 by annular seals 128 and is trapped between an inferior annular shoulder 132 on the brake support fitting 126 and a brake retainer in the form of a snap ring 134 fitted into a groove 136 toward the superior end of the brake support fitting 126. An annular channel 138 is formed in the inner surface of the annular sleeve 120, and the annular channel 138 cooperates with the outer surface 142 of the brake support fitting 126 to form a pressure chamber 144. A penannular filler ring 146 is disposed within the pressure chamber 144 between the brake support fitting 126 and the annular sleeve 120; the purpose of the filler ring 146 will be described below.

A piston 148 is slidably and sealingly received in the bore 150 of the brake support fitting 126; the piston is sealed within the bore 150 by annular seals 152 fitted into corresponding annular grooves on the piston 148. The piston 148 is movable within the bore 150 between a braking position as shown in FIG. 3A, and a telescoping position as shown in FIG. 3B. An annular fluid reservoir 154 is defined between the piston 148 and the brake support fitting 126. The annular fluid reservoir 154 is in fluid communication with the pressure chamber 144 via fluid conduits 156 defined through the brake support fitting 126; the fluid conduits 156 are shown in dashed lines as they are not directly visible in the cross-section shown in FIGS. 3A and 3B. The annular fluid reservoir 154 is formed between an inwardly recessed region 158 of the piston 148 and the inner surface 160 of the bore 150. The annular fluid reservoir 154, fluid conduits 156 and pressure chamber 144 contain a suitable incompressible fluid.

The inner surface 160 of the bore 150 includes an inwardly stepped longitudinal region 162 which overlaps the inwardly recessed region 158 of the piston 148 more when the piston 148 is in the braking position (FIG. 3A) than when the piston 148 is in the telescoping position (FIG. 3B). Thus, as the piston 148 moves from the telescoping position (FIG. 3B) to the braking position (FIG. 3A), the total annular space between the outer surface 164 of the piston 148 and the inner surface 160 of the bore 150 will decrease, and hence the annular fluid reservoir 154 will be smaller in volume when the piston 148 is in the braking position than when the piston 148 is in the telescoping position. Hence, moving the piston 148 from the telescoping position to the braking position forces fluid from the annular fluid reservoir 154 through the fluid conduits 156 into the pressure chamber 144. Conversely, moving the piston 148 from the braking position to the telescoping position returns fluid from the pressure chamber 144 into the annular fluid reservoir 154, via the fluid conduits 156.

Accordingly, moving the piston 148 from the telescoping position to the braking position increases pressure in the annular fluid reservoir 154, with the increased pressure being transferred fluidically into the pressure chamber 144 to press the external surface 122 of the annular sleeve 120 outwardly against the inner surface 124 of the inner tube 108. Thus, in the braking configuration, the friction surface of the braking element, which in the illustrated embodiment is the external surface 122 of the annular sleeve 120, is driven outwardly against the inner surface 124 of the inner tube 108 to frictionally engage the inner surface 124 of the inner tube 108 and resist sliding thereof along the friction surface.

Moving the piston 148 from the braking position to the telescoping position decreases pressure in the annular fluid reservoir 154, with the decreased pressure being transferred fluidically out of the pressure chamber 144 into the annular fluid reservoir 158, via the fluid conduits 156, to reduce the outward pressure applied by the annular sleeve 120 against the inner surface 124 of the inner tube 108. Thus, in the telescoping configuration the annular sleeve 120 is retracted inwardly, relative to the braking configuration, and hence the friction surface of the braking element, that is, the external surface 122 of the annular sleeve 120, is withdrawn, relative to the braking configuration, so as to permit sliding of the inner surface 124 of the inner tube 108 past the friction surface.

As noted above, an annular filler ring 146 is disposed within the pressure chamber 144. The purpose of the filler ring 146 is to occupy volume within the pressure chamber 144 so as to reduce the absolute volume of incompressible fluid required to effect a transition of the annular sleeve 120 from the telescoping configuration to the braking configuration. Such a reduction in the required fluid volume is advantageous where the telescopic bicycle seat post system 100 will be used in climates in which there are substantial variations in temperature, e.g. warm summers and cold winters, since the volume of the incompressible fluid may vary with temperature and affect operation of the brake 114. A reduction in the absolute volume of incompressible fluid required to effect a transition of the annular sleeve 120 from the telescoping configuration to the braking configuration will result in a corresponding reduction in the absolute amount of temperature-induced volume change, and an appropriately sized filler ring 146 can render the absolute amount of temperature-induced volume change negligible with respect to the operation of the brake 114. It will be appreciated, however, that while advantageous, the filler ring 146 is optional.

In the illustrated embodiment, the filler ring 146 is penannular in shape so as to form a longitudinal gap 166 (not shown in FIGS. 3A and 3B; see FIG. 4), and includes two penannular channels 168 defined on its inner surface. The penannular channels 168 are in fluid communication with the fluid conduits 156 defined through the brake support fitting 126 as well as the longitudinal gap 166. Thus, fluid can flow from the reservoir 154 into the portion of the pressure chamber 144 not occupied by the filler ring 146 by flowing through the fluid conduits 156 into the penannular channels 168, from the penannular channels 168 into the longitudinal gap 166 in the filler ring 146, and then from the longitudinal gap 166 into the unoccupied volume of the pressure chamber 144.

As indicated above, the brake 114 is preferably biased into the braking configuration shown in FIG. 3A. In the illustrated embodiment, the piston 148 is biased into the braking position by a biasing member in the form of a spring 170 which is disposed inside the support post 112, which is hollow. At its superior end, the spring 170 engages the inferior end surface 172 of the piston 148. The inferior end of the spring 170 engages a spring bulkhead 174 (see FIGS. 2A, 2B and 5) fixed inside the support post 112 by crimping, welding or the like and hence the spring 170 acts between the piston 148 and the support post 112. In the illustrated embodiment, the actuator comprises a seat post actuator cable 176 coupled to the piston 148 for overcoming the spring 170 and pulling the piston 148 from the braking position (FIG. 3A) to the telescoping position (FIG. 3B).

Continuing to refer to FIGS. 3A and 3B, a central bore 178 is defined through the piston 148, and the seat post actuator cable 176 extends into and through the bore 178 from the inferior end of the piston 148. The superior end of the piston 148 has an open-ended receptacle 180, formed as part of the bore 178, which receives an enlarged end fitting 182 on the superior end of the seat post actuator cable 176. The receptacle 180 is defined by a first annular shoulder 184 (FIG. 3A) in the bore 178; the first annular shoulder 184 forms the inferior end of the receptacle 180 and is engaged by the inferior surface 186 of the enlarged end fitting 182 of the seat post actuator cable 176 to enable the seat post actuator cable 176 to pull the piston 148 from the braking position (FIG. 3A) to the telescoping position (FIG. 3B). A second annular shoulder 188 is defined in the bore 178, inferiorly of the first annular shoulder 184, and a take-up spring 190 is interposed between the inferior surface 186 of the enlarged end fitting 182 and the second annular shoulder 188 to take up any slack between the piston 148 and the seat post actuator cable 176 when the piston 148 is the braking position (FIG. 3A). An annular stop 192 extends from the superior end of the piston 148 and engages the superior end surface 194 of the brake support fitting 126 when the piston is in the telescoping position (FIG. 3B) so as to limit travel of the piston 148 in the inferior direction. A pressure equalization vent 196 is defined through the piston 148, between the first and second annular shoulders 184, 188. The pressure equalization vent 196 is in fluid communication with the bore 178 and hence with the interior of the hollow support post 112 to enable air to travel past the brake 114 in either direction.

Figure 4:
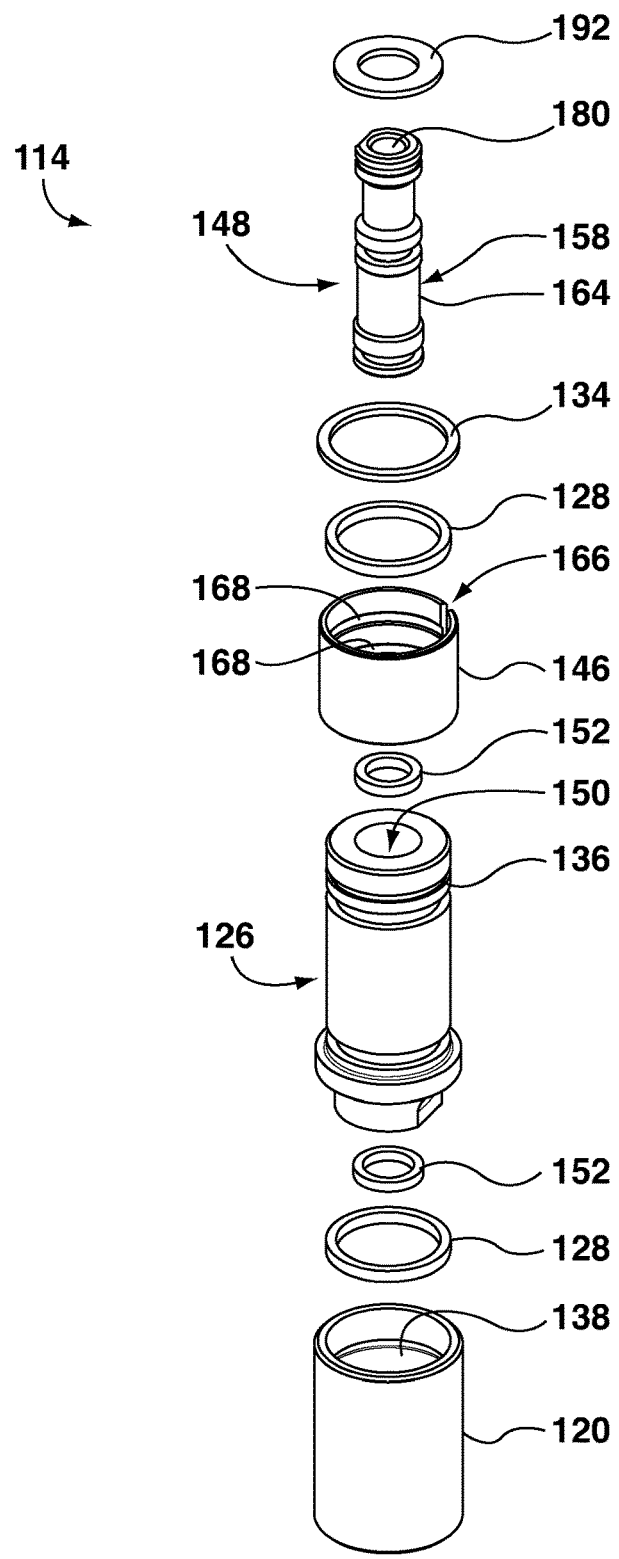
FIG. 4 is an exploded view of the brake of the telescopic bicycle seat post system of FIG. 1A.
Figure 5:
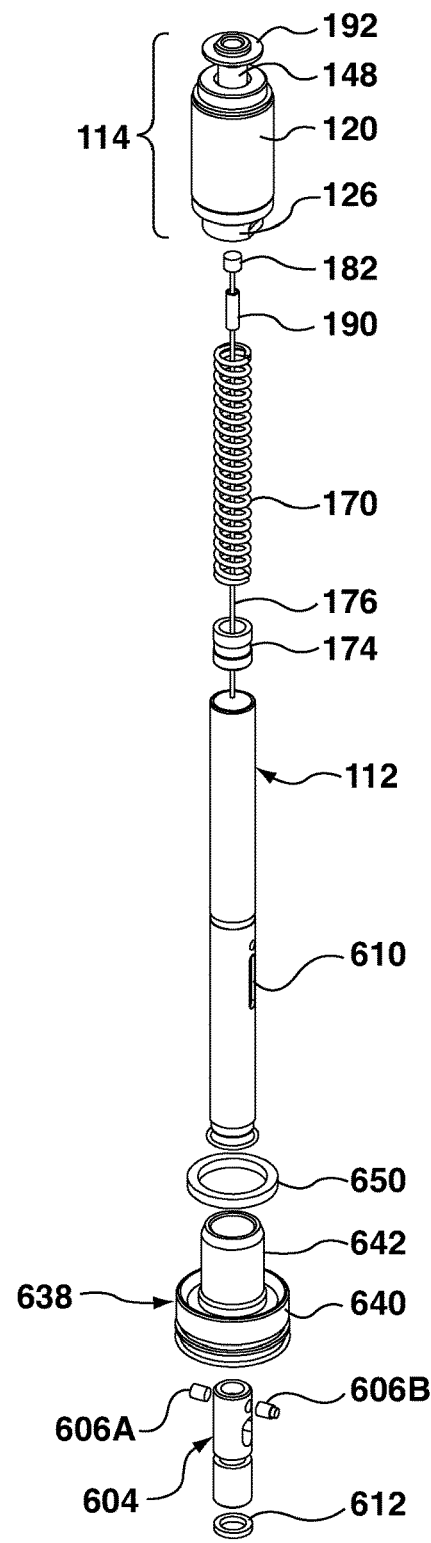
FIG. 5 is an exploded view of certain components of the telescopic bicycle seat post system of FIG. 1A, with the brake shown as an assembled unit.

FIG. 4 is an exploded view of the brake 114, and FIG. 5 is an exploded view showing the brake 114, as an assembled unit, together with the seat post actuator cable 176, spring bulkhead 174, support post 112 and certain other components described further below.

The exemplary brake 114 described above is merely one exemplary implementation of a brake constructed according to the principles of the present disclosure. Another exemplary implementation of a brake constructed according to the principles of the present disclosure will be described further below.

More generally, there is described herein a method for releasably locking a telescoping inner tube in a desired telescopic position relative to an outer tube. The method comprises moving the inner tube axially between the outer tube and a support to place the inner tube in the desired telescopic position relative to the outer tube and the support, with the inner tube, outer tube and support post being arranged concentrically with one another. Once the inner tube is in the desired telescopic position, radial force, that is, force directed radially outwardly, is applied between the support and the longitudinal inner surface of the inner tube. The radial force generates a frictional force acting on the longitudinal inner surface of the inner tube, and this frictional force resists longitudinal movement of the telescoping tube relative to the support. In the exemplary brake 114, the radial force is applied hydraulically; in other embodiments of the method, the radial force may be applied pneumatically, mechanically or magnetically, or by some combination hydraulic, pneumatic, mechanical and or magnetic arrangements.

Longitudinal movement of the telescoping tube relative to the support is resisted by frictional force, and not by mechanical obstruction where one element extends into or across the path of motion of another element so as to obstruct that motion. For example, if a radially outwardly extending detent were removably received in a corresponding slot cut into the inside of the inner tube to resist longitudinal movement of the inner tube, this would be an example of resistance by mechanical obstruction. The terms "frictional engagement", "frictional force" and related terms, as used herein, do not encompass resistance by mechanical obstruction.

The exemplary brake 114 uses a single braking element, namely the resiliently deformable annular sleeve 120, which has a single friction surface, namely the external surface 122 of the annular sleeve 120. It is contemplated that in other embodiments, there may be a plurality of braking elements, each having one or more friction surfaces, or that a single friction element may have a plurality of distinct friction surfaces. Moreover, while the exemplary brake 114 uses hydraulic pressure to move the braking element into the braking configuration, it is also contemplated that a variety of different mechanisms could be used to drive the friction surface(s) of the braking element(s) outwardly against and the inner surface of the inner tube to resist sliding thereof and to withdraw the friction surface(s) to permit sliding of the inner surface of the inner tube past the friction surface(s).

The present disclosure also contemplates a connection arrangement for repeatedly connecting and disconnecting a lockable seat post telescoping assembly to and from a bicycle actuator cable. The connection arrangement can be used with a seat post telescoping assembly that includes an outer tube and an inner tube telescopically received in the outer tube as well as a locking mechanism having a tension-controlled actuator. The locking mechanism may be of any suitable type, and acts, directly or indirectly, between the outer tube and the inner tube to releasably lock the inner tube in a desired telescopic position relative to the outer tube. The term "tension-controlled actuator", as used herein, refers to an actuator which, upon application of tension thereto, will move the locking mechanism between a locked and unlocked condition. Typically, the locking mechanism will remain in the locked condition to maintain the inner tube in a desired telescopic position relative to the outer tube, and application of tension to the tension-controlled actuator will move the locking mechanism into the unlocked condition. Thus, the telescopic position of the inner tube relative to the outer tube can be adjusted while tension is maintained on the tension-controlled actuator to keep the locking mechanism into the unlocked condition, and when the desired telescopic position is reached, the tension can be released so that the locking mechanism returns to the locked condition. The brake 114 described above is one illustrative example of a locking mechanism having a tension-controlled actuator, namely the seat post actuator cable 176: applying tension to the seat post actuator cable 176 moves the brake 114 from the braking configuration or locked condition shown in FIG. 3A to the telescoping configuration or unlocked condition shown in FIG. 3B.

A connection arrangement for repeatedly connecting and disconnecting a lockable seat post telescoping assembly to and from a bicycle actuator cable comprises an actuation connector coupled to the tension-controlled actuator and adapted to apply tension to the tension-controlled actuator, as well as a bicycle connector. The bicycle connector comprises a bicycle cable connector adapted for securing a bicycle actuator cable so as to maintain a fixed longitudinal position of the bicycle cable connector on the bicycle actuator cable. The actuation connector and the bicycle cable connector are removably repeatably interengageable with one another so that they can be connected to and disconnected from one another, and are constructed so that when the actuation connector and the bicycle cable connector are interengaged, tension applied to the bicycle cable connector by the bicycle actuator cable will be transmitted through the bicycle cable connector and the actuator connector so that the actuator will be subjected to tension. Since the bicycle cable connector has a fixed longitudinal position on the bicycle actuator cable, the longitudinal position of the bicycle actuator cable relative to the actuator will be maintained through repeated engagement and disengagement of the actuation connector and the bicycle cable connector.

The exemplary connection assembly 116 noted above will now be described by way of example; this is merely one example of a connection arrangement that can be implemented according to the above principle and other implementations will be within the capability of one skilled in the art once informed by the present disclosure.

The brake 114 described above is a locking mechanism having a tension-controlled actuator, namely the seat post actuator cable 176, and hence is an example of a locking mechanism with which a connection arrangement as described above can be used. It is to be understood that the brake 114 is merely used as one illustrative example of such a locking mechanism. Connection arrangements as described herein are not limited to use with the brake 114, and can be used with any suitable locking mechanism having a tension-controlled actuator.

Figure 6:
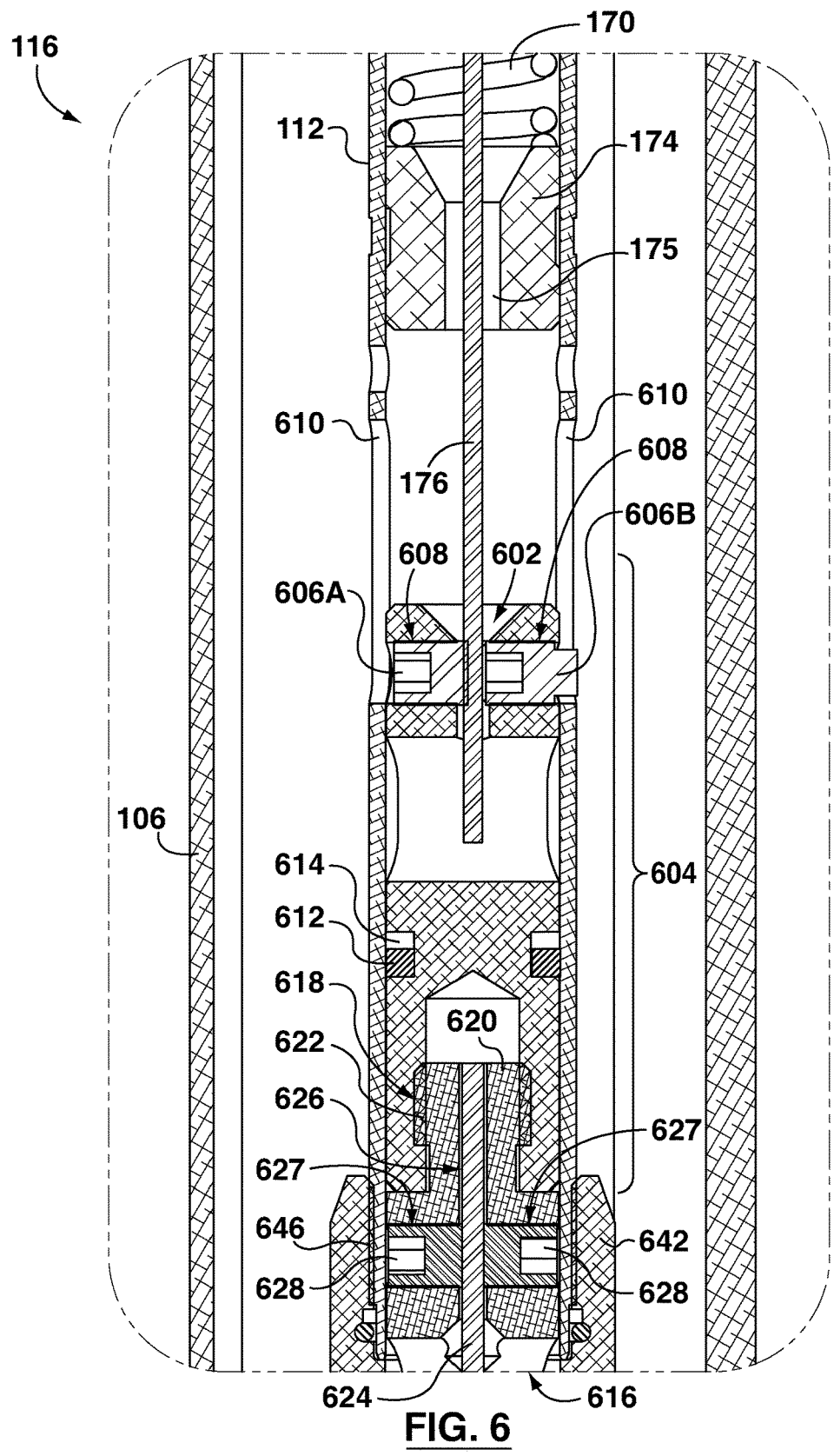
FIG. 6 is a detail view of a portion of FIG. 2B.

Referring now to FIG. 6, the tension-controlled actuator, that is, the seat post actuator cable 176, extends inferiorly through the hollow support post 112 through a cable aperture 175 defined through the spring bulkhead 174. The seat post actuator cable 176 extends through and beyond the spring bulkhead 174 into a cable passage 602 in the superior end of the actuation connector 604, which is longitudinally movable within the hollow support post 112. In the illustrated embodiment, the actuation connector 604 is slidably received inside the support post 112 for reciprocal movement along the support post 112. As explained above, the seat post actuator cable 176 is coupled at one end thereof to the brake 114, in particular to the piston 148, and is adapted for selectively actuating the brake 114 by moving it from the braking configuration to the telescoping configuration. The other end of the seat post actuator cable 176, that is, the end that extends inferiorly through the hollow support post 112 through and beyond the spring bulkhead 174, is secured to the actuation connector 604 so that the longitudinal position of the actuation connector 604 on the seat post actuator cable 176 is fixed. In the illustrated embodiment, set-screws 606A, 606B are threaded into opposed threaded crossbores 608 in the actuation connector 604, with the crossbores 608 arranged substantially normally to the cable passage 602, so that the seat post actuator cable 176 is trapped between the opposed set-screws 606A, 606B. This maintains a fixed position of the actuation connector 604 on the seat post actuator cable 176. Opposed guide slots 610 are formed in the hollow support post 112, and one of the set-screws 606B extends outwardly into one of the guide slots 610, with the set-screw 606B and the guide slot 610 cooperating to inhibit rotation of the actuation connector 604 within the support post 112. Other methods for securing the seat post actuator cable to the actuation connector, as well as other methods for inhibiting rotation of the actuation connector within the support post, may also be used. An annular seal 612 is disposed in an annular groove 614 on the actuation connector 604, inferiorly of the crossbores 608.

Since the actuation connector 604 is slidably received inside the support post 112, when a force is applied to the actuation connector 604 to move the actuation connector 604 inferiorly within the support post 112, the actuation connector 604 will apply tension to the seat post actuator cable 176, which will in turn pull the piston 148 from the braking position to the telescoping position and thus move the brake 114 from the braking configuration to the telescoping position, as shown in FIGS. 3A and 3B. When the force is removed from the actuation connector 604, the piston 148 will return to the braking position under urging from the spring 170, applying tension to the seat post actuator cable 176 which in turn pulls the actuation connector 604 superiorly within the support post 112.

In order to apply force to the actuation connector 604 so as to move the actuation connector 604 inferiorly within the support post 112 and thereby move the brake 114 from the braking configuration to the telescoping position, the actuation connector 604 is removably repeatably interengageable with a bicycle cable connector 616. Only the superior end of the bicycle cable connector 616 is shown in FIG. 6; the complete bicycle cable connector is shown in FIGS. 7A to 9. In the illustrated embodiment, the actuation connector 604 has a threaded receptacle 618 at its inferior end which threadedly receives a correspondingly threaded connection head 620 at the superior end of the bicycle cable connector 616. Thus, when the actuation connector 604 and the bicycle cable connector 616 are interengaged by way of their respective interengaged threads 622, the bicycle cable connector 616 is coupled to the seat post actuator cable 176 by the actuation connector 604. As a result, tension applied to the bicycle cable connector 616 acts on the actuator, that is, the seat post actuator cable 176, through the actuator connector 604. The rotation resistance resulting from cooperation between the set-screw 606B and the guide slot 610 facilitates threaded engagement and disengagement of the actuation connector 604 and the bicycle cable connector 616.

Although in the illustrated embodiment the actuation connector 604 and the bicycle cable connector 616 are threadedly removably interengageable with one another, any suitable method of repeatable removable interengagement may be used, including bayonet mounts, ball lock connection or suitable pinned, hooked or clipped connections.

In order to apply force to the bicycle cable connector 616 and thereby move the actuation connector 604 inferiorly within the support post 112 so as to move the brake 114 from the braking configuration to the telescoping position, the bicycle cable connector 616 securely receives a bicycle actuator cable 624 so as to maintain a fixed longitudinal position of the bicycle cable connector 616 on the bicycle actuator cable 624. In the illustrated embodiment, the bicycle cable connector 616 is secured to the bicycle actuator cable 624 in a manner similar to that in which the actuation connector 604 is secured to the seat post actuator cable 176. More particularly, the bicycle actuator cable 624 extends superiorly through the bicycle cable connector 616, through a sheath aperture 676 (FIGS. 7A to 8B) in the inferior end of the bicycle cable connector 616 and into a cable passage 626 in the superior end of the bicycle cable connector 616, 654. Opposed threaded crossbores 627 are formed in the superior end of the bicycle cable connector 616, extending substantially normally to and intersecting the cable passage 626. Opposed set screws 628 are threaded into the opposed threaded crossbores 627 so as to trap the bicycle actuator cable 624 between the opposed set-screws 628 and thereby maintain a fixed longitudinal position of the bicycle cable connector 616 on the bicycle actuator cable 624.

As noted above, the bicycle cable connector 616 maintains a fixed longitudinal position on the bicycle actuator cable 624 and the actuation connector 604 maintains a fixed position on the seat post actuator cable 176. Since the actuation connector 604 and the bicycle cable connector 616 will have a repeatable, fixed longitudinal relationship to one another when interengaged, e.g. fully threaded together, they will maintain the longitudinal position of the bicycle actuator cable 624 relative to the seat post actuator cable 176 through repeated engagement and disengagement.

In most bicycles having one or more bicycle actuator cables, the bicycle actuator cable(s) will be movably disposed within the lumen of a respective protective bicycle cable sheath so as to be longitudinally movable within the bicycle cable sheath. To accommodate this, as shown in FIGS. 7A to 9B, in the illustrated embodiment the bicycle cable connector 616 forms part of bicycle connector 630, which further comprises a bicycle cable sheath retainer 632 adapted for securing a bicycle cable sheath 634 surrounding the bicycle actuator cable 624.

Figure 7A:
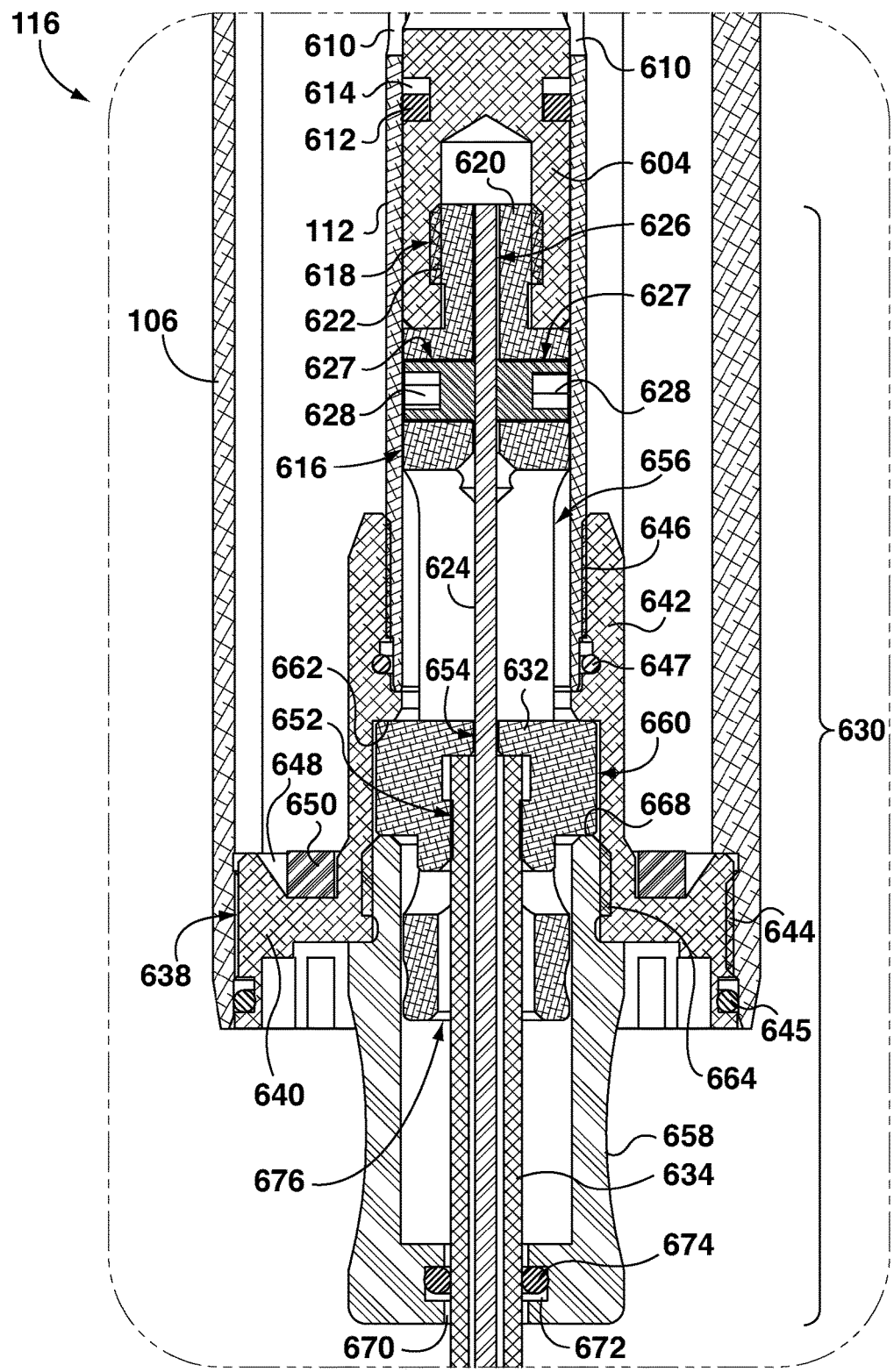
FIG. 7A is a detailed view of a portion of FIG. 2A, showing the configuration and position of a bicycle cable connector the telescopic bicycle seat post system of FIG. 1A when the brake is in the braking configuration.
Figure 7B:
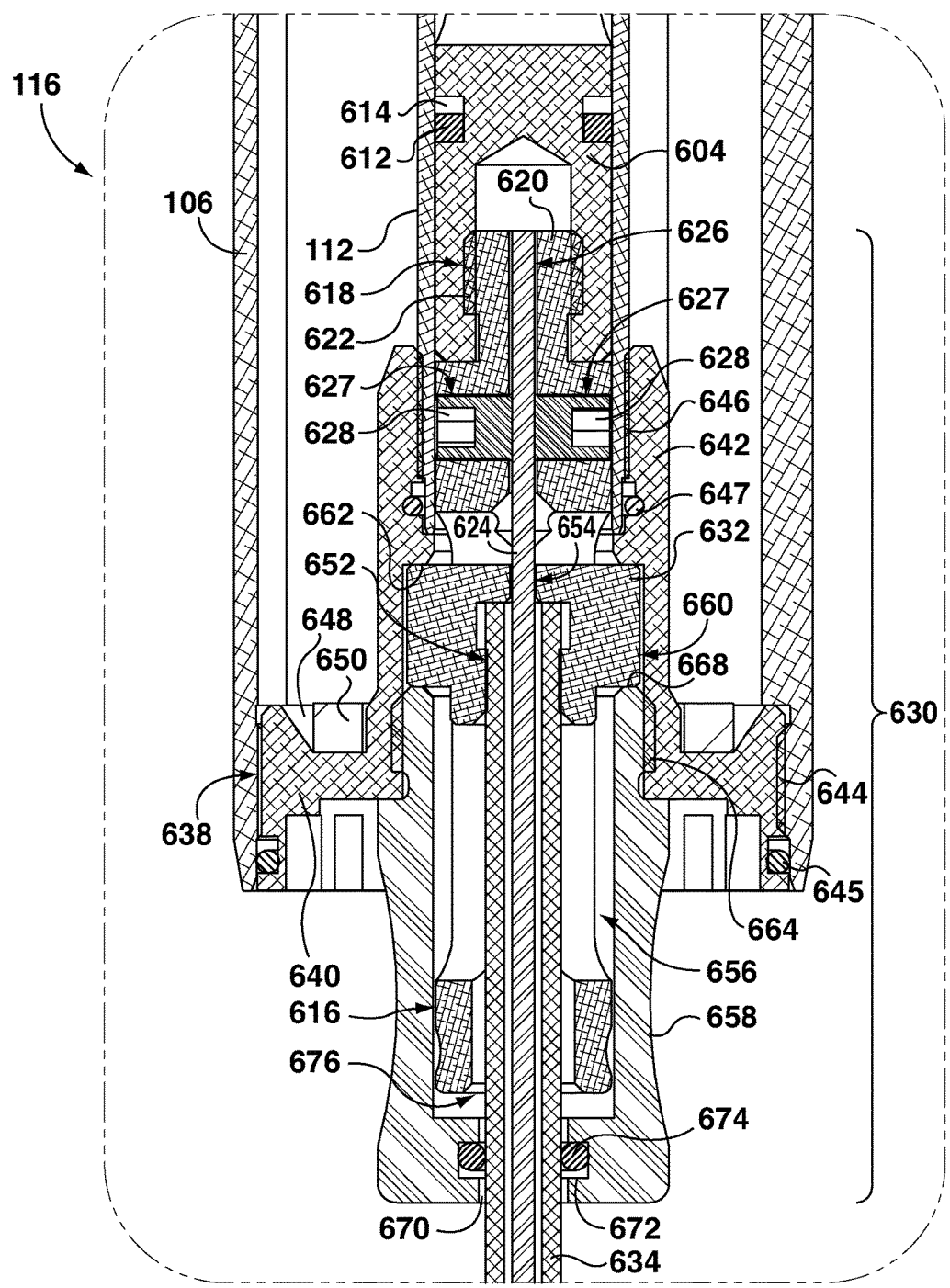
FIG. 7B is a detailed view of a portion of FIG. 2B, showing the configuration and position of the bicycle cable connector of the telescopic bicycle seat post system of FIG. 1A when the brake is in the telescoping configuration.
Figure 8A:
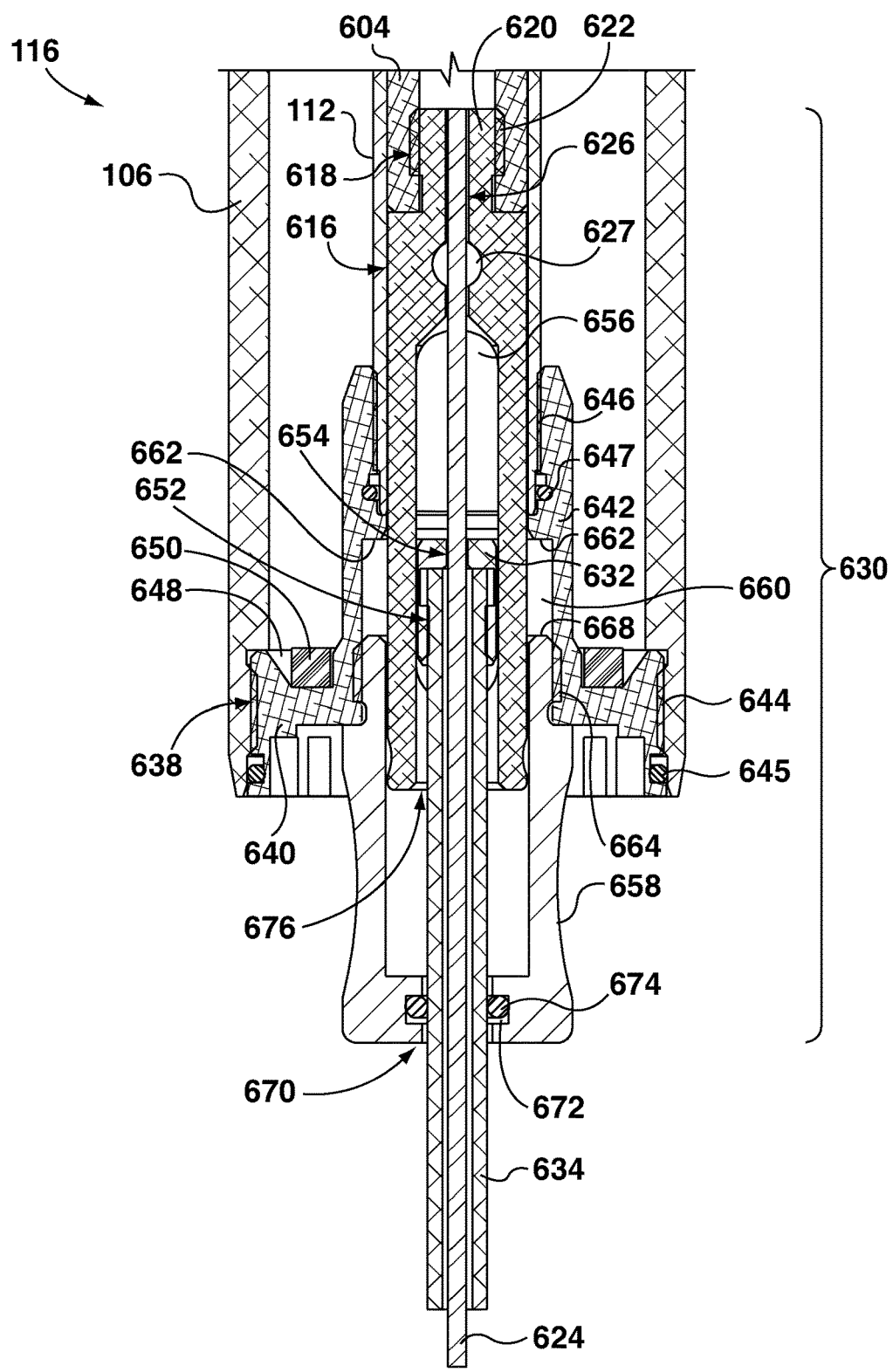
FIG. 8A is a cross-sectional view, normal to the view in FIG. 7A, showing the configuration and position of a bicycle cable connector of the telescopic bicycle seat post system of FIG. 1A when the brake is in the braking configuration.
Figure 8B:
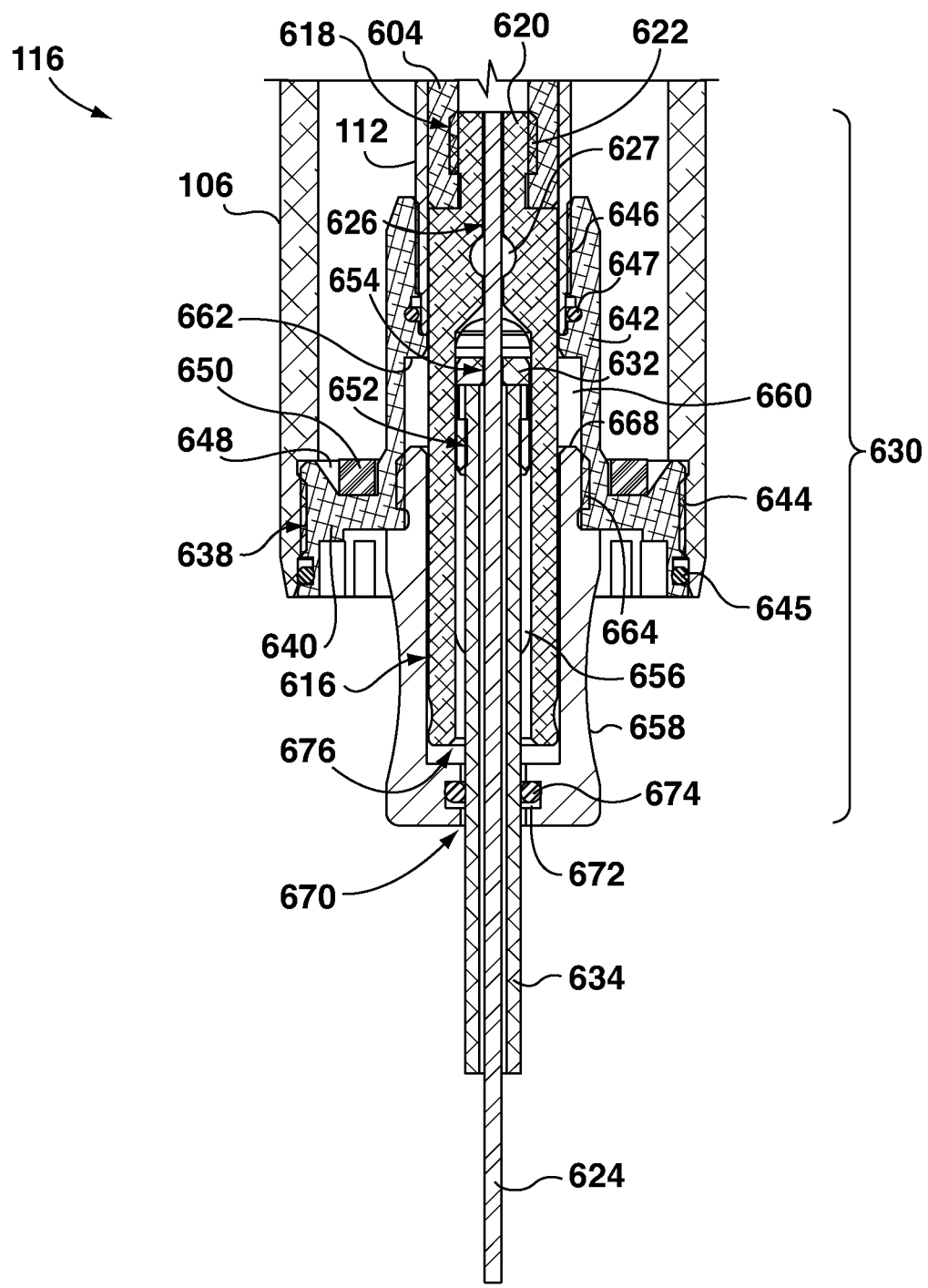
FIG. 8B is a cross-sectional view, normal to the view in FIG. 7B, showing the configuration and position of the bicycle cable connector of the telescopic bicycle seat post system of FIG. 1A when the brake is in the telescoping configuration.
Figure 9:
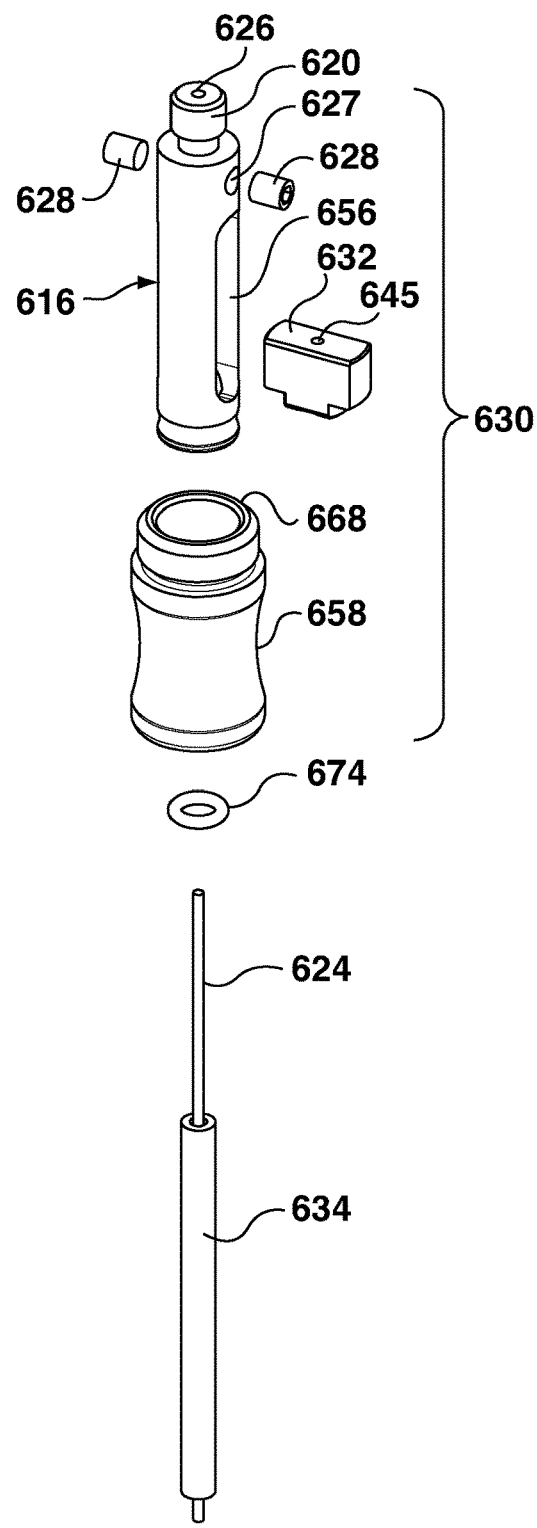
FIG. 9 is an exploded perspective view of a bicycle connector of the telescopic bicycle seat post system of FIG. 1A, also showing a bicycle cable sheath and bicycle actuator cable.

Reference is now made to FIGS. 7A to 9B, which show the complete bicycle connector 630. FIGS. 7A to 8B are cross-sectional views showing the complete bicycle connector 630 integrated into the exemplary seat post telescoping assembly 102. FIGS. 7A and 8A show the configuration and position of the bicycle cable connector 616 when the brake 114 is in the braking configuration and FIGS. 7B and 8B show the configuration and position of the bicycle cable connector 616 when the brake 114 is in the telescoping configuration. The cross-sectional views in FIGS. 8A and 8B are perpendicular to the cross-sectional views in FIGS. 7A and 7B. FIG. 9 is an exploded perspective view of the bicycle connector 630, bicycle cable sheath 634 and bicycle actuator cable 624 and FIGS. 9A and 9B are perspective views showing the bicycle connector 630, bicycle cable sheath 634 and bicycle actuator cable 624 in isolation. FIG. 9A shows the bicycle connector 630 in the same configuration as in FIGS. 7A and 8A, and FIG. 9B shows the bicycle connector 630 in the same configuration as in FIGS. 7B and 8B.

As can be seen in FIGS. 7A to 8B and also in FIG. 11, the support post 112 is fixedly coupled to the outer tube 106 by an end fitting 638. The end fitting 638 has an annular base portion 640 that is received in the inferior end of the outer tube 106 and an annular support portion 642 projecting superiorly of the base portion 640 and which receives the inferior end of the support post 112. The base portion 640 of the end fitting 638 is outwardly threaded and the inferior end of the outer tube 106 is internally threaded, so that the outer tube 106 may be secured to the end fitting 638 by interengaging threads 644, with an o-ring 645 serving as a seal. Similarly, the superior end of the support portion 642 of the end fitting 638 is internally threaded and the inferior end of the support post 112 is externally threaded so that the support post 112 may be secured to the end fitting 638 by interengaging threads 646, with an o-ring 647 serving as a seal. An annular groove 648 in the superior surface of the base portion 640 of the end fitting 638 receives an annular bumper 650 for supporting the inferior end of the inner tube 108.

The bicycle cable sheath retainer 632 has a sheath receptacle 652 formed in its interior surface to receive the end of the bicycle cable sheath 634, and the sheath receptacle 652 is internally threaded for this purpose. Thus, the end of the bicycle cable sheath 634 can be threaded into the sheath receptacle 652 so that the bicycle cable sheath 634 is securely retained by the bicycle cable sheath retainer 632.

Preferably, the bicycle cable sheath retainer 632 and the bicycle cable connector 616 are axially movable relative to one another. In the illustrated embodiment, the bicycle cable connector 616 has a longitudinally extending slot 656 defined therethrough in which the bicycle cable sheath retainer 632 is slidably received so that the bicycle cable sheath retainer 632 and the bicycle cable connector 616 can slide axially relative to one another. Since the bicycle cable sheath 634 is securely retained by the bicycle cable sheath retainer 632 and the set-screws 628 (FIGS. 7A and 7B) maintain a fixed longitudinal position of the bicycle cable connector 616 on the bicycle actuator cable 624, when the bicycle actuator cable 624 moves axially relative to the bicycle cable sheath 634, the bicycle cable connector 616 will slide axially relative to the bicycle cable sheath retainer 632.

A cable passage 654 extends through the superior portion of the bicycle cable sheath retainer 632, opening into the sheath receptacle 652. The cable passage 654 is sized to permit the bicycle actuator cable 624 to pass through the bicycle cable sheath retainer 632 with sufficient lateral clearance for the bicycle actuator cable 624 to move longitudinally relative to the bicycle cable sheath retainer 632. The bicycle actuator cable 624 extends superiorly through the cable passage 654 of the bicycle cable sheath retainer 632, into and through the slot 656 formed through the bicycle cable connector 616, and into the cable passage 626 disposed in the superior end of the bicycle cable connector 616, where bicycle actuator cable 624 is trapped by the set-screws 628.

In the illustrated embodiment, in addition to the bicycle cable sheath retainer 632 and the bicycle cable connector 616 being axially movable relative to one another, the bicycle cable connector 616 is also longitudinally movably received in the support post 112 for reciprocal movement along the support post 112; in the illustrated embodiment the cable connector 616 is slidably received in the support post 112. Moreover, the bicycle cable sheath retainer 632 is releasably secured to the seat post telescoping assembly 102 so as to be fixed relative to the support post 112. Thus, when the bicycle cable connector 616 slides along the support post 112, the bicycle cable connector 616 will also slide along the fixed bicycle cable sheath retainer 632 via the slot 656 and the bicycle actuator cable 624 will move axially along the bicycle cable sheath 634.

The exemplary bicycle connector 630 further comprises a removable end cap 658 which is releasably securable to the telescopic bicycle seat post assembly 102 at the inferior end thereof, which is the bicycle mounting end. A receptacle 660 is disposed at the bicycle mounting end of the seat post telescoping assembly 102 for receiving the bicycle cable sheath retainer 632. In the illustrated embodiment, the receptacle 660 is formed in the end fitting 638 and is defined by an annular shoulder 662 in the support portion 642 of the end fitting 638. The end cap 658 is externally threaded at its superior end, and the support portion 642 of the end fitting 638 is internally threaded, inferiorly of the receptacle 660, so that the end cap 658 can be secured to the end fitting 638 by way of interengaging threads 664. When the end cap 658 is secured to the end fitting 638 with the bicycle cable sheath retainer 632 disposed in the receptacle 660, the bicycle cable sheath retainer 632 is trapped in the receptacle by the end cap 658. In particular, the bicycle cable sheath retainer 632 is trapped between the annular shoulder 662 in the support portion 642 of the end fitting 638 and an opposed annular shoulder 668 at the superior end of the end cap 658. The end cap 658 has a sheath aperture 670 at its inferior end through which the bicycle cable sheath 634, and the bicycle actuator cable 624 contained therein, can pass. An annular groove 672 in the sheath aperture 670 receives an o-ring 674 that engages the exterior of the cable sheath 634.

The end cap 658 is hollow and the interior volume 670 thereof is sized to slidingly receive the inferior end of the bicycle cable connector 616. As indicated above, a sheath aperture 676 is formed through the inferior end of the bicycle cable connector 616, in communication with the slot 656 in the bicycle cable connector 616. The sheath aperture 676 in the bicycle cable connector 616 is sized so that its interior surface is spaced from the exterior surface of the bicycle cable sheath 634, enabling the bicycle cable connector 616 to reciprocate along the bicycle cable sheath 634 without touching it.

When the actuation connector 604 and the bicycle cable connector 616 are interengaged and the bicycle cable sheath retainer 632 is secured to the seat post telescoping assembly 102 (e.g. trapped in the receptacle 660) the actuation connector 604 and the bicycle cable connector 616 move in unison while the bicycle cable sheath retainer 632 remains fixed relative to the support post 112 and the outer tube 106. Thus, in the illustrated embodiment, the actuation connector 604 and the bicycle cable connector 616 slide together for reciprocal movement along the inside of the support post 112 while the cable sheath retainer 634 and the bicycle cable sheath 634 remain fixed relative to the support post 112. The inferior end of the bicycle cable connector reciprocates inside of the end cap 658 during such movement.

When the bicycle actuator cable 624 is moved inferiorly (e.g. by way of tension applied from a handlebar control), the bicycle cable connector 616 will also be pulled inferiorly since the bicycle actuator cable 624 is fixed to the bicycle cable connector 616. This in turn pulls the actuation connector 604 inferiorly, since the actuation connector 604 and the bicycle cable connector 616 are interengaged. Since the actuation connector 604 is fixed to the seat post actuator cable 176, the seat post actuator cable 176 will also be pulled inferiorly and, because the seat post actuator cable 176 is coupled to the piston 148, it will pull the piston 148 from the braking position to the telescoping position and thereby move the brake 114 from the braking configuration to the telescoping configuration. This allows the telescopic position of the inner tube 108 relative to the outer tube 106 to be adjusted. FIGS. 7B, 8B and 9B show the position of the bicycle cable connector 616 when the bicycle actuator cable 624 is moved inferiorly.

When the tension on the bicycle actuator cable 624 is released, the spring 170 (FIG. 6) returns the piston 148 to the braking position, which returns the brake 114 to the locking configuration to fix the telescopic position of the inner tube 108 relative to the outer tube 106. Since the seat post actuator cable 176 is coupled to the piston 148, the motion of the piston 148 applies tension to the seat post actuator cable 176, which in turn pulls the actuation connector 604 superiorly. Because the actuation connector 604 and the bicycle cable connector 616 are interengaged, the bicycle cable connector 616 also moves superiorly, thereby pulling the bicycle actuator cable 624 superiorly. Throughout this process, the bicycle cable sheath 634 remains fixed relative to the telescopic bicycle seat post assembly 102, held in place by the fixed bicycle cable sheath retainer 632.

Figure 10:
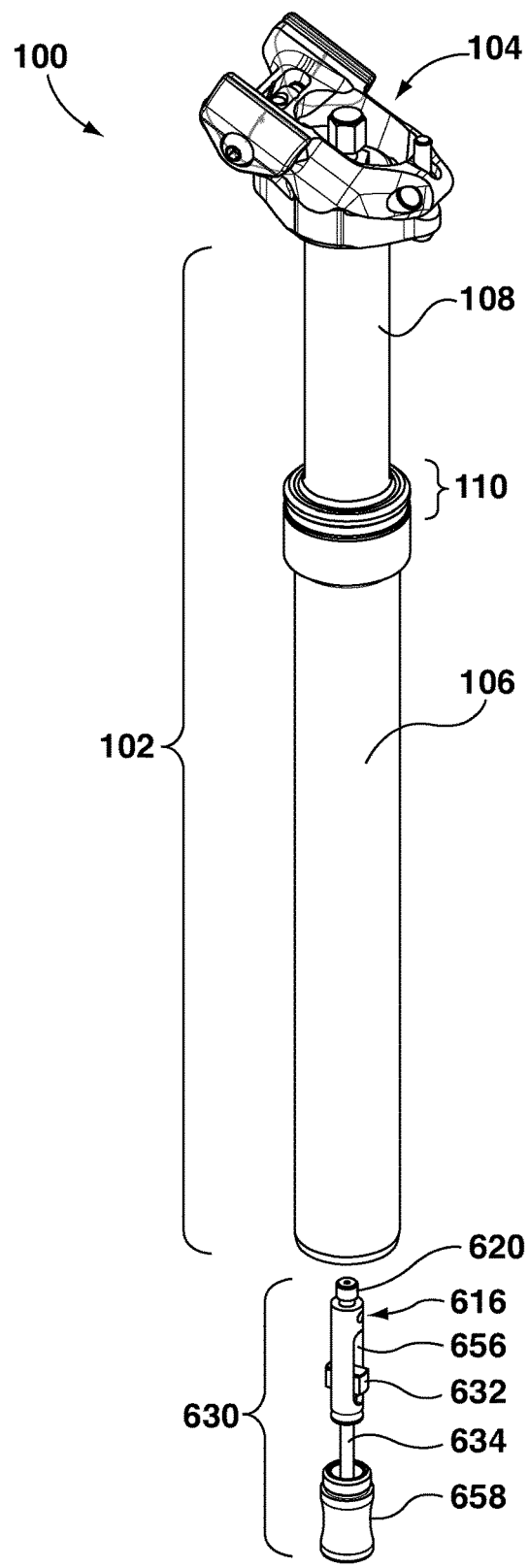
FIG. 10 is a perspective view showing the telescopic bicycle seat post system of FIG. 1A with the bicycle connector thereof separated from the telescopic bicycle seat post assembly thereof.

As noted above, the actuation connector 604 and the bicycle cable connector 616 are threadedly removably interengageable with one another and the end cap 658 is threaded to the end fitting 638. By unscrewing the end cap 658 from the end fitting 638 and then unscrewing the bicycle cable connector 616 from the actuation connector 604, the bicycle cable connector 616 can be withdrawn from the support tube 112, and the bicycle connector 630, comprising the bicycle cable connector 616, bicycle cable sheath retainer 632 and end cap 658, will then be separated from the telescopic bicycle seat post assembly 102, as shown in FIG. 10. Thus, when the actuation connector 604 and the bicycle cable connector 616 are disengaged from one another and the bicycle cable sheath retainer 632 is released from the seat post telescoping assembly 102, the bicycle connector 630 can be separated from the seat post telescoping assembly 102 to permit removal of the seat post telescoping assembly 102 from a bicycle (not shown) while the bicycle connector 630 remains coupled to the bicycle. To re-install the telescopic bicycle seat post assembly 102, the bicycle cable connector 616 is inserted back into the support post 112 and threaded back into engagement with the actuation connector 604, the bicycle cable sheath retainer 632 is placed in the receptacle 660 and the end cap 658 is threaded back into to the end fitting 638. Accordingly, the bicycle cable connector 616 is movably receivable in the support post 112 (since it can be repeatedly removed from and re-inserted into the support post 112) and the bicycle cable sheath retainer 632 is similarly releasably securable to the seat post telescoping assembly 102 since it can be repeatedly secured thereto and released therefrom.

Because the bicycle actuator cable 624 is coupled to the seat post actuator cable 176 via the bicycle cable connector 616 and the actuator connector 604, each of which has a fixed longitudinal position on the respective cable 624, 176, longitudinal alignment between the bicycle actuator cable 624 and the seat post actuator cable 176 will be maintained through repeated engagement and disengagement of the actuation connector 604 and the bicycle cable connector 616. Once the initial longitudinal alignment of the bicycle actuator cable 624 and the seat post actuator cable 176 has been effected, this alignment will be maintained as long as the bicycle cable connector 616 and the actuator connector 604 are fully threaded together each time they are interengaged. This avoids the need to adjust the longitudinal alignment of a bicycle actuator cable and a seat post actuator after each time that a telescopic seat post assembly is removed from a bicycle.

The exemplary connection arrangement 116 described above is merely one implementation of a method for maintaining the longitudinal alignment of a bicycle actuator cable with a seat post actuator by securing a bicycle cable connector at a fixed longitudinal position on a bicycle actuator cable and engaging and disengaging the bicycle cable connector to an actuator connector where the interengagement between the bicycle cable connector and the actuator connector is longitudinally consistent and repeatable. Other mechanical embodiments of the above method are within the capability of one skilled in the art, now informed by the present disclosure.

Figure 12:
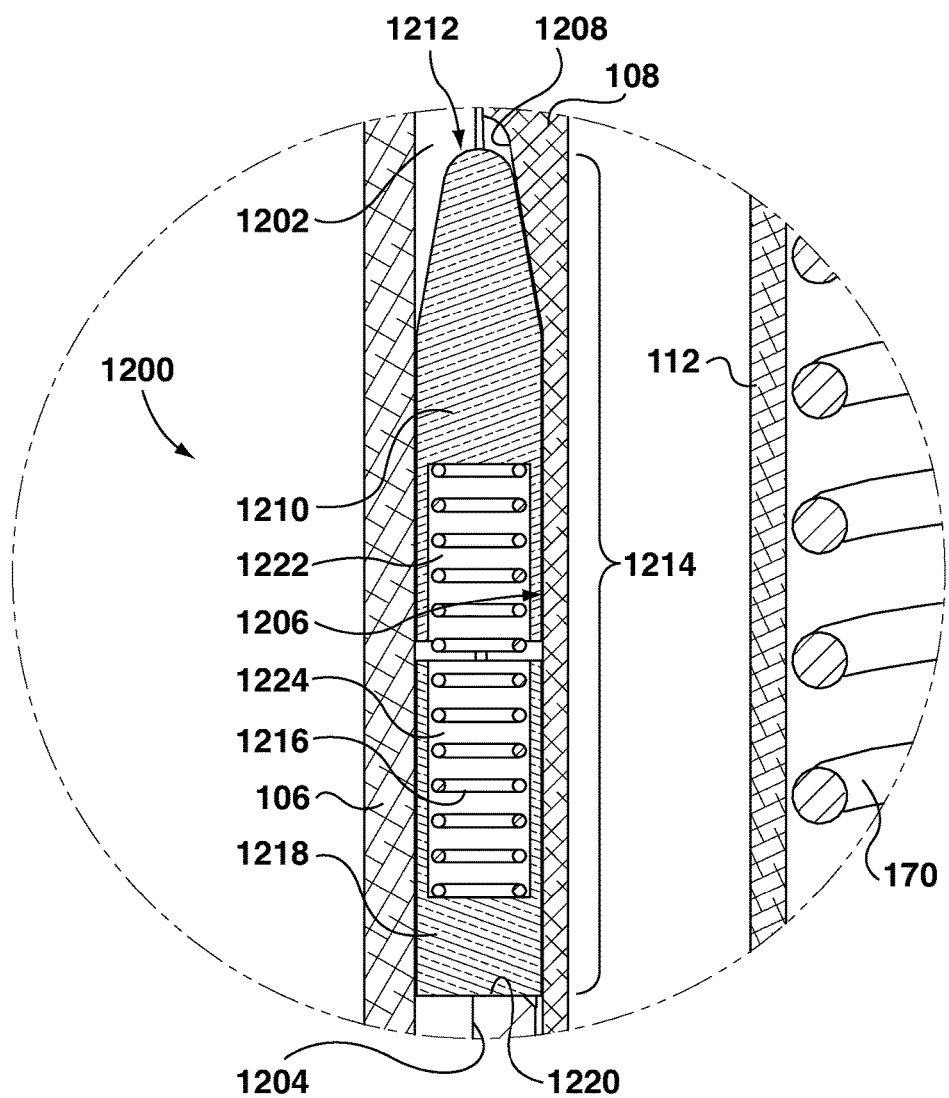
FIG. 12 is a detailed view of a portion of FIG. 2A, showing an exemplary rotation-resisting mechanism.
Figure 15:
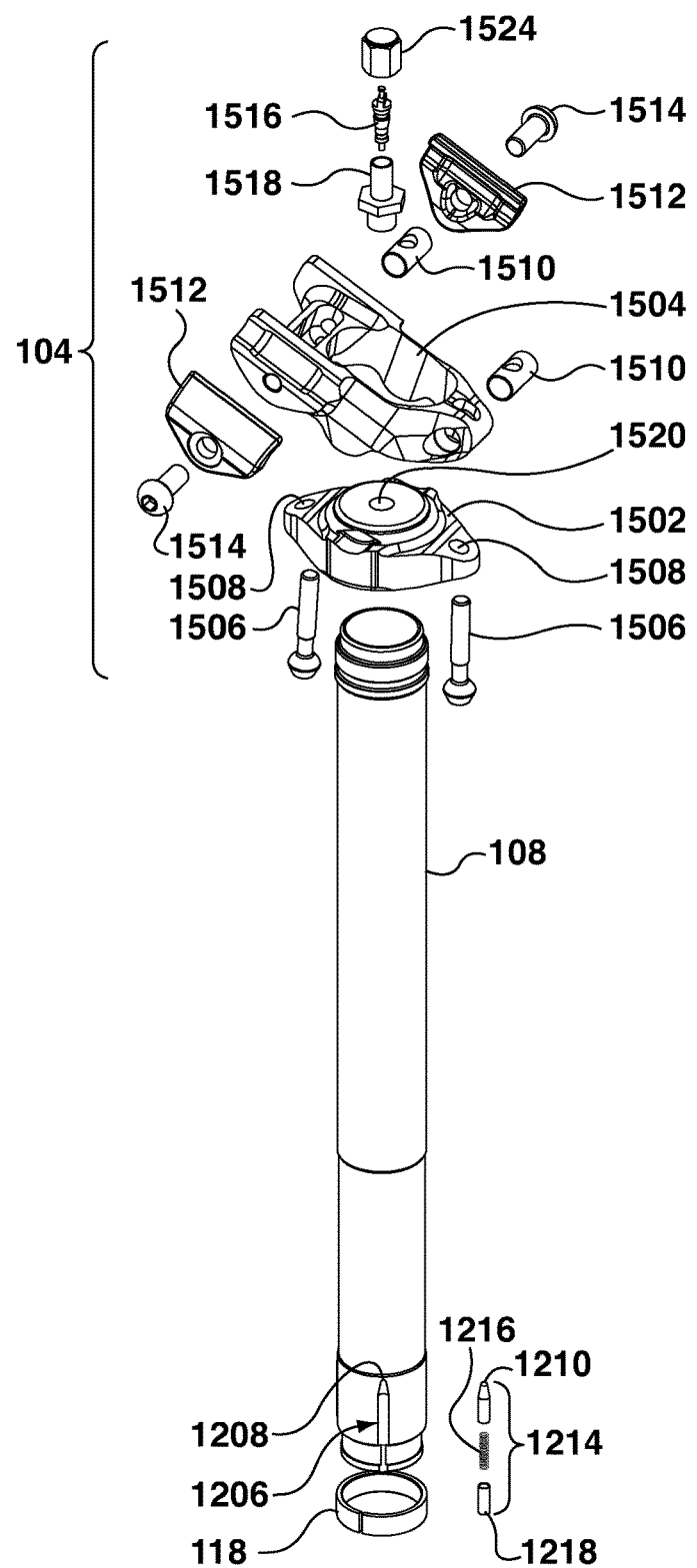
FIG. 15 is an exploded perspective view of a seat mount of the telescopic bicycle seat post system of FIG. 1A, also showing a portion of the rotation-resisting mechanism of FIG. 12.

Reference is now made to FIG. 12, which shows an exemplary rotation-resisting mechanism 1200; some components thereof are also shown in FIG. 15. The rotation resistance mechanism 1200 is as described in United States Patent Application Publication No. 2014-0174286-A1.

Referring specifically now to FIG. 12, in the exemplary illustrated embodiment, the outer tube 106 has a channel 1202 formed in its inner surface 1204 extending parallel to the direction of telescoping movement of the inner tube 108 relative to the outer tube 106, and the inner tube 108 has a receptacle 1206 formed in its outer surface. The channel 1202 and the receptacle 1206 are arranged in facing registration with one another to form a receptacle-channel pair. In other embodiments, the channel could be formed in the outer surface of the inner tube and the receptacle could be formed in the inner surface of the outer tube.

The receptacle 1206 includes a locking ramp 1208 that tapers toward the corresponding channel 1202, and a locking key 1210 is captured between the receptacle 1206 and the channel 1202. The locking key 1210 has a shape complementary to the shape of the locking ramp 1208 and complementary to the channel 1202. In the illustrated embodiment, as shown in FIG. 12, the locking key 1210 is generally cylindrical and has a positive rounded conical shape at a locking end 1212 thereof received by the locking ramp 1208, which has a negative rounded conical shape. The ramp need not be the precise negative shape of the locking end of the locking key. For example, a ramp used with the locking key 1210 may be a V-shaped groove of decreasing depth. The channel 1202 has a negative half-cylindrical shape, to which the generally cylindrical portion of the locking key 1210 is complementary.

In the illustrated embodiment, the locking key 1210 forms part of a locking pin 1214 captured between the receptacle 1206 and the channel 1202. The locking pin 1214 also includes a biasing member in the form of a spring 1216 and a cylindrical support member 1218 that engages a shoulder 1220 on the bushing 118. The spring 1216 is received in a first spring bore 1222 in the locking key and in a second spring bore 1224 in the support member 1218, and acts between the support member 1218 and the locking key 1210. Since the support member 1218 engages the shoulder 1220 on the inner tube 108, the spring 1216 acts between the inner tube 108 and the locking key 1210 to urge the locking key 1210 along the tapered locking ramp 1208 and into engagement with the channel 1202. The channel 1202 is longer than the locking pin 1214, and hence longer than the locking key 1210, to permit telescopic travel of the inner tube 108 relative to the outer tube 106.

When the inner tube 108 is static relative to the outer tube 108, i.e. when the brake 114 is in the braking configuration, as the spring 1216 urges the locking key 1210 along the locking ramp 1208, the locking ramp 1208 guides the locking end 1212 of the locking key 1210 toward the channel 1202 to maintain a tight engagement between the locking key 1210 and the channel 1202. This tight engagement between the locking key 1210 and the channel 1202 limits play between the locking key 1210 and the channel 1202 and, since the locking key 1210 is also securely received in the receptacle 1208, resists rotation of the inner tube 108 relative to the outer tube 106. When the inner tube 108 is telescoping relative to the outer tube 106, i.e. when the brake 114 is in the telescoping configuration, friction between the locking key 1210 and the channel 1202 can be relieved by compression of the spring 1216.

The locking pin 1214 shown in FIG. 12 is exemplary only, and other suitable shapes may be used so long as the channel, receptacle and locking ramp are of complementary shape.

Figure 13:
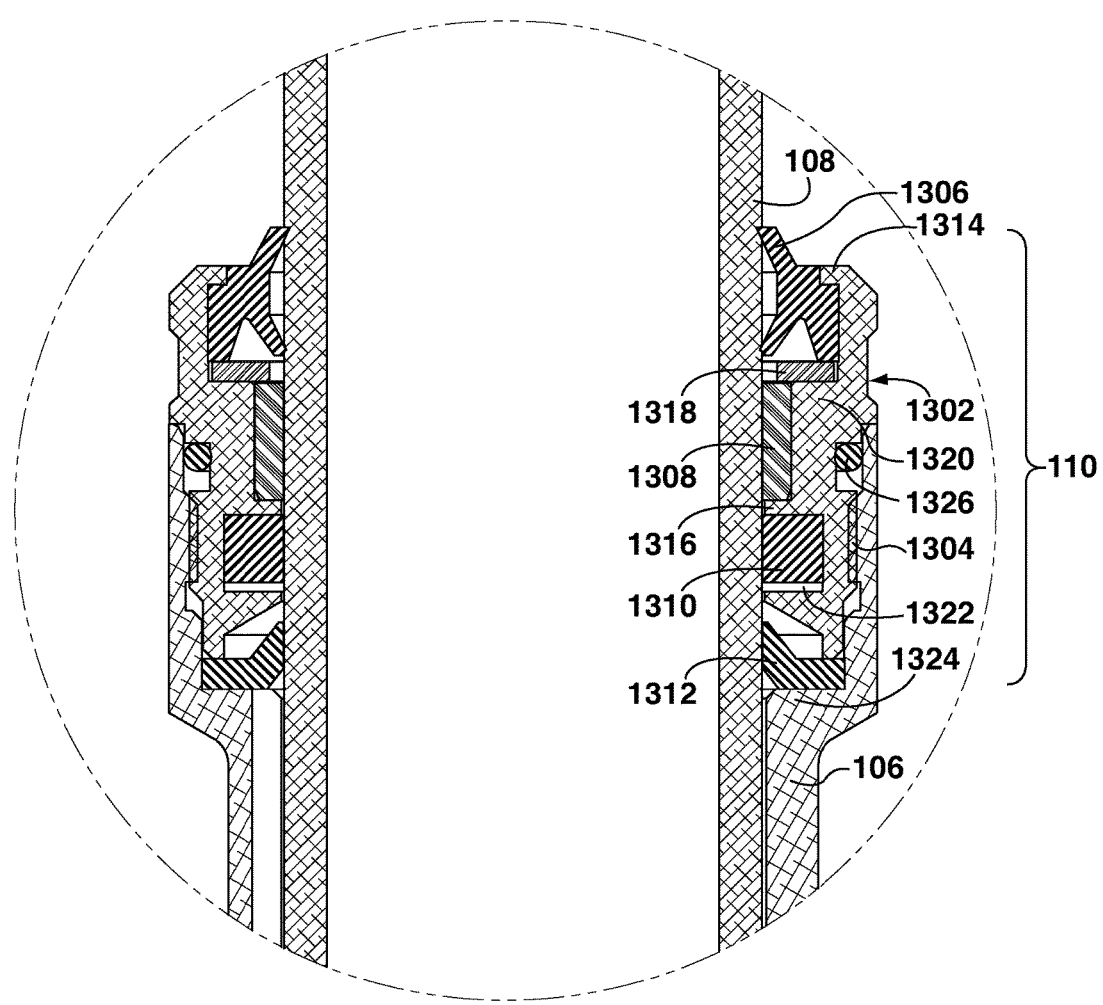
FIG. 13 is a detailed view of a portion of FIG. 2A, showing a seal assembly.
Figure 14:
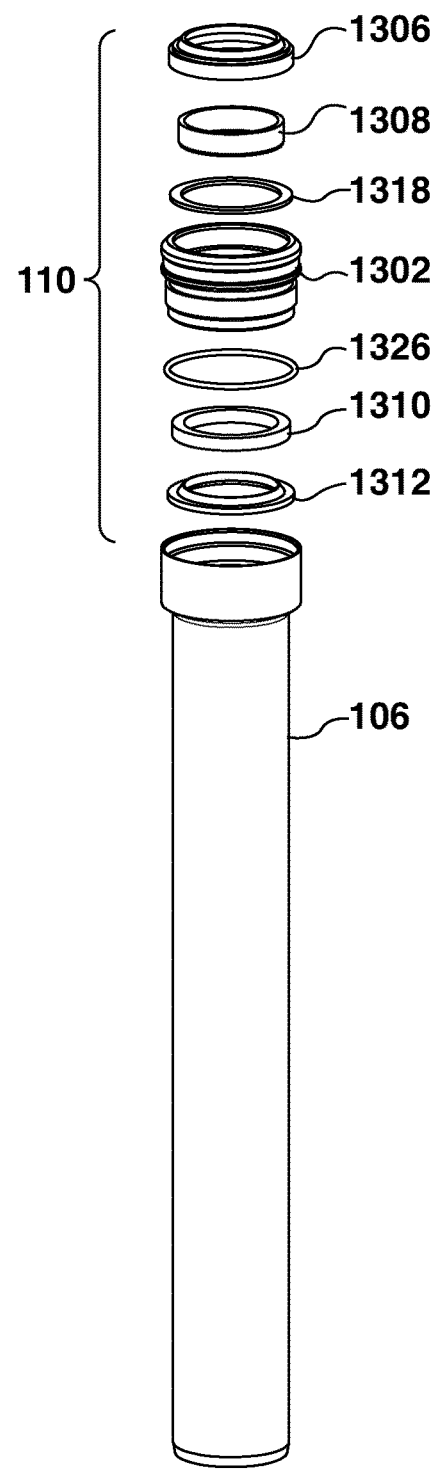
FIG. 14 is an exploded perspective view of the seal assembly of FIG. 13.

Reference is now made to FIGS. 13 and 14, which show the exemplary seal assembly 110 at the superior end of the outer tube 106 in more detail. The superior end of the outer tube 106 is enlarged outwardly and internally threaded, and receives an externally threaded annular seal nut 1302 by way of interengaging threads 1304. The seal nut 1302 carries a superior annular wiper 1306, a bushing 1308, a main air seal 1310 and an inferior annular wiper 1312. The superior annular wiper 1306 is held in place by an uppermost annular shoulder 1314 on the seal nut 1302, and the bushing 1308 is trapped between an inferior annular bushing shoulder 1316 and an annular bushing retainer 1318, which is in turn trapped between the superior annular wiper 1306 and a superior annular bushing shoulder 1320 on the seal nut 1302. The main air seal 1310 is received in an inwardly facing annular groove 1322 on the seal nut 1302, and the inferior annular wiper 1312 is trapped between the inferior end of the seal nut 1302 and an annular shoulder 1324 on the outer tube 106. An o-ring 1326 is interposed between the seal nut 1302 and the upper tube 106, superiorly of the interengaging threads 1304.

Figure 16:
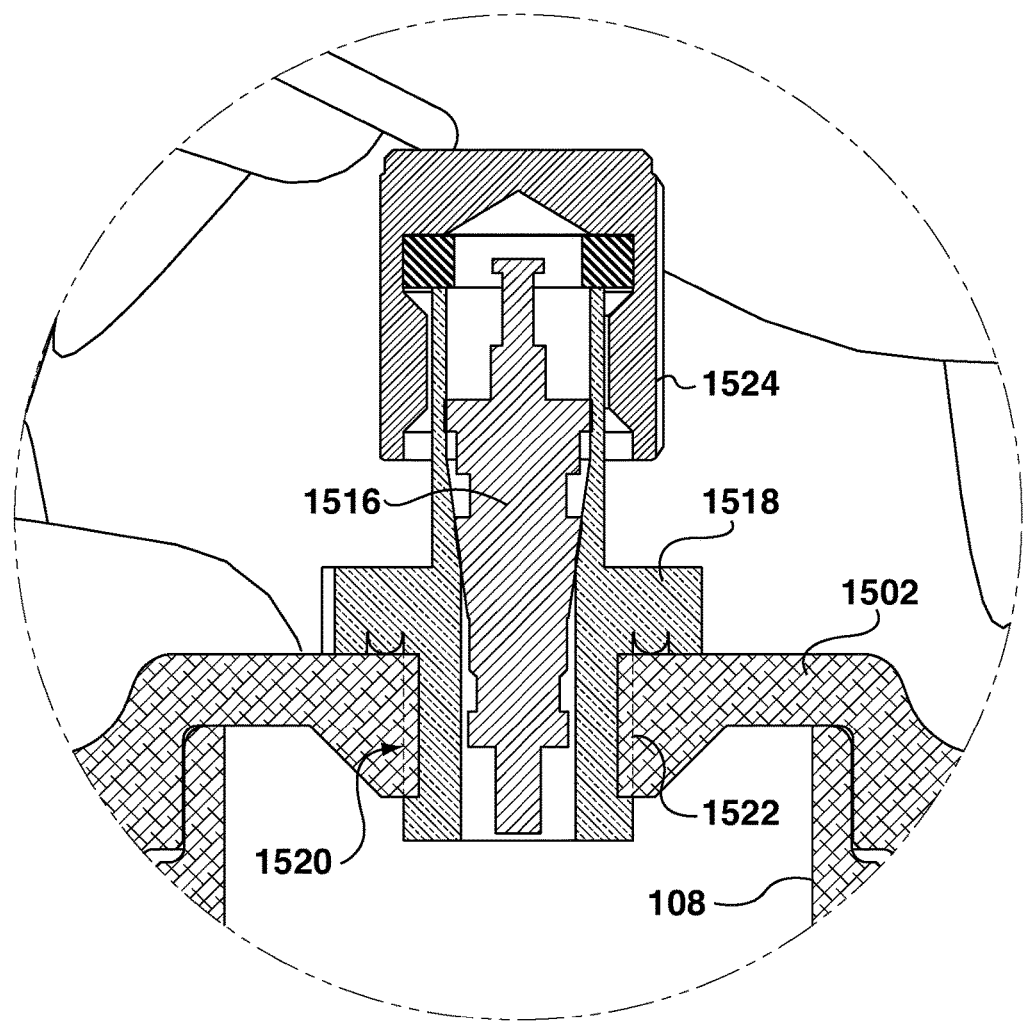
FIG. 16 is a detailed view of a portion of FIG. 2A, showing assembled positions of the air valve, valve housing and seat mount flange of the seat mount of FIG. 15.

As noted above, the seat mount 104 shown in the drawings is exemplary, and any conventional seat mount may be used. With reference now to FIG. 15, the exemplary seat mount 104 is described in more detail. The seat mount 104 comprises a seat mount flange 1502 which threads onto the superior end of the inner tube 108 and a seat mounting head 1504 carried by the seat mount flange 1502. Angle adjustment screws 1506 extend superiorly through corresponding threaded apertures 1508 in the seat mount flange 1502 and are received in corresponding threaded barrels 1510 in the seat mounting head 1504 to secure the seat mounting head 1504 on the seat mount flange 1502. Opposed ears 1512 are secured to the seat mounting head 1504 by ear bolts 1514. An air valve 1516 is received in an externally threaded valve housing 1518 that is threaded into an internally threaded valve aperture 1520 in the seat mount flange 1502 by way of interengaging threads 1522 (FIG. 16). The seat mount flange 1502 seals the superior end of the inner tube 108 in known manner, and the air valve 1516 allows air to be fed into or withdrawn from the interior volume of the seat post telescoping assembly 102. A valve cap 1524 for the valve housing 1518 is also provided. The assembled positions of the air valve 1516 and the valve housing 1518 relative to the seat mount flange 1502 are shown in FIG. 16; the air valve 1516 is conventional and hence it is shown as solid with internal details omitted.

As noted previously, the first exemplary brake 114 described above is merely one exemplary implementation of a brake constructed according to the principles of the present disclosure. A second exemplary implementation of a brake constructed according to the principles of the present disclosure will now be described by reference to FIGS. 17A to 32, in the context of a second exemplary telescopic bicycle seat post system 17100 incorporating that second exemplary brake. In general, in FIGS. 17A to 32, like reference numerals refer to features of the second exemplary telescopic bicycle seat post system 17100 that correspond or are analogous to features of the first exemplary telescopic bicycle seat post system 100, only with the additional prefix "17". Hence, the seat post telescoping assembly of the second exemplary telescopic bicycle seat post system 17100 is denoted by reference 17102, the seat mount of the second exemplary telescopic bicycle seat post system 17100 is denoted by reference 17104, and so on. Moreover, for the avoidance of duplication, where the functionality of aspects of the second exemplary telescopic bicycle seat post system 17100 does not differ substantially from the functionality of the corresponding aspects of the first exemplary telescopic bicycle seat post system 100, those aspects of the second exemplary telescopic bicycle seat post system 17100 may not be described in any detail. In this regard, for completeness of illustration, FIGS. 28 to 32 show aspects of the second exemplary telescopic bicycle seat post system 17100 not differing substantially from the corresponding aspects of the first exemplary telescopic bicycle seat post system 100. FIGS. 28 to 32 correspond generally to the views of the first exemplary telescopic bicycle seat post system 100 shown in FIGS. 12 to 16, respectively.

Figures 17A, 17B:
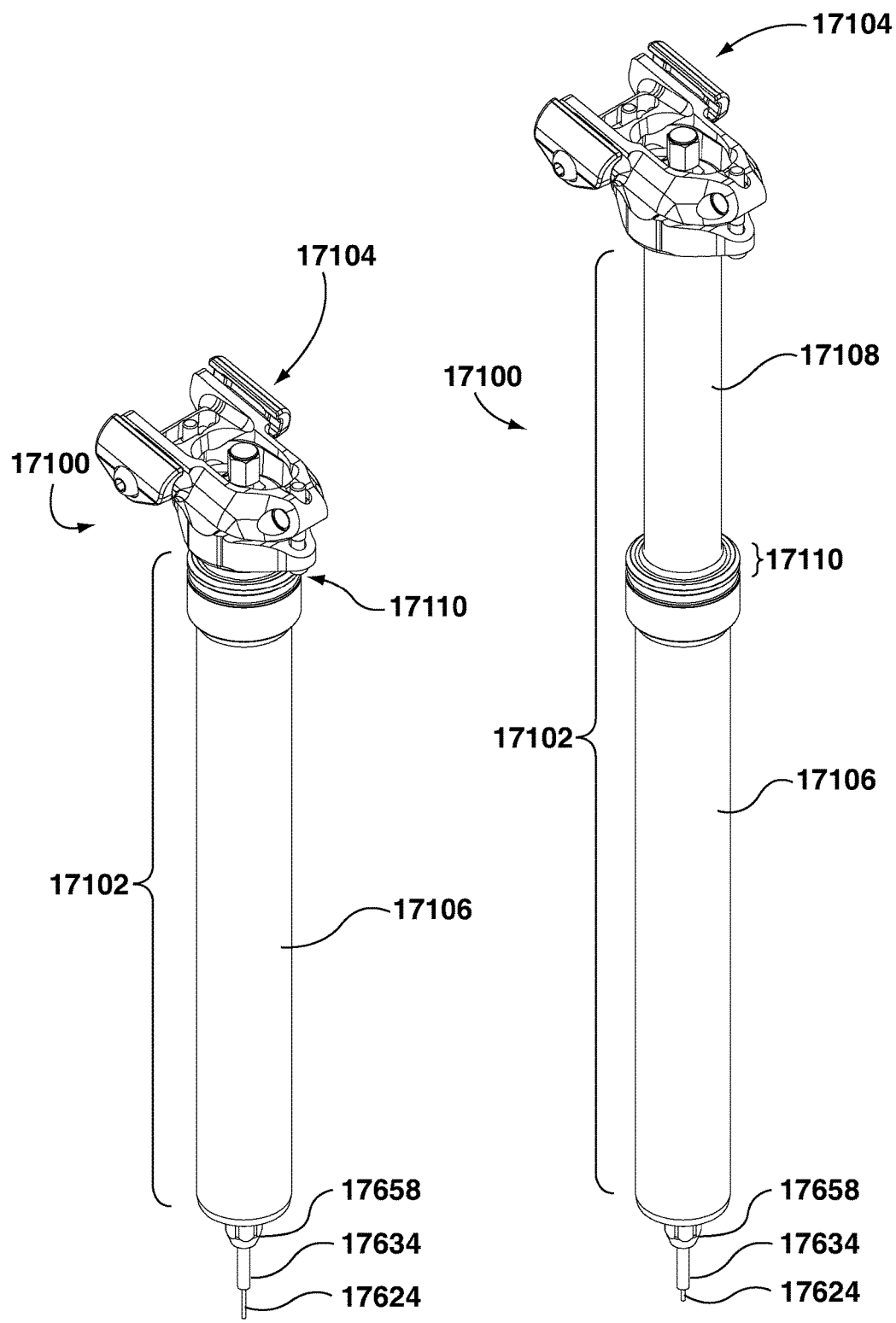
FIG. 17A is a top perspective view of a second exemplary telescopic bicycle seat post system, shown in a retracted configuration.
FIG. 17B is a top perspective view of the telescopic bicycle seat post system of FIG. 17A, shown in an extended configuration.

FIG. 17A shows the telescopic bicycle seat post system 17100 in a retracted configuration and FIG. 17B shows the telescopic bicycle seat post system 17100 in an extended configuration, analogously to FIGS. 1A and 1B. The seat post telescoping assembly 17102 comprises an outer tube 17106 and an inner tube 17108 telescopically received in the outer tube 17106, with a locking mechanism (not shown in FIGS. 17A and 17B) acting between the outer tube 17106 and the inner tube 17108 to releasably lock the inner tube 17108 in a desired telescopic position relative to the outer tube 17106.

Figures 18A, 18B:
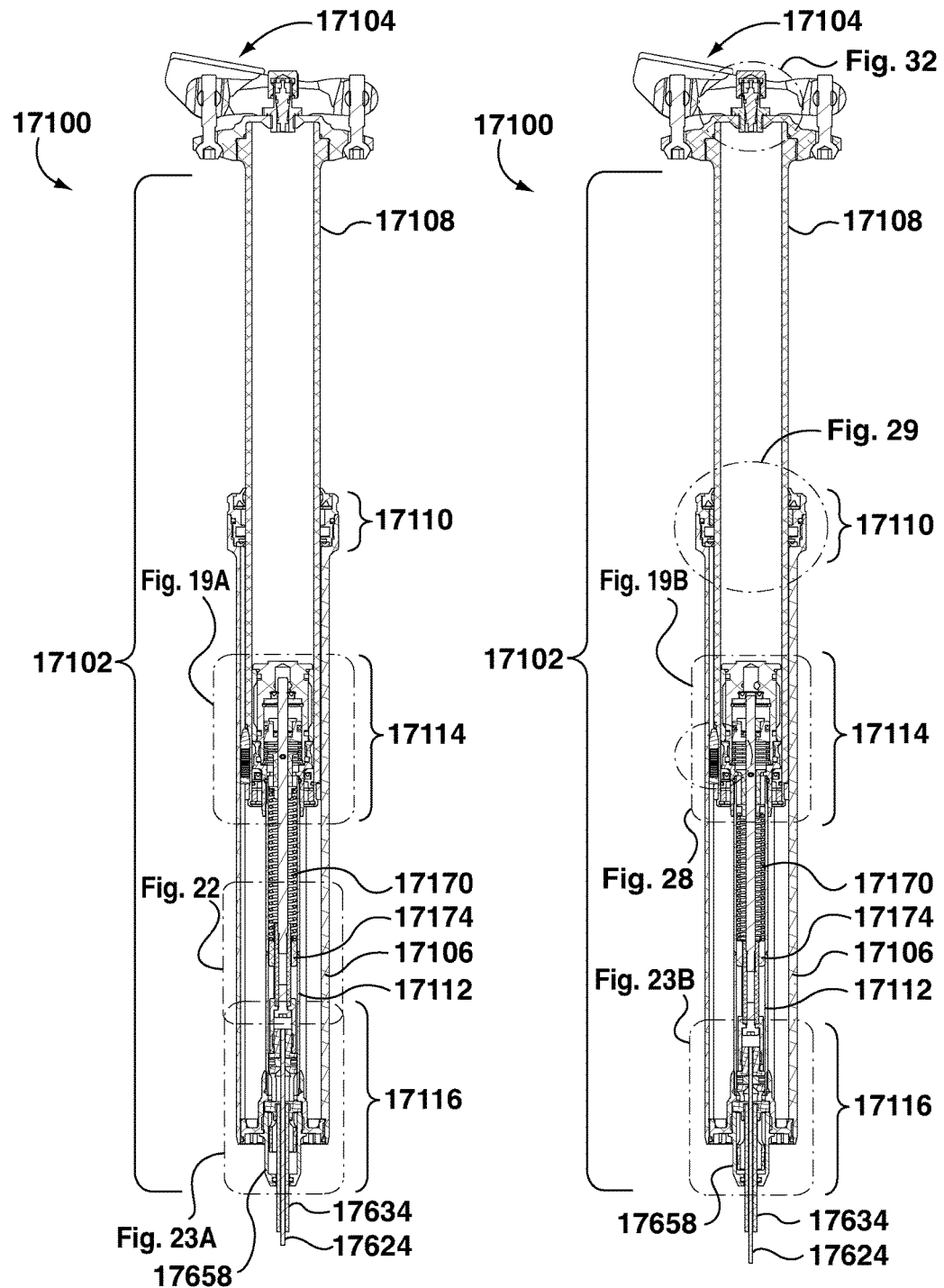
FIG. 18A is a side cross-sectional view of the telescopic bicycle seat post system of FIG. 17A in a braking configuration.
FIG. 18B is a side cross-sectional view of the telescopic bicycle seat post system of FIG. 17A in a telescoping configuration.

Referring now to the cross-sectional views in FIGS. 18A and 18B, a support post 17112 is disposed within the outer tube 17106 and fixedly coupled thereto, and the inner tube 17108 is telescopically received in the outer tube 17106 between the outer tube 17106 and the support post 17112. A locking mechanism comprising a brake 17114 carried by the support post 17112 releasably supports the inner tube 17108 on the support post 17112, thereby longitudinally fixing the inner tube 17108 in a desired telescopic position relative to the outer tube 17106. The support post 17112 and the outer tube 17106 are fixedly coupled to one another and therefore fixing the inner tube 17108 relative to the support post 17112 will also fix the inner tube 17108 relative to the outer tube 17106.

Still referring to FIGS. 18A and 18B, it can be seen that the telescopic bicycle seat post system 17100 further comprises a connection assembly 17116 for coupling the brake 17114 to a control cable on a bicycle, as will also be described further below.

Like the brake 114 in the first exemplary telescopic bicycle seat post system 100, the brake 17114 in the second exemplary telescopic bicycle seat post system 17100 comprises a braking element movable between a braking configuration, in which the braking element acts between the inner tube 17108 and the support post 17112 to support the inner tube 17108 on the support post 17112 and hence in a fixed telescopic position relative to the outer tube 17106, and a telescoping configuration in which the inner tube 17108 can telescope relative to the outer tube 17106. An actuator coupled to the braking element moves the braking element between the braking configuration and the telescoping configuration.

Figure 19A:
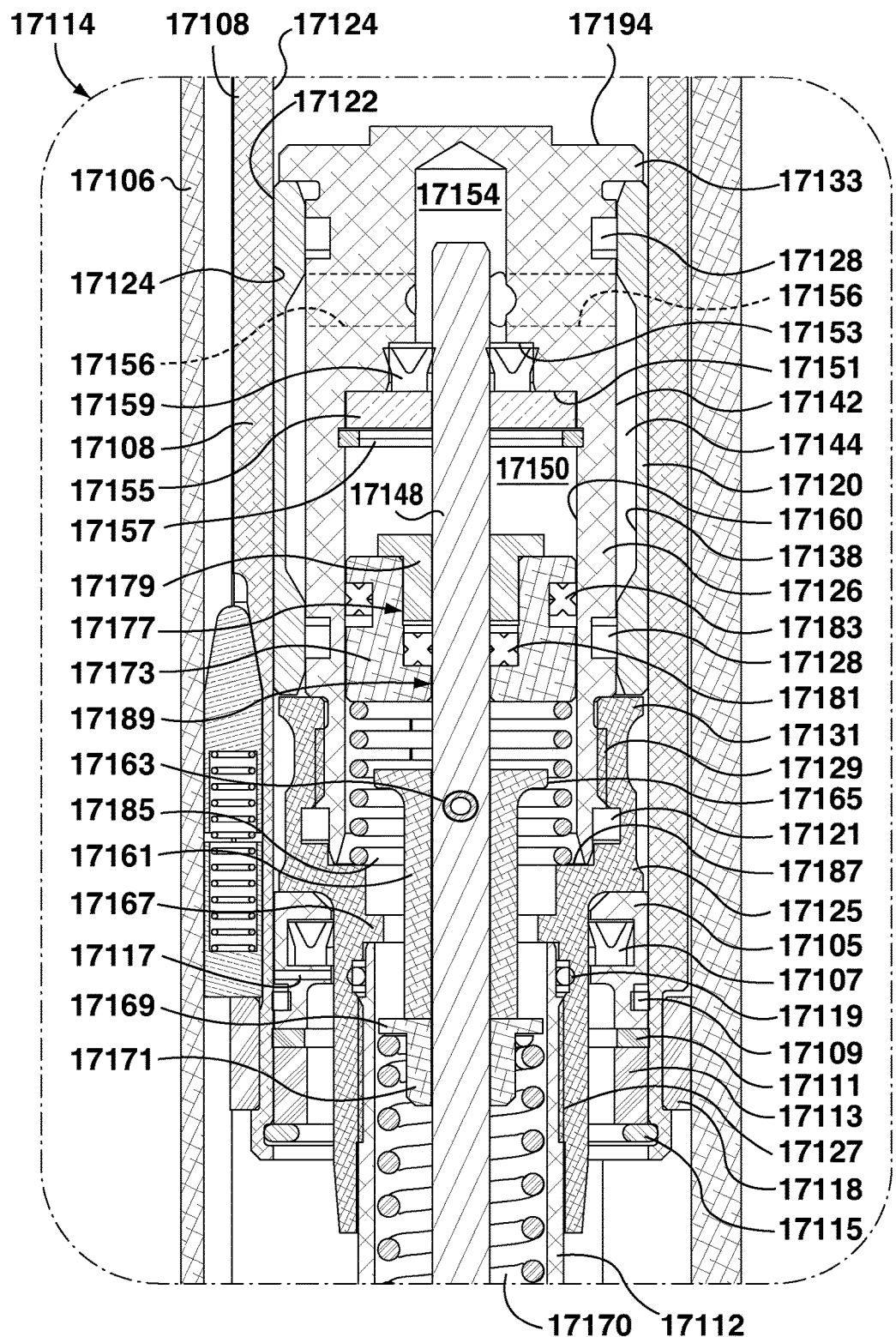
FIG. 19A is a detailed view of a portion of FIG. 18A, showing a brake of the telescopic bicycle seat post system of FIG. 17A in a braking configuration.
Figure 19B:
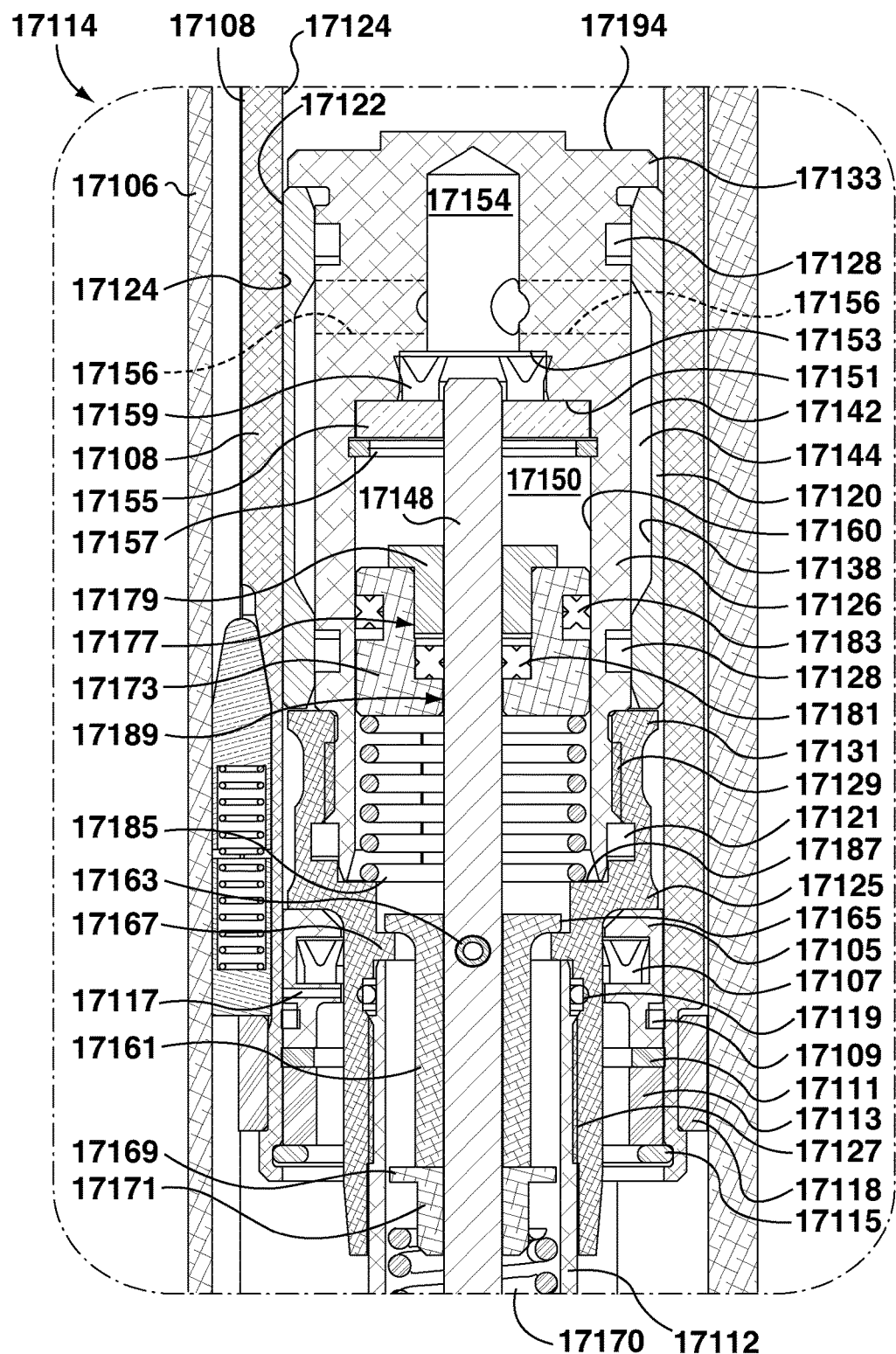
FIG. 19B is a detailed view of a portion of FIG. 18B, showing the brake of the telescopic bicycle seat post system of FIG. 17A in a telescoping configuration.
Figure 20:
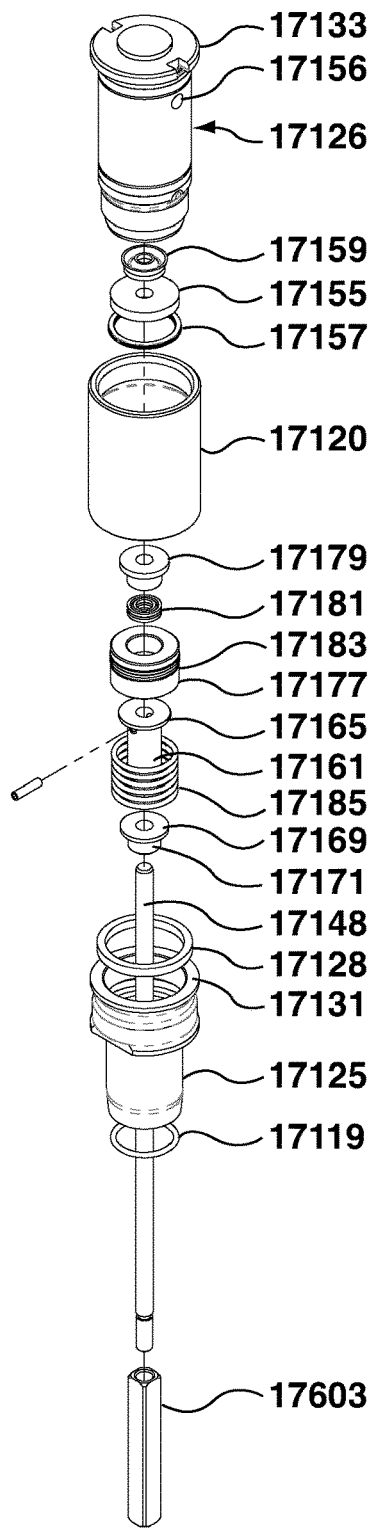
FIG. 20 is an exploded view of the brake of the telescopic bicycle seat post system of FIG. 17A.
Figure 21:
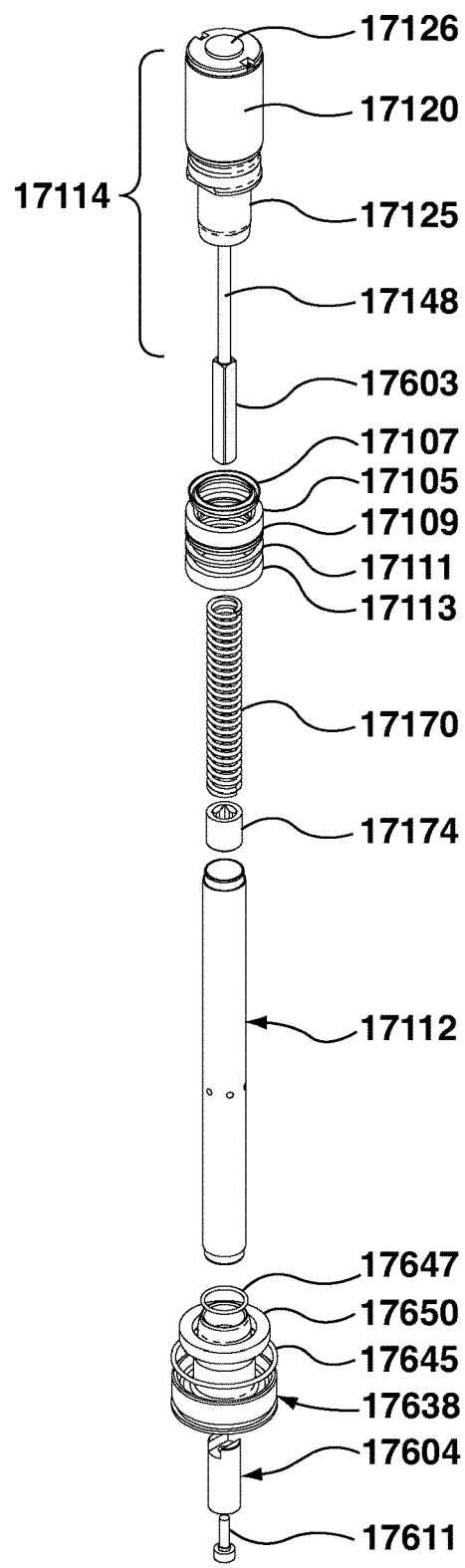
FIG. 21 is an exploded view of certain components of the telescopic bicycle seat post system of FIG. 17A, with the brake shown as an assembled unit.

FIGS. 19A and 19B show the brake 17114 in more detail, with FIG. 19A showing the brake 17114 in the braking configuration and FIG. 19B showing the brake 17114 in the telescoping configuration. Normally, the seat post telescoping assembly 17102 (FIGS. 17A and 17B) will be locked in a fixed telescopic position; accordingly in a preferred embodiment, the brake 17114 will be biased into the braking configuration shown in FIG. 19A.

Like the brake 114 in the first exemplary telescopic bicycle seat post system 100, in the brake 17114 in the second exemplary telescopic bicycle seat post system 17100 the braking element comprises a resiliently deformable annular sleeve 17120 carried by an annular brake support fitting 17126, and the external surface 17122 of the annular sleeve 17120 serves as a friction surface 17122 for frictionally engaging the inner surface 17124 of the inner tube 17108. As with the brake 114 in the first exemplary telescopic bicycle seat post system 100, in the brake 17114 the static coefficient of friction between the external surface 17122 of the annular sleeve 17120 and the inner surface 17124 of the inner tube 17108 is preferably at least 0.25 and more preferably at least 0.30, and the annular sleeve 17120 may be formed from polyphenylsulfone (PPSU).

The structure of the brake 17114 in the second exemplary telescopic bicycle seat post system 17100 differs from the structure of the brake 114 in the first exemplary telescopic bicycle seat post system 100, as will be described below.

The annular brake support fitting 17126 is fixedly carried by the support post 17112. In the illustrated embodiment, the superior end of the support post 17112 is externally threaded and threadedly receives a cap 17125 that is inferiorly threaded at its inferior end by way of interengaged threads 17127. An o-ring seal 17119 is interposed between the superior end of the support post 17112 and the cap 17125. The superior end of the cap 17125 is also internally threaded and receives the externally threaded inferior end of the brake support fitting 17126 by way of interengaged threads 17129. Thus, the annular brake support fitting 17126 is indirectly carried by the support post 17112 by way of the intervening cap 17125. A seal 17121 is interposed between the cap 17125 and the brake support fitting 17126. FIGS. 19A and 19B also show the air cushion arrangement for top-out. The air cushion arrangement comprises an annular cushion housing 17105 retaining an annular cushion seal 17107 and an o-ring seal 17109 that engages the inner wall of the inner tube 17108, an energy-absorbing spacer ring 17111 disposed inferiorly of the cushion housing 17105 and a further spacer ring 17113 disposed inferiorly of the energy-absorbing spacer ring 17111. A snap ring 17115 is received in a corresponding annular channel in the inner wall of the inner tube 17108 to support the cushion housing 17105 and spacer rings 17111, 17113, and an air orifice 17117 is defined through the cushion housing 17105 to control bypass air flow. A bushing 17118 disposed at the inferior end of the inner tube 17108 assists the inner tube 17108 in sliding within the outer tube 17106.

The annular sleeve 17120 surrounds and is sealed to the brake support fitting 17126 by annular seals 17128 and is trapped between a superior annular shoulder 17131 on the cap 17125 and a superior annular shoulder 17133 at the superior end of the brake support fitting 17126. An annular channel 17138 is formed in the inner surface of the annular sleeve 17120, and the annular channel 17138 cooperates with the outer surface 17142 of the brake support fitting 17126 to form a pressure chamber 17144. Unlike in the first exemplary telescopic bicycle seat post system 100, the brake 17114 in the second exemplary telescopic bicycle seat post system 17100 does not include a penannular filler ring in the pressure chamber 17144.

In the second exemplary telescopic bicycle seat post system 17100, the brake support fitting 17126 has a relatively larger bore 17150 extending superiorly from the open inferior end of the brake support fitting 17126 and a relatively smaller bore 17154 disposed superiorly of the larger bore 17150; two inwardly stepped annular bore shoulders, namely a relatively larger inferior annular bore shoulder 17151 and a relatively smaller superior annular bore shoulder 17153, are interposed between the larger bore 17150 and the smaller bore 17154. The superior end 17194 of the brake support fitting 17126 is closed and the smaller bore 17154 forms a fluid reservoir 17154; hence the fluid reservoir 17154 is disposed interiorly of the brake support fitting 17126. The fluid reservoir 17154 is in fluid communication with the pressure chamber 17144 via fluid conduits 17156 defined through the brake support fitting 17126; the fluid conduits 17156 are shown in dashed lines as they are not directly visible in the cross-section shown in FIGS. 19A and 19B. The fluid reservoir 17154, fluid conduits 17156 and pressure chamber 17144 contain a suitable incompressible fluid.

A piston 17148 extends through the larger bore 17150 and is slidable therewithin so that the superior end of the piston 17148 can move into and out of the fluid reservoir 17154. In the illustrated embodiment, an annular seal bulkhead 17155 is trapped against the inferior annular bore shoulder 17151 by a snap ring 17157 received in an annular recess in the inner wall of the larger bore 17150, and the seal bulkhead 17155 in turn traps an annular seal 17159 against the superior annular bore shoulder 17153. The piston 17148 is slidably received in the seal bulkhead 17155 and seal 17159.

When the superior end of the piston 17148 is fully intruded into the fluid reservoir 17154, as shown in FIG. 19A, the piston 17148 is in the braking position, and when the piston 17148 is substantially withdrawn from the fluid reservoir 17154 relative to the intrusion of the braking position, as shown in FIG. 19B, the piston 17148 is in the telescoping position. Thus, moving the piston 17148 from the telescoping position (FIG. 19B) to the braking position (FIG. 19A) intrudes the piston 17148 into the fluid reservoir to displace fluid from the fluid reservoir 17154 into the pressure chamber 17144 via the fluid conduits 17156. Conversely, moving the piston 17148 from the braking position (FIG. 19A) to the telescoping position (FIG. 19B) withdraws the piston 17148 from the fluid reservoir 17154, relative to the braking position (FIG. 19A), to return fluid from the pressure chamber 17144 into the fluid reservoir 17154 via the fluid conduits 17156.

The braking action of the annular sleeve 17120 in the brake 17114 in the second exemplary telescopic bicycle seat post system 17100 is similar to that of the annular sleeve 120 in the brake 114 in the first exemplary telescopic bicycle seat post system 100. Moving the piston 17148 from the telescoping position (FIG. 19B) to the braking position (FIG. 19A) drives fluid into the pressure chamber 17144 to press the external surface 17122 of the annular sleeve 17120 outwardly against the inner surface 17124 of the inner tube 17108. Accordingly, in the braking configuration shown in FIG. 19A, the friction surface of the braking element, which in the illustrated embodiment is the external surface 17122 of the annular sleeve 17120, is driven outwardly against the inner surface 17124 of the inner tube 17108 to frictionally engage the inner surface 17124 of the inner tube 17108 and resist sliding thereof along the friction surface. When the piston 17148 moves from the braking position (FIG. 19A) to the telescoping position (FIG. 19B), this increases the volume in the annular fluid reservoir 17154, drawing fluid out of the pressure chamber 17144 into the fluid reservoir 17154, via the fluid conduits 17156, to reduce the outward pressure applied by the annular sleeve 17120 against the inner surface 17124 of the inner tube 17108. Accordingly, in the telescoping configuration shown in FIG. 19B, the annular sleeve 17120 is retracted inwardly, relative to the braking configuration shown in FIG. 19A, and hence the friction surface of the braking element, that is, the external surface 17122 of the annular sleeve 17120, is withdrawn, relative to the braking configuration, so as to permit sliding of the inner surface 17124 of the inner tube 17108 past the friction surface.

An annular travel stop 17161 surrounds the piston 17148 and is fixed thereto by a cross-pin 17163; the travel stop 17161 has an outwardly extending annular flange 17165 at its superior end. The outwardly extending annular flange 17165 on the travel stop 17161 which, as shown in FIG. 19B, engages an inwardly projecting annular flange 17167 in the cap 17125 to limit movement of the piston 17148 in the inferior direction and thereby define the telescoping position. The piston 17148 is biased into the braking position by a biasing member in the form of a spring 17170 which is disposed inside the hollow support post 17112. The superior end of the spring 17170 engages an outwardly projecting annular flange 17169 on a spring support 17171 which in turn engages the inferior end of the travel stop 17161, which as noted above is fixed to the piston 17148. The inferior end of the spring 17170 engages a spring bulkhead 17174 (see FIG. 22) fixed inside the support post 17112 by crimping, welding or the like; the spring 17170 thus acts between the piston 17148 and the support post 17112.

The larger bore 17150 in the brake support fitting 17126 forms a replenishment reservoir 17150; hence the replenishment reservoir 17150 is disposed interiorly of the brake support fitting 17126. The replenishment reservoir 17150 contains a volume of suitable incompressible fluid of the same type as is in the fluid reservoir 17154, and is in fluid communication with the fluid reservoir 17154. In the illustrated embodiment, the replenishment reservoir 17150 is separated from the fluid reservoir 17154 by the annular seal bulkhead 17155 and the annular seal 17159, and the replenishment reservoir 17150 can communicate with the fluid reservoir 17154 through the central apertures in the annular seal bulkhead 17155 and the annular seal 17159. However, this communication is significantly obstructed by the piston 17148 which slides within the central apertures in the annular seal bulkhead 17155 and the annular seal 17159.

An annular replenishment piston 17173 is slidingly received in the replenishment reservoir 17150. The replenishment piston 17173 has a piston bore 17189 defined therethrough, and a bushing cavity 17177 defined in the superior end of the replenishment piston 17173 receives a piston bushing 17179 and an annular piston seal 17181 trapped between the piston bushing 17179 and the replenishment piston 17173. The piston 17148 passes slidably through the piston bore 17189, piston bushing 17179 and piston seal 17181. An outer annular seal 17183 surrounds the replenishment piston 17173 to seal the replenishment piston 17173 against the inner wall 17160 of the replenishment reservoir 17150.

The replenishment piston 17173 is biased to urge fluid in the replenishment reservoir 17150 toward the fluid reservoir 17154. In the illustrated embodiment, a replenishment spring 17185 acts between the replenishment piston 17173 and the cap 17125 so as to urge the replenishment piston 17173 toward the replenishment reservoir 17150, which in turn will urge fluid in the replenishment reservoir 17150 toward the fluid reservoir 17154. More particularly, the superior end of the replenishment spring 17185 engages the inferior end of the replenishment piston 17173 and the inferior end of the replenishment spring 17185 engages an inwardly projecting annular shoulder 17187 on the cap 17125.

As can be seen in FIGS. 19A and 19B, the annular seal 17159 between the fluid reservoir 17154 and the replenishment reservoir 17150 is oriented so that it is relatively more resistant to fluid moving from the fluid reservoir 17154 toward the replenishment reservoir 17150 than to fluid moving from the replenishment reservoir 17150 toward the fluid reservoir 17154. Ordinarily, the fluid already present in the fluid reservoir 17154, fluid conduits 17156 and pressure chamber 17144 will, together with the annular seal bulkhead 17155, annular seal 17159 and piston 17148, inhibit fluid from moving from the replenishment reservoir 17150 toward the fluid reservoir 17154. Moreover, the replenishment spring is selected so that the biasing force it exerts is limited, as described further below.

In bicycle applications, depending on the aggressiveness of the riding, some fluid may over time escape from the pressure chamber 17144, for example by seeping past the seals 17128 between the annular sleeve 17120 and the brake support fitting 17126. This loss of fluid, if not replenished, could diminish the braking action of the annular sleeve 17120 by decreasing the pressure in the pressure chamber 17144 when the piston 17148 is in the braking position. However, because the replenishment piston 17173 urges fluid toward the replenishment reservoir 17150, fluid that escapes from the pressure chamber 17144 is replaced by fluid pushed from the replenishment reservoir 17150 past the annular seal bulkhead 17155, annular seal 17159 and piston 17148 into the fluid reservoir 17154. This may substantially extend the useful life of the brake 17114 in the second exemplary telescopic bicycle seat post system 17100 as compared to the brake 114 in the first exemplary telescopic bicycle seat post system 100, although at a cost of increased manufacturing complexity. One skilled in the art, now informed by the herein disclosure, will appreciate that the replenishment spring 17185 is selected so that the biasing force it exerts is sufficient to drive fluid from the replenishment reservoir 17150 into the fluid reservoir to replace leakage but is insufficient to drive fluid into the pressure chamber 17144 so as to press the external surface 17122 of the annular sleeve 17120 outwardly. In other words, the biasing force exerted by the replenishment spring 17185 is calibrated to be sufficient to replace lost fluid while being insufficient to inhibit movement of the brake 17114 into the braking configuration.

In the brake 17114 in the second exemplary telescopic bicycle seat post system 17100, the piston 17148 is coupled to a tension-controlled actuator in the form of a rigid hollow actuator shaft 17603 (FIG. 22), as described further below, such that application of tension to the actuator shaft 17603 moves the piston 17148 from the braking position to the telescoping position. Thus, the brake 17114 in the second exemplary telescopic bicycle seat post system 17100 can be used in conjunction with a connection assembly 17116 (FIG. 22) similar to the connection assembly 116 in the first exemplary telescopic bicycle seat post system 100 to couple the brake 17114 to a bicycle actuator cable.

The connection assembly 17116 in the second exemplary telescopic bicycle seat post system 17100 differs from the connection assembly 116 in the first exemplary telescopic bicycle seat post system 17100 primarily in the structure of the actuation connector. While there are some other differences in shape and structure between the connection assembly 17116 in the second exemplary telescopic bicycle seat post system 17100 and the connection assembly 116 in the first exemplary telescopic bicycle seat post system 17100, these differences, which are evident from the Figures, do not substantially affect the function of the respective connection assemblies 116, 17116 and therefore are not discussed further.

Figure 22:
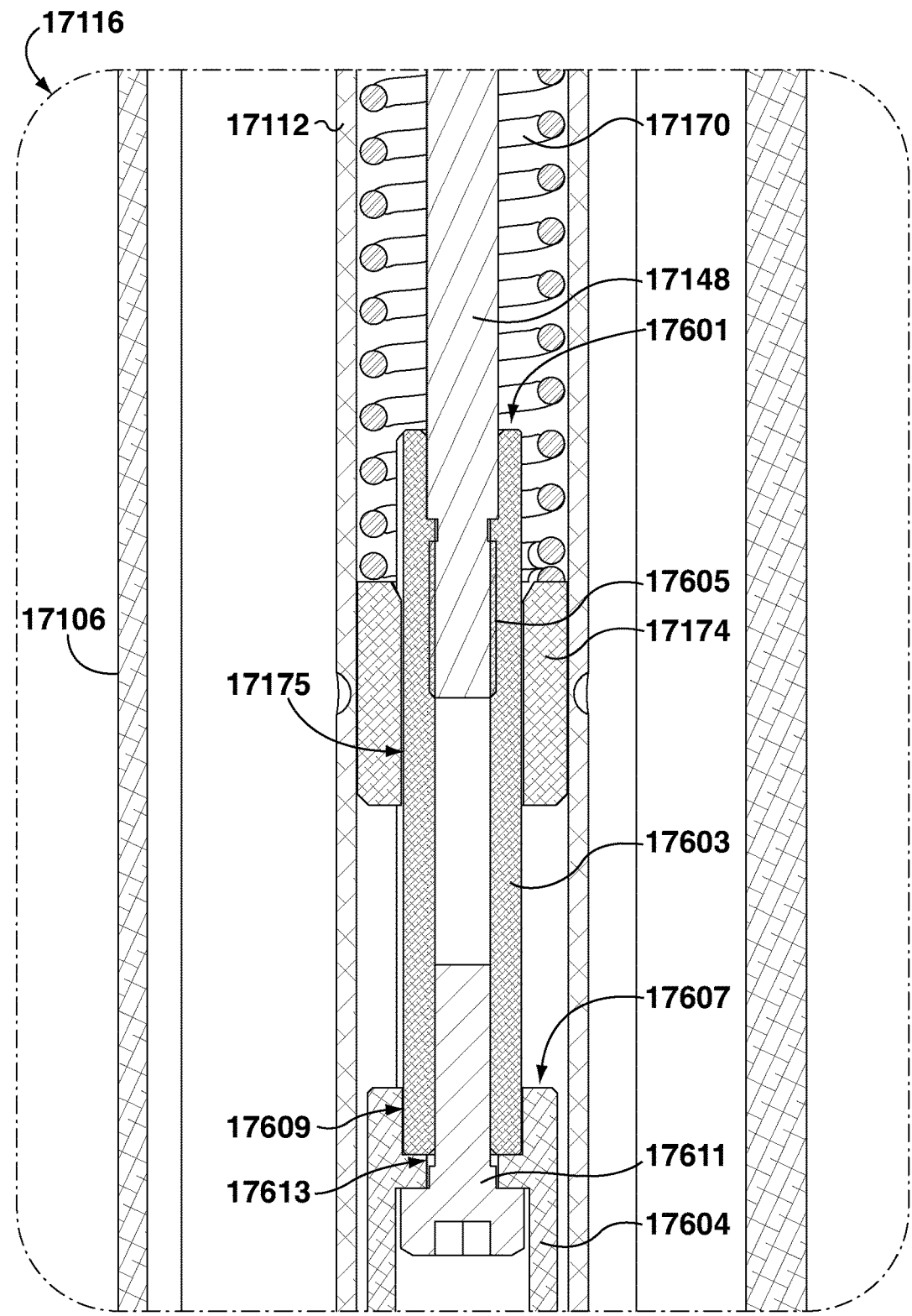
FIG. 22 is a detail view of a portion of FIG. 18B.
Figure 23A:
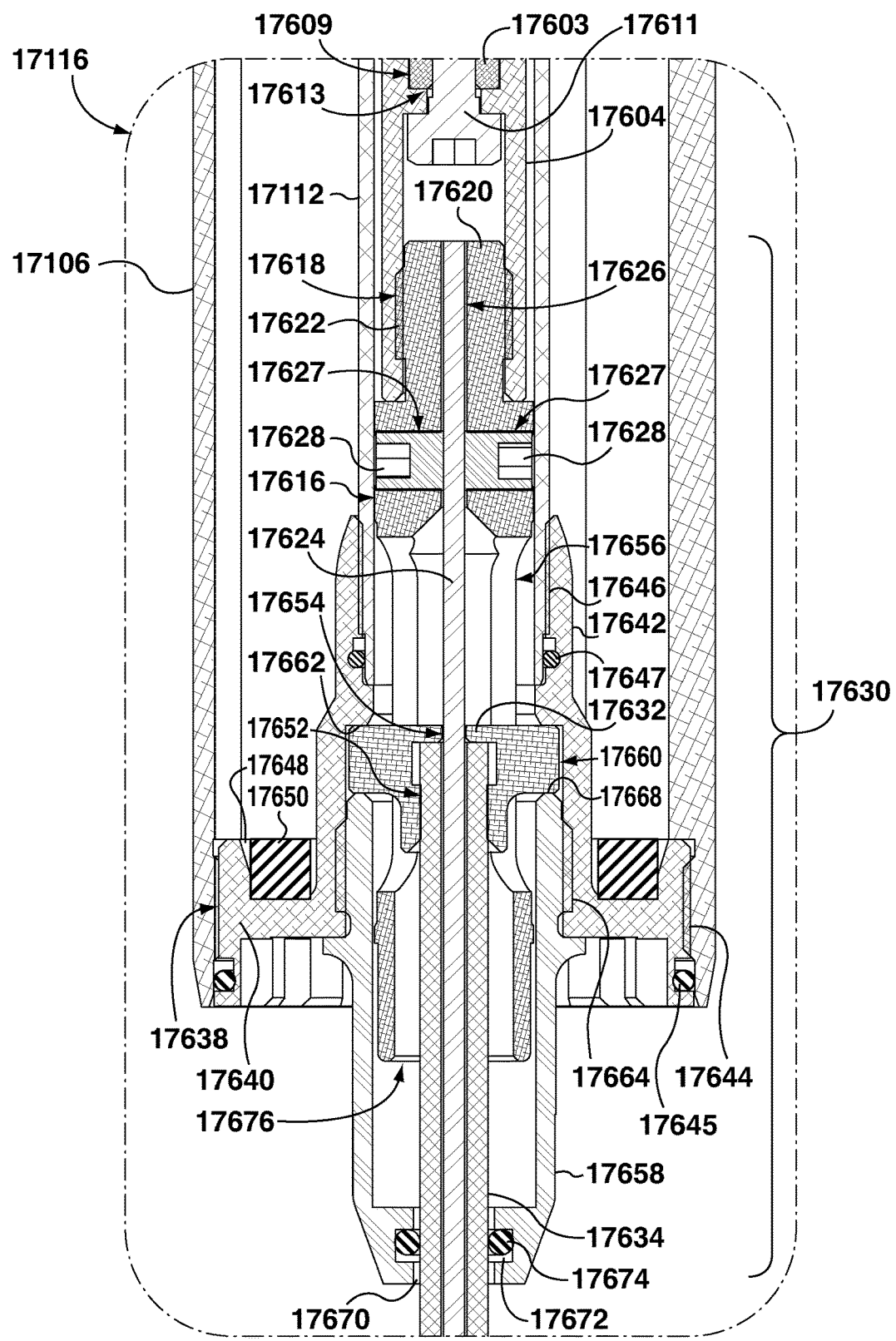
FIG. 23A is a detailed view of a portion of FIG. 18A, showing the configuration and position of a bicycle cable connector the telescopic bicycle seat post system of FIG. 17A when the brake is in the braking configuration.
Figure 23B:
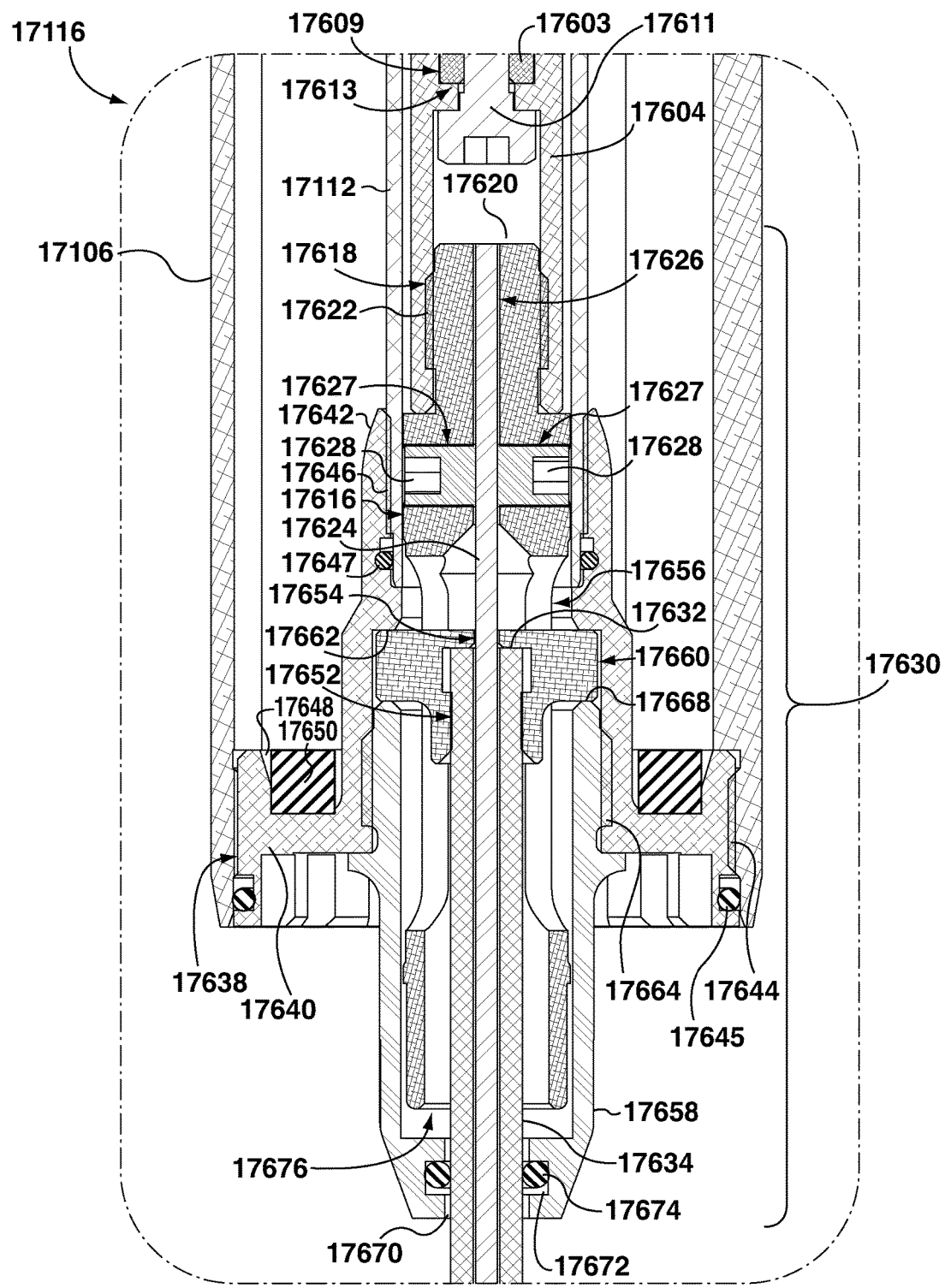
FIG. 23B is a detailed view of a portion of FIG. 18B, showing the configuration and position of the bicycle cable connector of the telescopic bicycle seat post system of FIG. 17A when the brake is in the telescoping configuration.
Figure 24A:
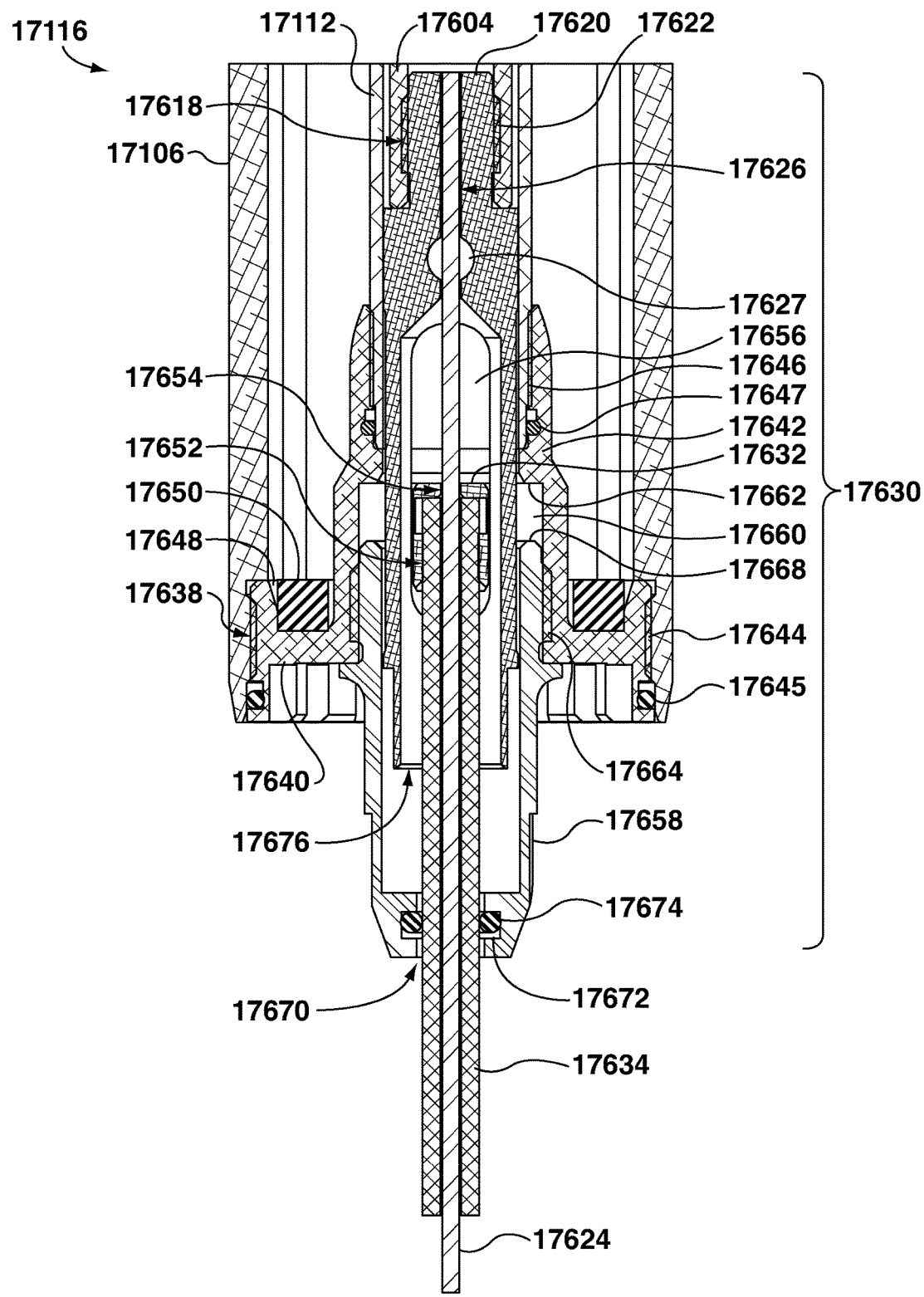
FIG. 24A is a cross-sectional view, normal to the view in FIG. 23A, showing the configuration and position of a bicycle cable connector of the telescopic bicycle seat post system of FIG. 17A when the brake is in the braking configuration.
Figure 24B:
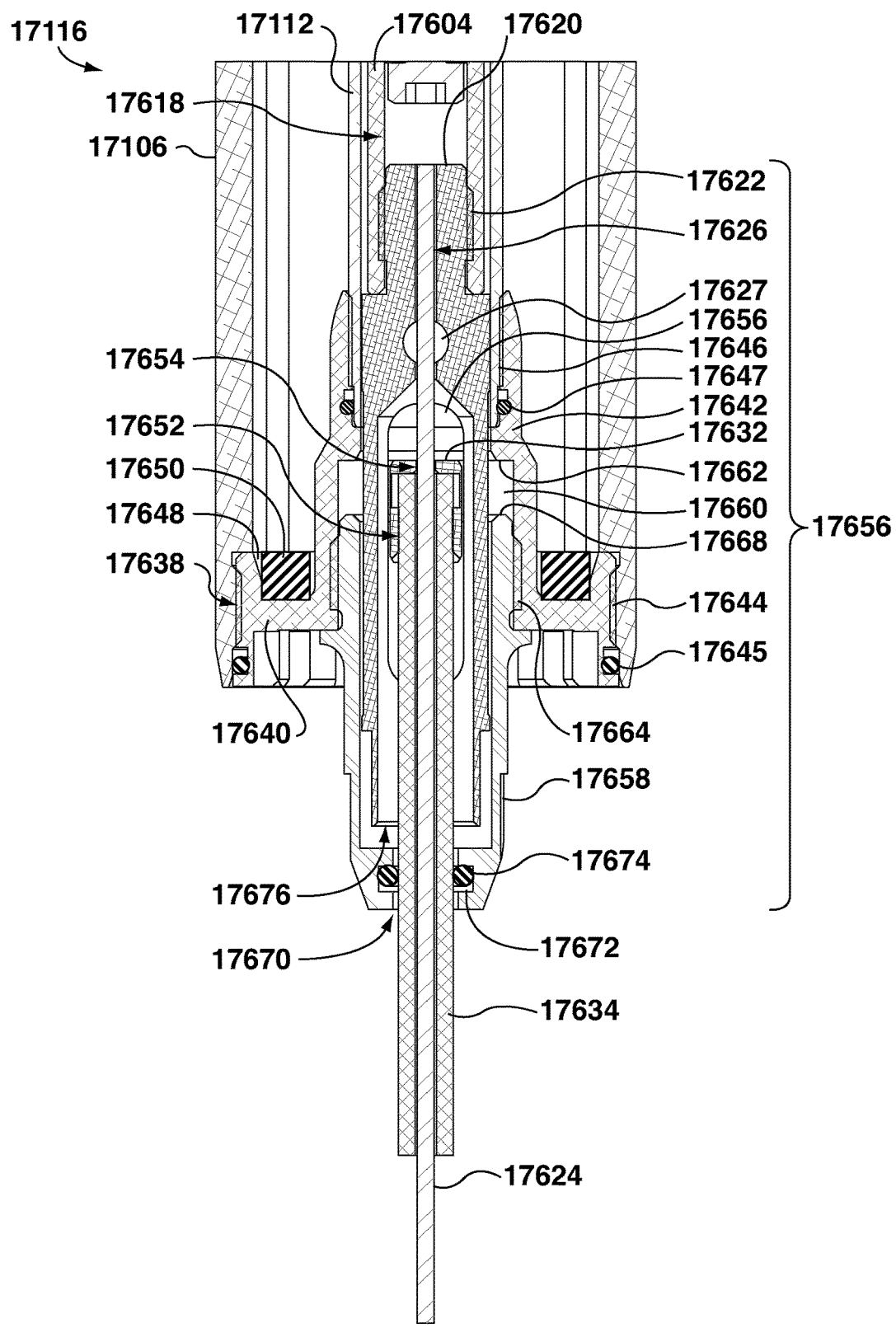
FIG. 24B is a cross-sectional view, normal to the view in FIG. 23B, showing the configuration and position of the bicycle cable connector of the telescopic bicycle seat post system of FIG. 17A when the brake is in the telescoping configuration.
Figure 25:
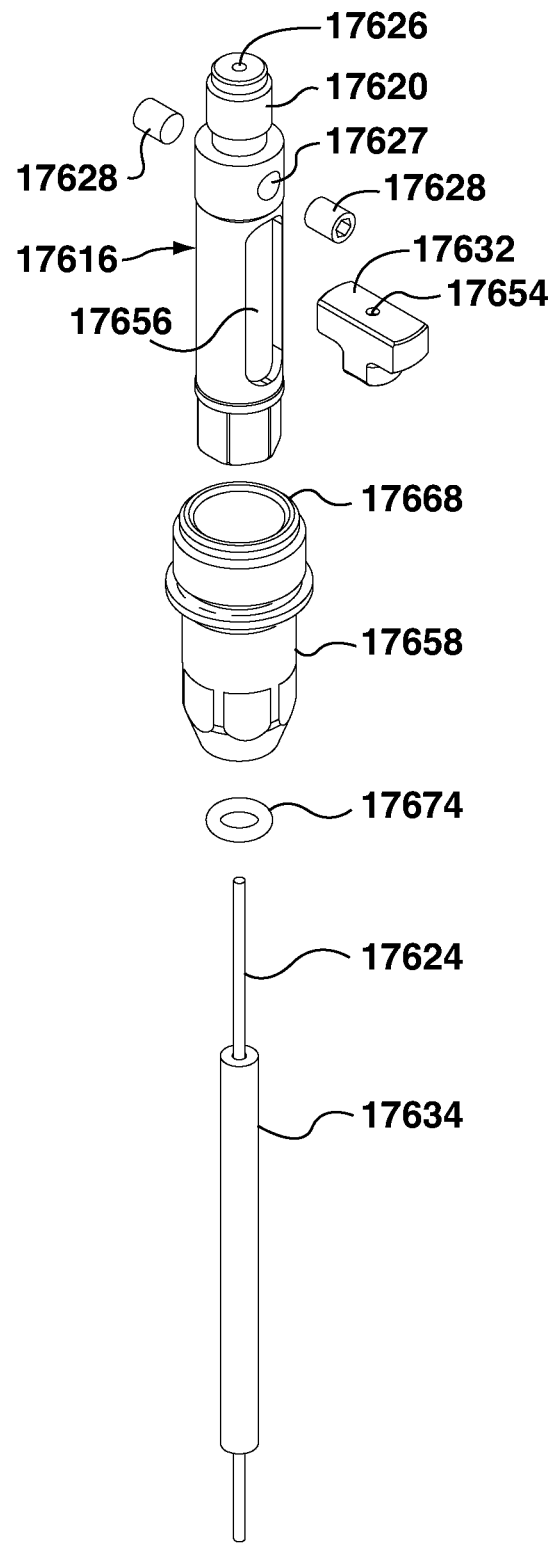
FIG. 25 is an exploded perspective view of a bicycle connector of the telescopic bicycle seat post system of FIG. 17A, also showing a bicycle cable sheath and bicycle actuator cable.
Figures 25A, 25B:
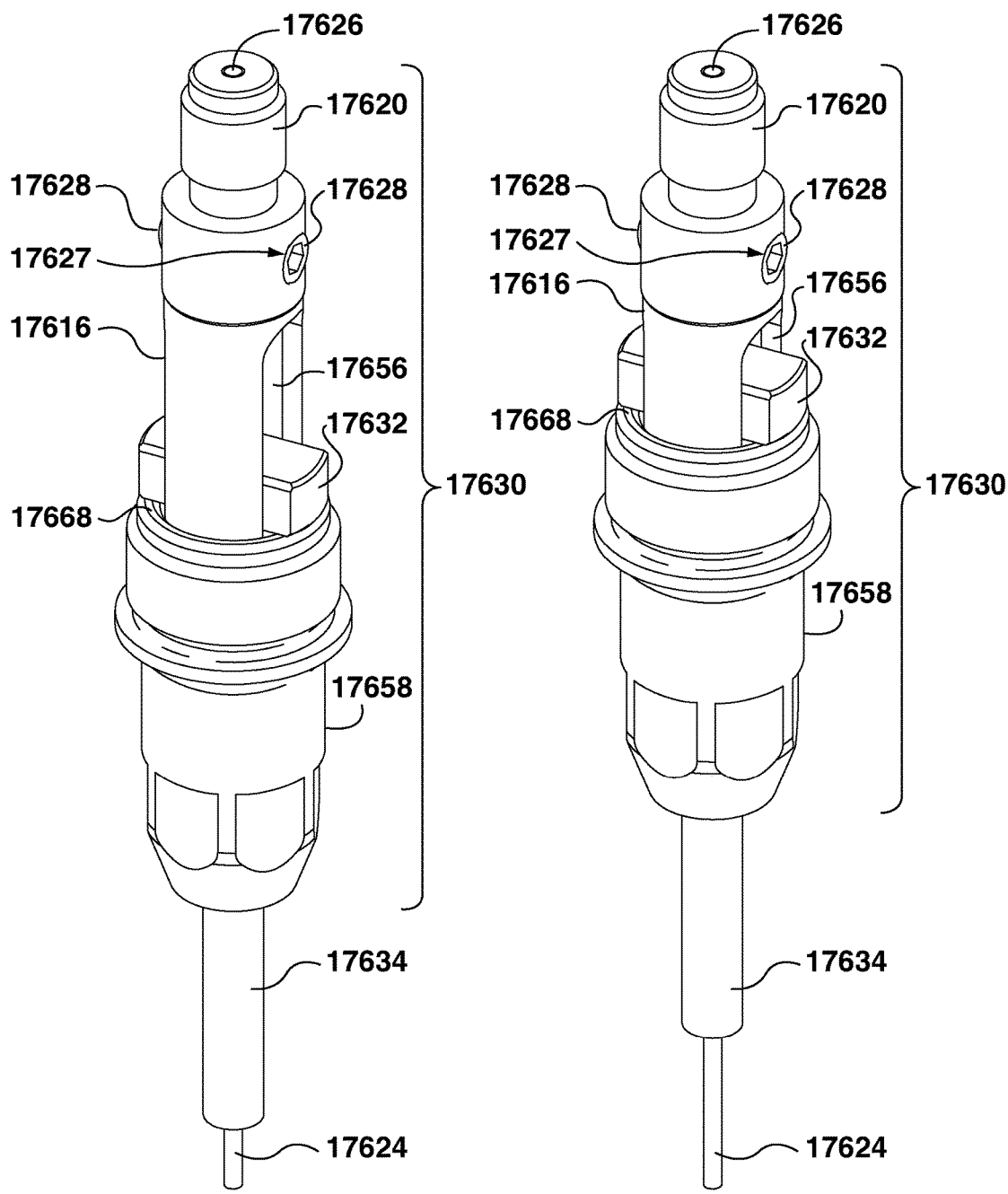
FIG. 25A is a perspective view showing the configuration of the bicycle cable connector of the telescopic bicycle seat post system of FIG. 17A when the brake is in the braking configuration.
FIG. 25B is a perspective view showing the configuration of the bicycle cable connector of the telescopic bicycle seat post system of FIG. 17A when the brake is in the telescoping configuration.
Figure 26:
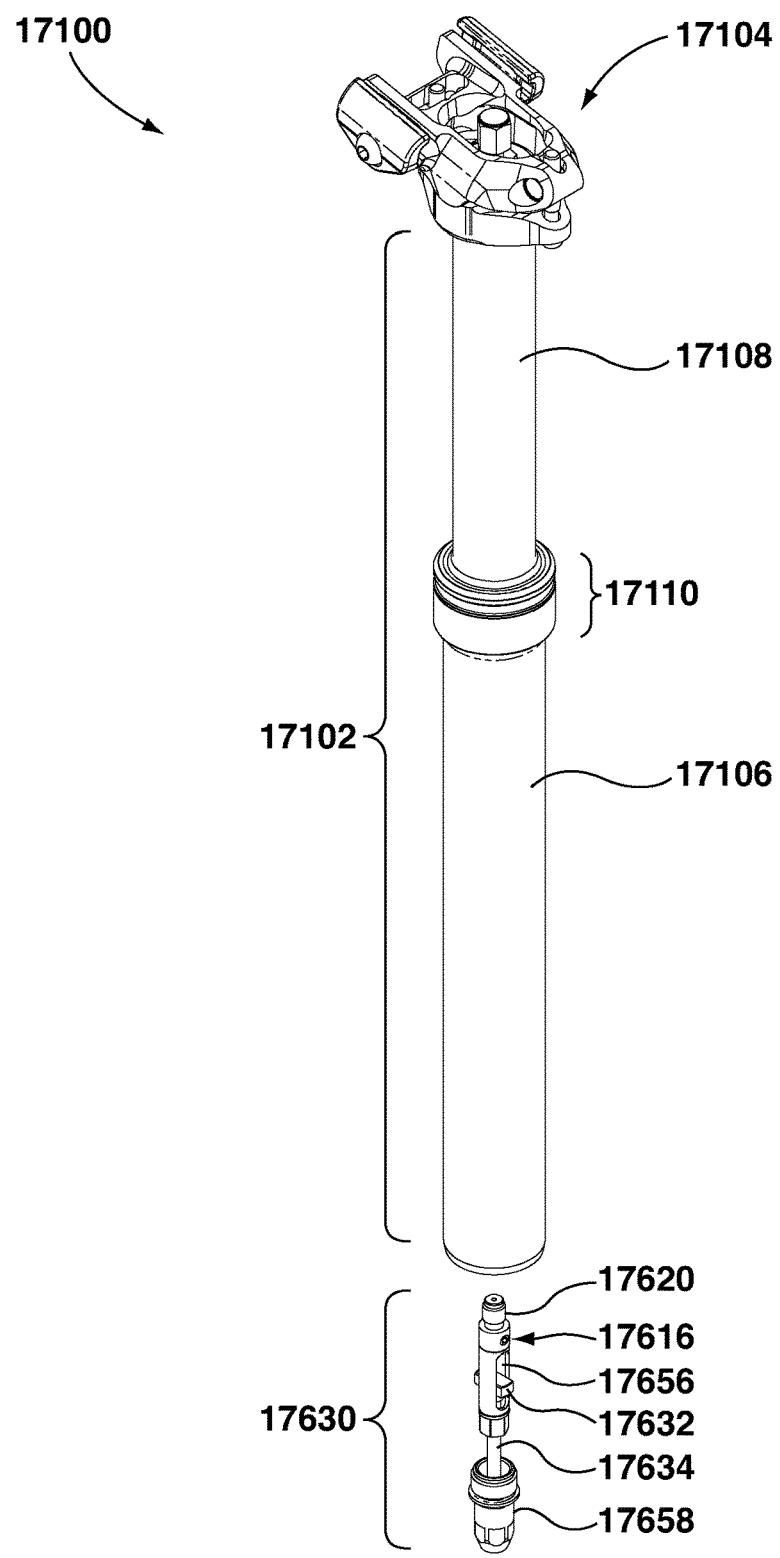
FIG. 26 is a perspective view showing the telescopic bicycle seat post system of FIG. 17A with the bicycle connector thereof separated from the telescopic bicycle seat post assembly thereof.
Figure 27:
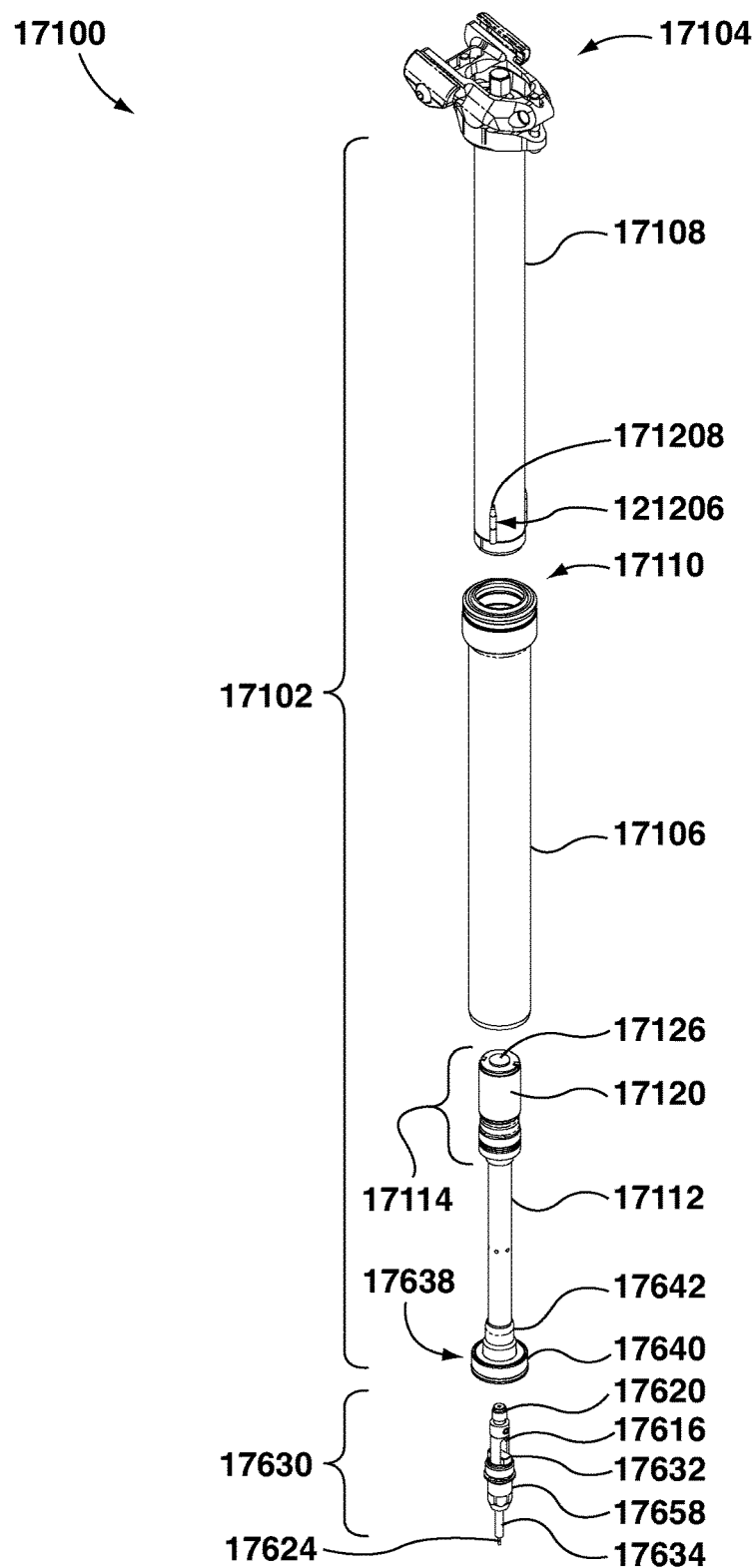
FIG. 27 is an exploded perspective view of the telescopic bicycle seat post system of FIG. 17A.
Figure 28:
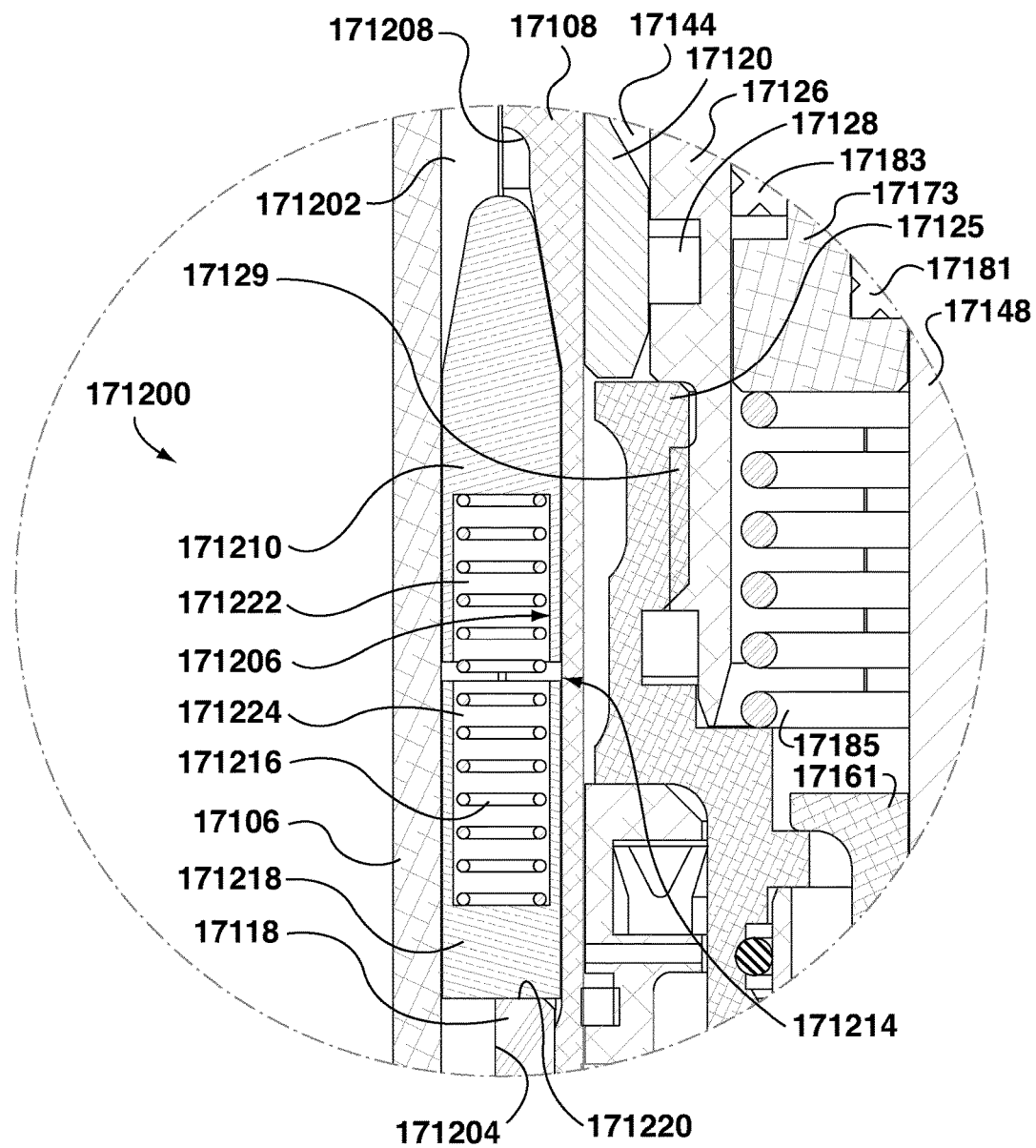
FIG. 28 is a detailed view of a portion of FIG. 18A, showing an exemplary rotation-resisting mechanism.
Figure 29:
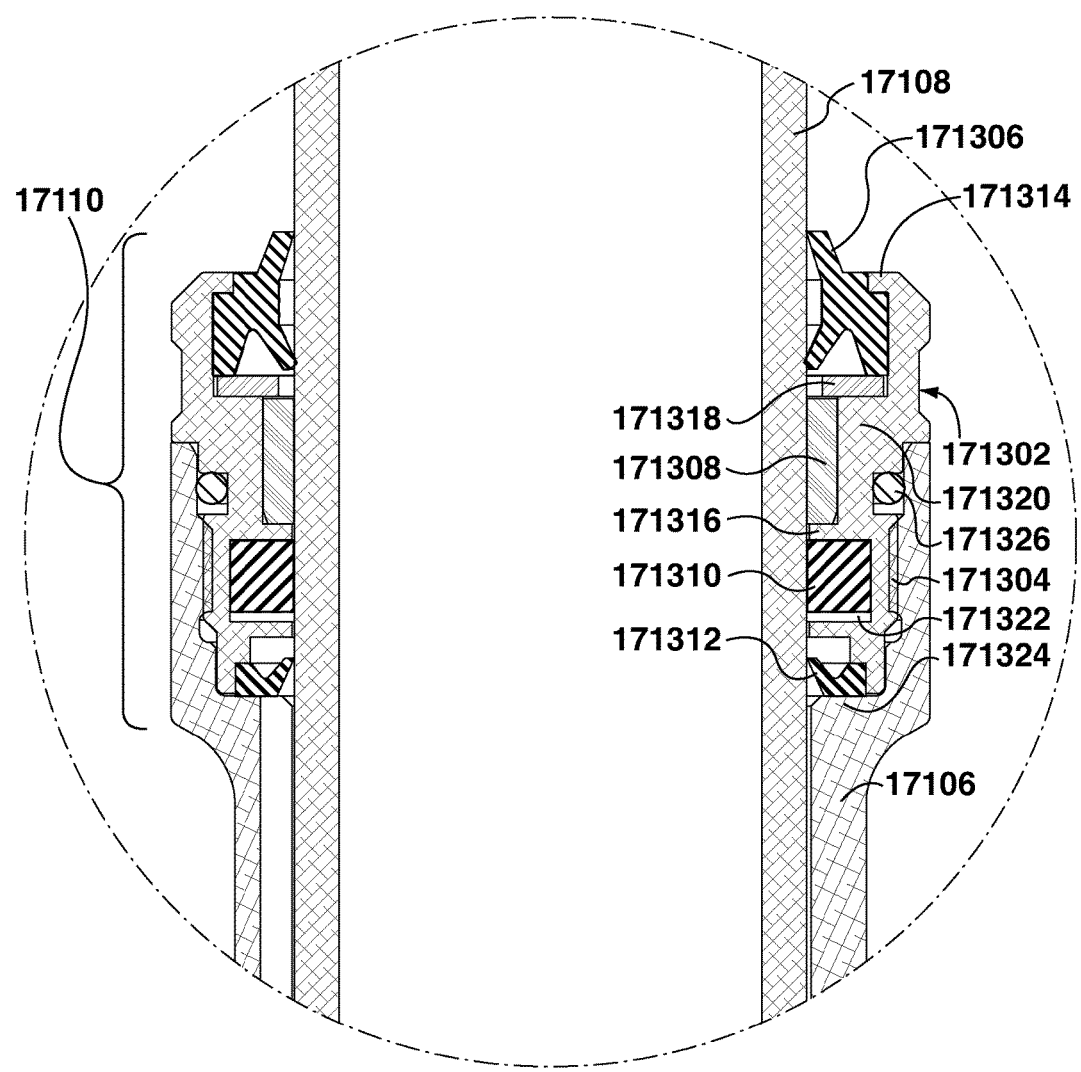
FIG. 29 is a detailed view of a portion of FIG. 18A, showing a seal assembly.
Figure 30:
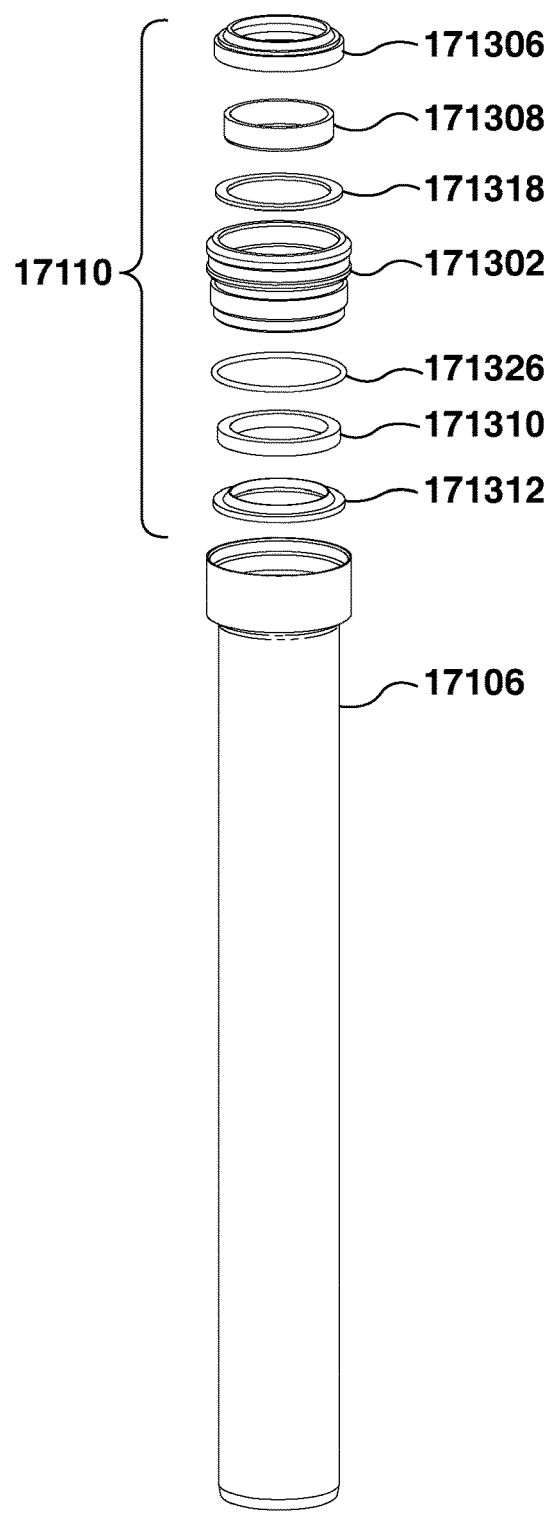
FIG. 30 is an exploded perspective view of the seal assembly of FIG. 29.
Figure 31:
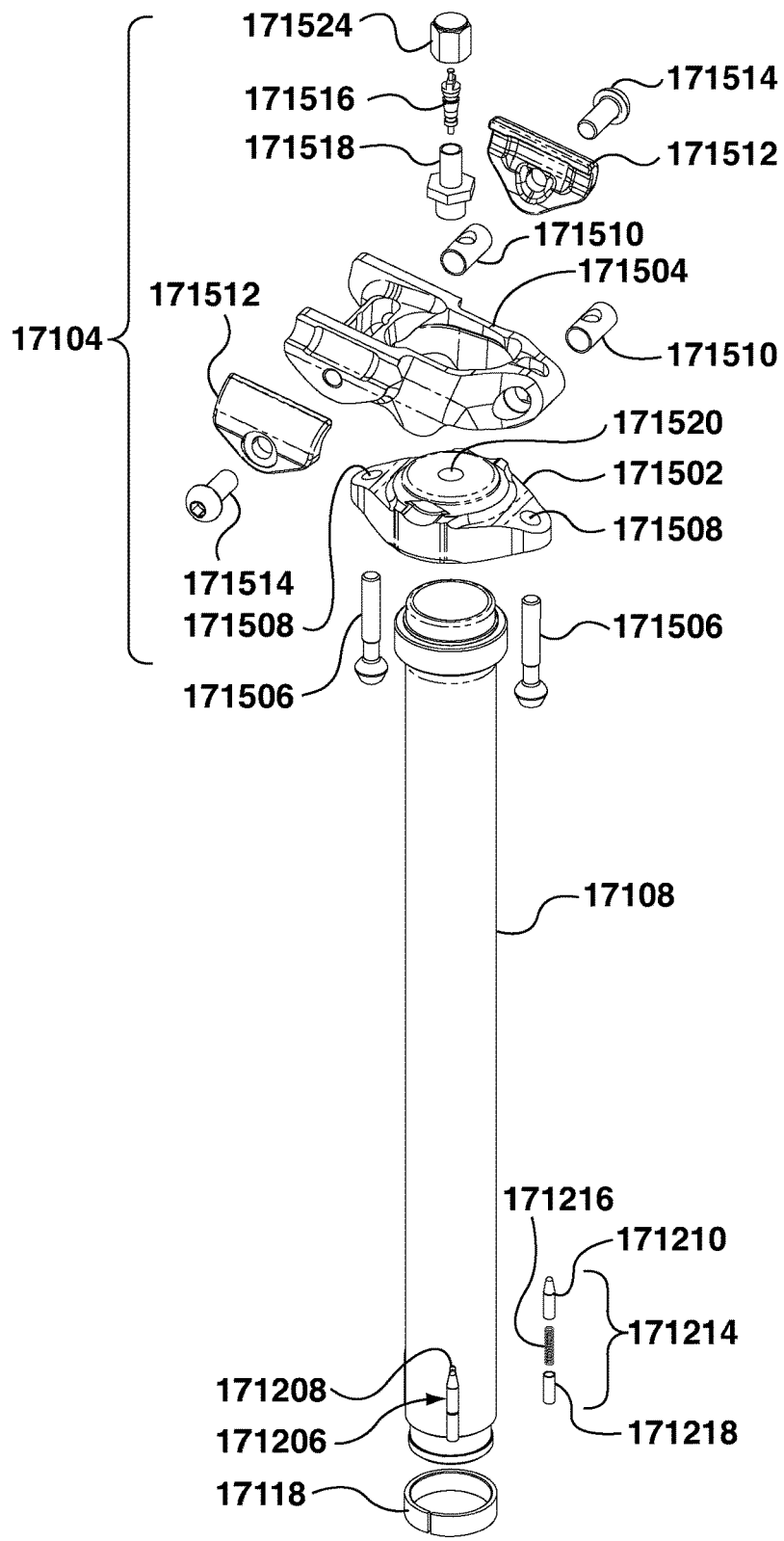
FIG. 31 is an exploded perspective view of a seat mount of the telescopic bicycle seat post system of FIG. 17A, also showing a portion of the rotation-resisting mechanism of FIG. 28.
Figure 32:
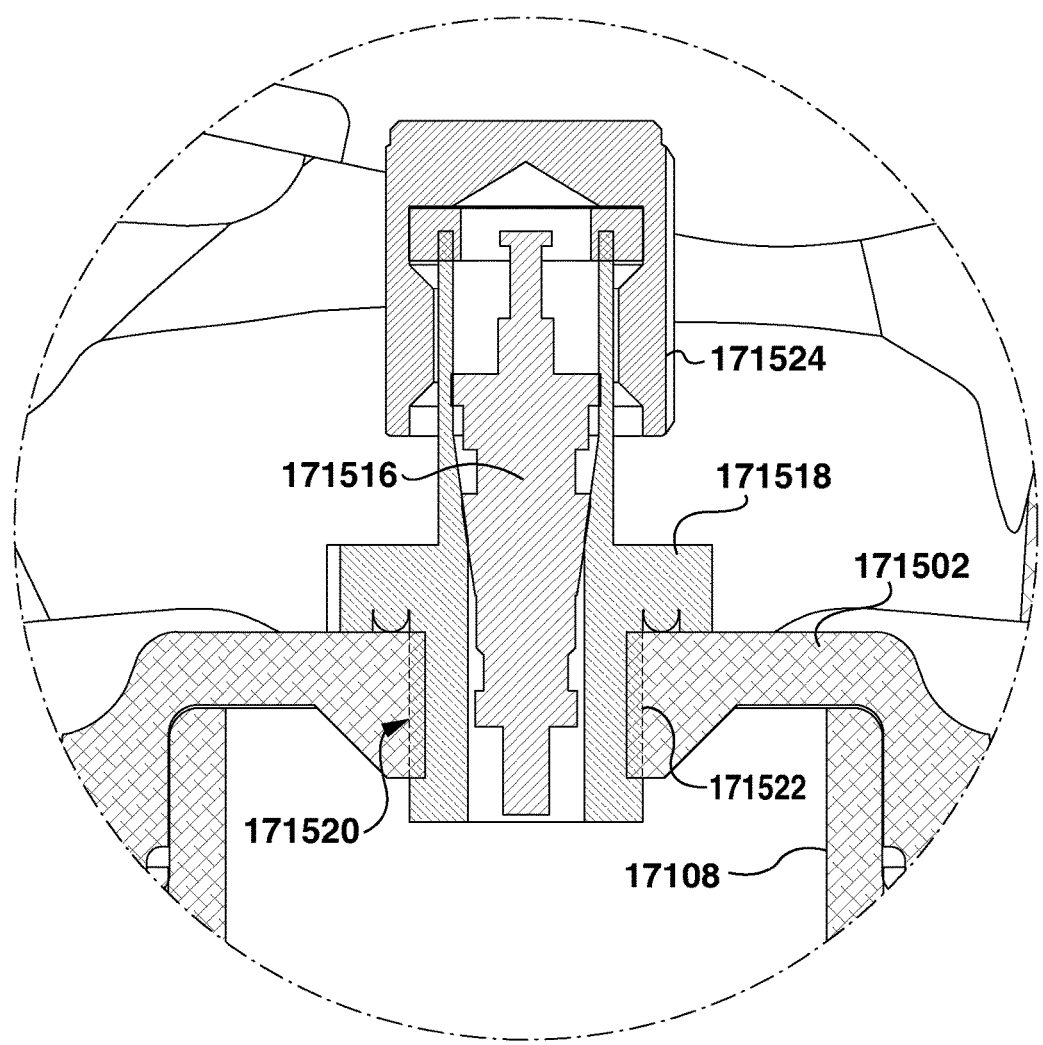
FIG. 32 is a detailed view of a portion of FIG. 18A, showing assembled positions of the air valve, valve housing and seat mount flange of the seat mount of FIG. 31.

Referring now to FIG. 22, the tension-controlled actuator, in this case the actuator shaft 17603, is coupled at one end thereof to the locking mechanism (brake 17114) and adapted for selectively actuating the locking mechanism; the actuator shaft 17603 is secured at the other end thereof to the actuation connector 17604. More particularly, the inferior end of the piston 17148 is externally threaded and extends into the internally threaded open superior end 17601 of the actuator shaft 17603; thus, the piston 17148 is secured to the actuator shaft 17603 by interengaging threads 17605 so that the longitudinal position of the actuator shaft 17603 on the piston 17148 is fixed. The actuator shaft 17603 is slidably received in an aperture 17175 defined through the spring bulkhead 17174 for reciprocal movement. The actuator shaft 17603 (best seen in FIGS. 20 and 21) and the aperture 17175 through the spring bulkhead 17174 are both substantially rectangular in transverse cross-section so as to inhibit rotation of the actuator shaft 17603. The inferior end 17607 of the actuator shaft 17603 is internally threaded and is received in a correspondingly shaped receptacle 17609 in the superior end of the actuator connector 17604; a bolt 17611 passes through a bolt receptacle 17613 in the base of the receptacle 17609 and is threadedly received by the internally threaded inferior end 17607 of the actuator shaft 17603 to secure the actuator shaft 17603 to the actuator connector 17604 in longitudinally fixed relationship to one another. The remainder of the actuator connector 17604, and the remainder of the connection assembly 17116, are similar in structure and function to the actuator connector 604 and the rest of the connection assembly 116 in the first exemplary telescopic bicycle seat post system 100 and are not described further to avoid repetition. FIGS. 23A to 28 show views of the connection assembly 17116 in the second exemplary telescopic bicycle seat post system 17100 which correspond to the views of the connection assembly 116 in the first exemplary telescopic bicycle seat post system 100 shown in FIGS. 7A to 11.

As with the connection assembly 116 in the first exemplary telescopic bicycle seat post system 100, in the connection assembly 17116 in the second exemplary telescopic bicycle seat post system 17100 the actuation connector 17604 and the bicycle cable connector 17616 are removably repeatably interengageable with one another so that they can be connected to and disconnected from one another. Moreover, when the actuation connector 17604 and the bicycle cable connector 17616 are interengaged, tension applied to the bicycle cable connector 17616 by the bicycle actuator cable 17624 will be transmitted through the bicycle cable connector 17616 and the actuator connector 17604 so that the actuator shaft 17603 will be subjected to tension, thereby moving the piston 17148. Since the bicycle cable connector 17616 has a fixed longitudinal position on the bicycle actuator cable 17624, the longitudinal position of the bicycle actuator cable 17624 relative to the actuator shaft 17603 will be maintained through repeated engagement and disengagement of the actuation connector 17604 and the bicycle cable connector 17616.

While threaded interengagement of various components has been described and illustrated herein, for ease of illustration the threading is not shown in all drawings and this does not imply the absence of threading that is described in this specification.

Certain embodiments have been described by way of example. It will be apparent to persons skilled in the art that a number of variations and modifications can be made without departing from the scope of the claims.

What is claimed is:
1. A telescoping arrangement comprising:
    an outer tube;
    a support post disposed within the outer tube and fixedly coupled thereto;
    an inner tube telescopically received in the outer tube between the outer tube and the support post;
    a brake carried by the support post for releasably supporting the inner tube on the support post to longitudinally fix the inner tube in a desired telescopic position relative to the outer tube;
    the brake comprising at least one braking element movable between:
    a braking configuration in which at least one friction surface of the at least one braking element is driven outwardly against an inner surface of the inner tube to frictionally engage the inner surface of the inner tube and resist sliding thereof along the at least one friction surface; and
    a telescoping configuration in which the at least one friction surface of the at least one braking element is withdrawn, relative to the braking configuration, so as to permit sliding of the inner surface of the inner tube past the at least one friction surface; and
    an actuator coupled to the at least one braking element for moving the at least one braking element between the braking configuration and the telescoping configuration;
    wherein, when the at least one braking element is in the braking configuration, the at least one braking element acts between the inner tube and the support post to support the inner tube on the support post in a fixed telescopic position relative to the outer tube; and
    wherein, when the at least one braking element is in the telescoping configuration, the inner tube can telescope relative to the outer tube;
    wherein:
    the braking element comprises a resiliently deformable annular sleeve;
    the annular sleeve has an external surface forming the at least one friction surface;
    in the braking configuration, the annular sleeve is pressed outwardly against the inner surface of the inner tube; and
    in the telescoping configuration the annular sleeve is retracted inwardly, relative to the braking configuration;
    wherein the brake comprises:
    an annular brake support fitting fixedly carried by the support post
    the annular sleeve surrounding and being sealed to the brake support fitting;
    an annular channel being formed in an inner surface of the annular sleeve;
    the annular channel cooperating with the brake support fitting to form a pressure chamber;
    a piston slidably and sealingly received in a bore of the brake support fitting and movable between a braking position and a telescoping position;
    a fluid reservoir being defined between the piston and the brake support fitting; and
    the fluid reservoir being in fluid communication with the pressure chamber;
    whereby:
    moving the piston from the telescoping position to the braking position increases pressure in the fluid reservoir, with the increased pressure being transferred fluidically into the pressure chamber to press the external surface of the annular sleeve outwardly against the inner surface of the inner tube; and moving the piston from the braking position to the telescoping position decreases pressure in the fluid reservoir, with the decreased pressure being transferred fluidically out of the pressure chamber to reduce outward pressure applied by the annular sleeve.

2. The telescoping arrangement of claim 1, wherein a static coefficient of friction between the external surface of the annular sleeve and the inner surface of the inner tube is at least 0.25.

3. The telescoping arrangement of claim 1, wherein the annular sleeve is formed from polyphenylsulfone (PPSU).

4. The telescoping arrangement of claim 1, wherein the piston is biased into the braking position by a biasing member acting between the piston and the support post.

5. The telescoping arrangement of claim 4, wherein:
the support post is hollow; and
the actuator comprises a cable coupled to the piston for overcoming the biasing member and pulling the piston from the braking position to the telescoping position.

6. The telescoping arrangement of claim 4, wherein:
the fluid reservoir is an annular fluid reservoir defined between the piston and the brake support fitting;
moving the piston from the telescoping position to the braking position decreases a total annular space between an outer surface of the piston and an inner surface of the bore to force fluid from the annular fluid reservoir into the pressure chamber; and
moving the piston from the braking position to the telescoping position increases the total annular space between the outer surface of the piston and the inner surface of the bore to return fluid from the pressure chamber into the annular fluid reservoir.

7. The telescoping arrangement of claim 4, wherein:
the fluid reservoir is disposed interiorly of the brake support fitting;
moving the piston from the telescoping position to the braking position intrudes the piston into the fluid reservoir to displace fluid from the fluid reservoir into the pressure chamber, and
moving the piston from the braking position to the telescoping position withdraws the piston from the fluid reservoir, relative to the braking position, to return fluid from the pressure chamber into the fluid reservoir.

8. The telescoping arrangement of claim 7, further comprising:
a replenishment reservoir disposed interiorly of the brake support fitting;
the replenishment reservoir being in fluid communication with the fluid reservoir;
a replenishment piston slidingly received in the replenishment reservoir;
the replenishment piston being biased to urge fluid in the replenishment reservoir toward the fluid reservoir.

9. A telescopic bicycle seat post system, the telescopic bicycle seat post system comprising:
a seat post telescoping assembly, the seat post telescoping assembly comprising:
an outer tube;
an inner tube telescopically received in the outer tube;
a locking mechanism acting between the outer tube and the inner tube for releasably locking the inner tube in a desired telescopic position relative to the outer tube;
the locking mechanism having a tension-controlled actuator; and
an actuation connector coupled to the tension-controlled actuator and adapted to apply tension to the tension-controlled actuator; and
a bicycle connector, the bicycle connector comprising:
a bicycle cable connector adapted for securing a bicycle actuator cable so as to maintain a fixed longitudinal position of the bicycle cable connector on the bicycle actuator cable;
the actuation connector and the bicycle cable connector being removably repeatably interengageable with one another so that, when the actuation connector and the bicycle cable connector are interengaged, tension applied to the bicycle cable connector acts on the tension-controlled actuator through the actuation connector;
wherein the actuation connector and the bicycle cable connector maintain the longitudinal position of the bicycle actuator cable relative to the tension-controlled actuator, when the actuation connector and the bicycle cable connector are interengaged, through repeated engagement and disengagement of the actuation connector and the bicycle cable connector.

10. The telescopic bicycle seat post system of claim 9, wherein:
the tension-controlled actuator comprises a seat post actuator cable coupled at one end thereof to the locking mechanism and adapted for selectively actuating the locking mechanism, the seat post actuator cable being secured at the other end thereof to the actuation connector.

11. The telescopic bicycle seat post system of claim 9, wherein:
the tension-controlled actuator comprises an actuator shaft coupled at one end thereof to the locking mechanism and adapted for selectively actuating the locking mechanism; the actuator shaft being secured at the other end thereof to the actuation connector.

12. The telescopic bicycle seat post system of claim 9, wherein the actuation connector and the bicycle cable connector are threadedly removably interengageable with one another.

13. The telescopic bicycle seat post system of claim 9, wherein:
the seat post telescoping assembly further comprises a support post;
the inner tube is telescopically received in the outer tube between the outer tube and the support post;
the actuation connector is longitudinally movably received in the support post for reciprocal movement along the support post;
the bicycle connector further comprising:
a bicycle cable sheath retainer adapted for securing a bicycle cable sheath surrounding the bicycle actuator cable;
the bicycle cable sheath retainer and the bicycle cable connector being axially movable relative to one another;
the bicycle cable connector being longitudinally movably receivable in the support post for reciprocal movement along the support post;
the bicycle cable sheath retainer being releasably securable to the seat post telescoping assembly so as to be fixed relative to the support post when secured to the seat post telescoping assembly;
wherein, when the actuation connector and the bicycle cable connector are interengaged and the bicycle cable sheath retainer is secured to the seat post telescoping assembly:
the bicycle cable connector is coupled to the tension-controlled actuator by the actuation connector; and the actuation connector and the bicycle cable connector move in unison for reciprocal movement along the support post while the bicycle cable sheath retainer remains fixed relative to the support post; and when the actuation connector and the bicycle cable connector are disengaged from one another and the bicycle cable sheath retainer is released from the seat post telescoping assembly, the bicycle connector can be separated from the telescopic bicycle seat post system to permit removal of the seat post telescoping assembly from a bicycle while the bicycle connector remains coupled to the bicycle.

14. The telescopic bicycle seat post system of claim 13, wherein:

the bicycle connector further comprises a removable end cap releasably securable to the seat post telescoping assembly at a bicycle mounting end thereof;

a receptacle is disposed at the bicycle mounting end of the seat post telescoping assembly for receiving the bicycle cable sheath retainer;

wherein, when the end cap is secured to the bicycle mounting end of the seat post telescoping assembly with the bicycle cable sheath retainer disposed in the receptacle, the bicycle cable sheath retainer is trapped in the receptacle by the end cap.

* * * * *